US012690017B2

(12) United States Patent
Kim et al.

(10) Patent No.: US 12,690,017 B2
(45) Date of Patent: Jul. 21, 2026

(54) TRIGGER FRAME FOR UPLINK RESOURCE ALLOCATION

(71) Applicant: Comcast Cable Communications, LLC, Philadelphia, PA (US)

(72) Inventors: Jeongki Kim, Seoul (KR); Kazi Mohammed Saidul Huq, Herndon, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 342 days.

(21) Appl. No.: 18/365,618

(22) Filed: Aug. 4, 2023

(65) Prior Publication Data

US 2024/0049187 A1      Feb. 8, 2024

Related U.S. Application Data

(60) Provisional application No. 63/395,441, filed on Aug. 5, 2022.

(51) Int. Cl.
*H04W 72/04* (2023.01)

(52) U.S. Cl.
CPC ................................... *H04W 72/04* (2013.01)

(58) Field of Classification Search
CPC ........... H04W 72/0453; H04W 72/044; H04W 16/02; H04W 72/048; H04W 72/51; H04W 74/006; H04W 84/12; H04W 72/04; H04B 7/0697; H04L 5/0044; H04L 5/0064; H04L 5/0087; H04L 5/0096; H04L 69/22; H04L 27/2603; H04L 5/0023
See application file for complete search history.

(56) References Cited

U.S. PATENT DOCUMENTS

| | | | |
|---|---|---|---|
| 2016/0100408 A1* | 4/2016 | Hedayat ................. | H04L 5/0037 |
| | | | 370/329 |
| 2017/0202020 A1* | 7/2017 | Cherian .............. | H04W 74/004 |
| 2019/0150090 A1 | 5/2019 | Yang et al. | |
| 2021/0351894 A1* | 11/2021 | Lin ........................ | H04L 5/0094 |
| 2022/0030572 A1* | 1/2022 | Shellhammer ........ | H04L 5/0096 |
| 2022/0116944 A1* | 4/2022 | Cariou .............. | H04W 74/0808 |
| 2022/0201720 A1 | 6/2022 | Smith et al. | |
| 2022/0201769 A1* | 6/2022 | Li .......................... | H04W 28/26 |
| 2022/0330270 A1 | 10/2022 | Das et al. | |
| 2023/0199664 A1* | 6/2023 | Takata ................... | H04W 52/40 |
| | | | 455/522 |
| 2024/0089068 A1* | 3/2024 | Chun .................... | H04L 5/0094 |
| 2024/0137168 A1* | 4/2024 | Park ........................ | H04L 67/51 |
| 2025/0150225 A1* | 5/2025 | Chun ................. | H04W 72/0453 |

FOREIGN PATENT DOCUMENTS

EP          3908040 A1      11/2021

OTHER PUBLICATIONS

Nov. 23, 2023—European Search Report—EP App. No. 23189778. 6.

* cited by examiner

*Primary Examiner* — Rushil P. Sampat
(74) *Attorney, Agent, or Firm* — Banner & Witcoff, Ltd.

(57) ABSTRACT

An access point (AP) may communicate with one or more stations (STAs). The AP may send a trigger frame to one or more STAs for allocating uplink resources for a corresponding STA. The trigger frame may indicate a presence or absence of a subsequent uplink resource allocation. Uplink resource allocations for multiple uplink transmissions of one or more STAs may be determined based on the indication(s) in the trigger frame.

20 Claims, 24 Drawing Sheets

800

TXOP

AP 802: Trigger Frame 808 | SIFS | | SIFS | 814 | SIFS | Trigger Frame 816 | SIFS | | SIFS | 820

STA 804: 810 | | 818

STA 806: 812

1800

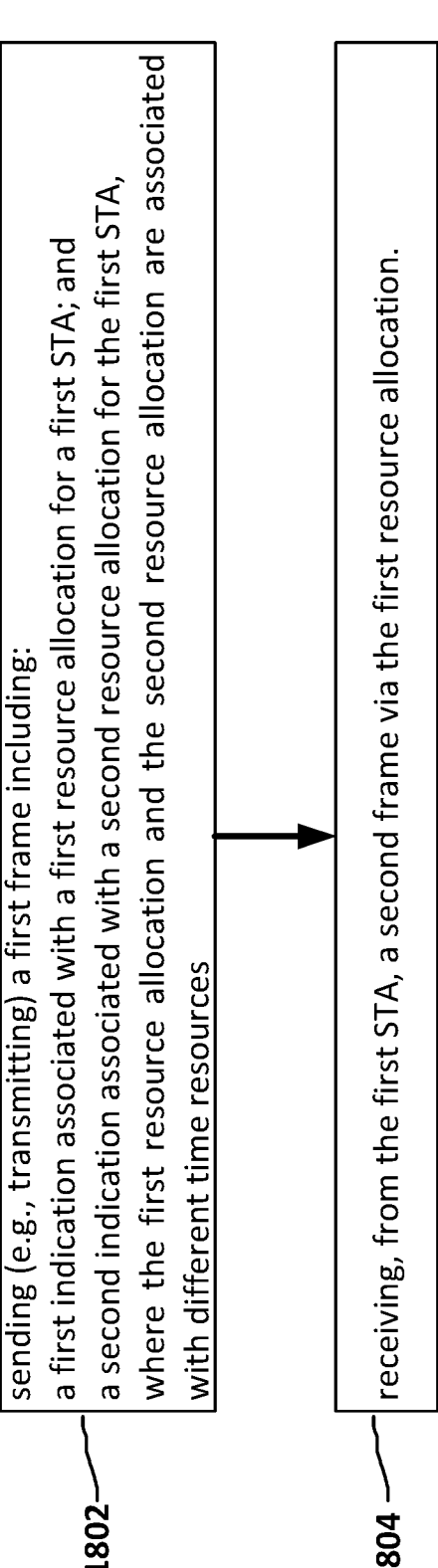

1802 — sending (e.g., transmitting) a first frame including:

a first indication associated with a first resource allocation for a first STA; and a second indication associated with a second resource allocation for the first STA, where the first resource allocation and the second resource allocation are associated with different time resources 1804 — receiving, from the first STA, a second frame via the first resource allocation.

FIG. 18

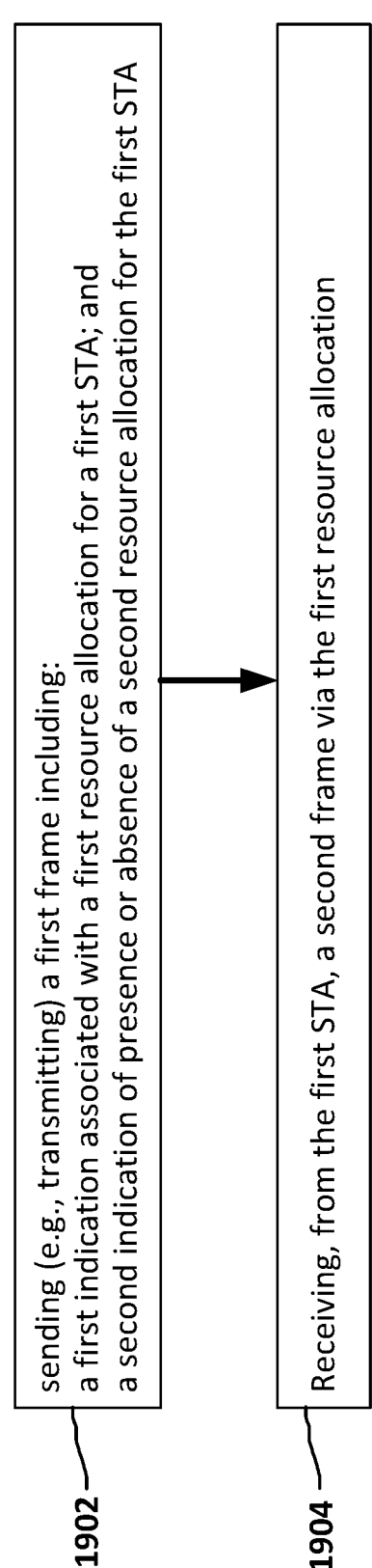
1900
1902 — sending (e.g., transmitting) a first frame including:
a first indication associated with a first resource allocation for a first STA; and
a second indication of presence or absence of a second resource allocation for the first STA
1904 — Receiving, from the first STA, a second frame via the first resource allocation
FIG. 19

Figure 20:
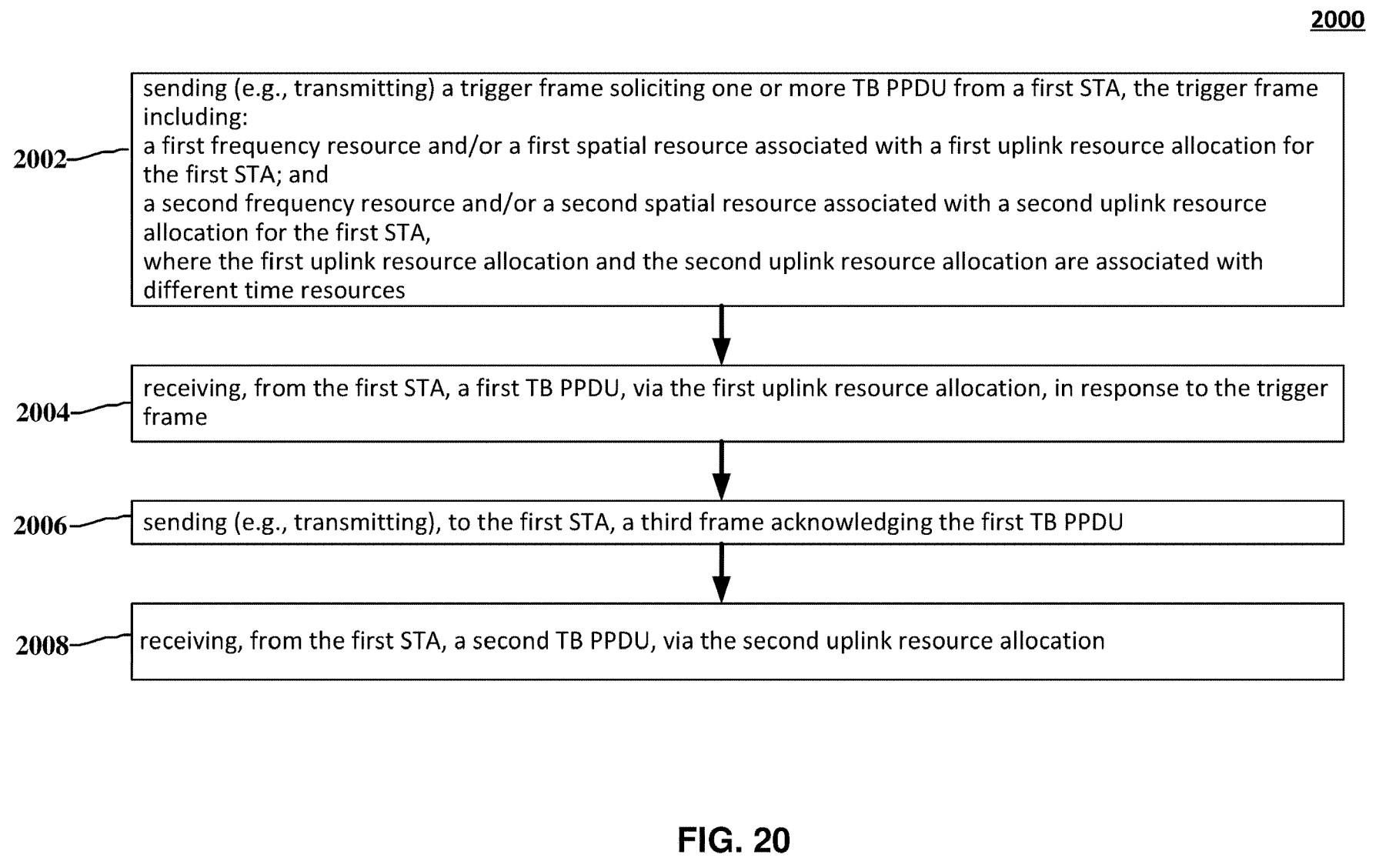

2000

2002 — sending (e.g., transmitting) a trigger frame soliciting one or more TB PPDU from a first STA, the trigger frame including:

a first frequency resource and/or a first spatial resource associated with a first uplink resource allocation for the first STA; and a second frequency resource and/or a second spatial resource associated with a second uplink resource allocation for the first STA, where the first uplink resource allocation and the second uplink resource allocation are associated with different time resources 2004 — receiving, from the first STA, a first TB PPDU, via the first uplink resource allocation, in response to the trigger frame 2006 — sending (e.g., transmitting), to the first STA, a third frame acknowledging the first TB PPDU 2008 — receiving, from the first STA, a second TB PPDU, via the second uplink resource allocation

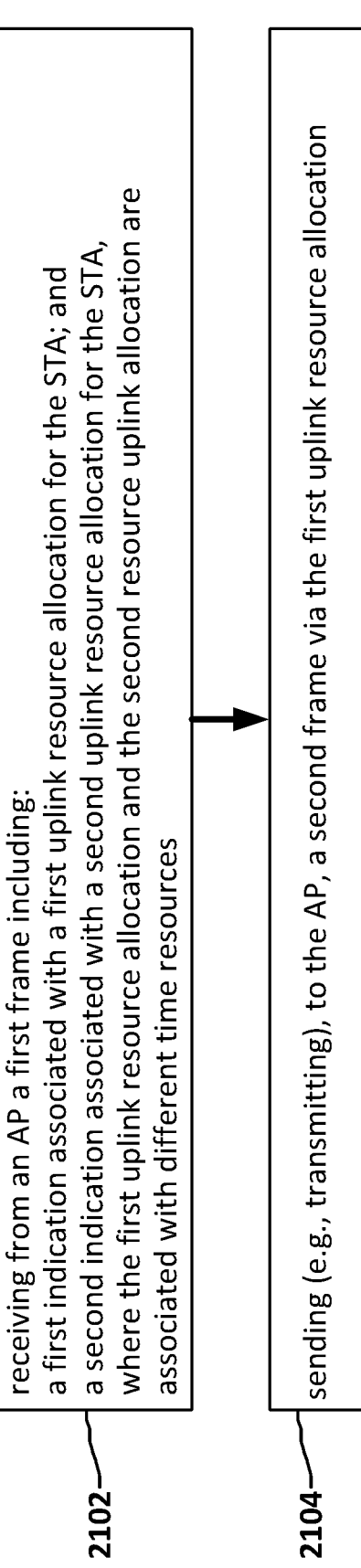

receiving from an AP a first frame including:
a first indication associated with a first uplink resource allocation for the STA; and
a second indication associated with a second uplink resource allocation for the STA,
where the first uplink resource allocation and the second resource uplink allocation are
associated with different time resources

2102 sending (e.g., transmitting), to the AP, a second frame via the first uplink resource allocation

2202 — receiving from an AP a first frame including:
a first indication associated with a first resource allocation for the STA; and
a second indication of presence or absence of a second resource allocation for the STA 2204 — sending (e.g., transmitting), to the AP, a second frame via the first resource allocation

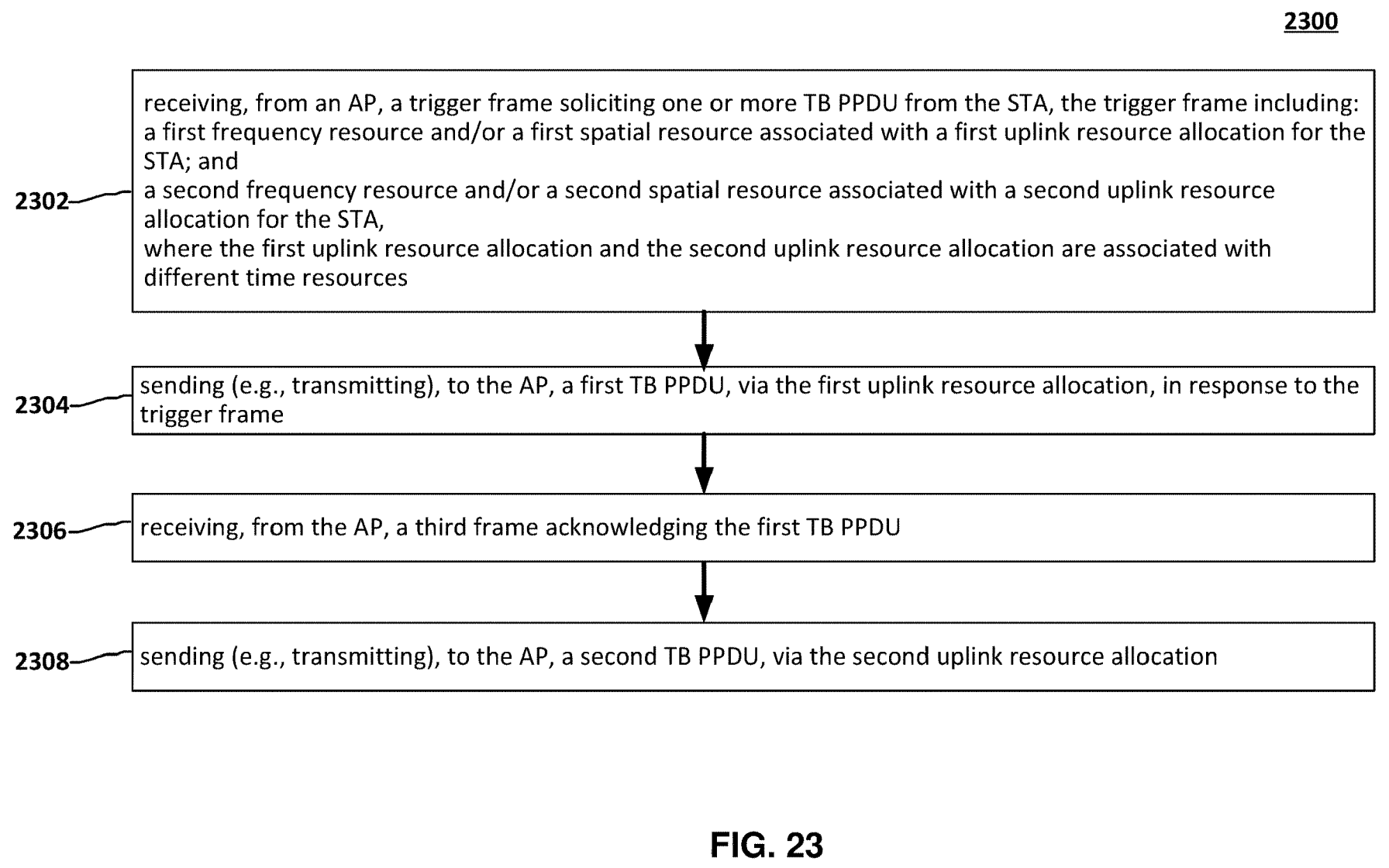

2300

2302 — receiving, from an AP, a trigger frame soliciting one or more TB PPDU from the STA, the trigger frame including:
a first frequency resource and/or a first spatial resource associated with a first uplink resource allocation for the STA; and
a second frequency resource and/or a second spatial resource associated with a second uplink resource allocation for the STA,
where the first uplink resource allocation and the second uplink resource allocation are associated with different time resources 2304 — sending (e.g., transmitting), to the AP, a first TB PPDU, via the first uplink resource allocation, in response to the trigger frame 2306 — receiving, from the AP, a third frame acknowledging the first TB PPDU 2308 — sending (e.g., transmitting), to the AP, a second TB PPDU, via the second uplink resource allocation

FIG. 23

TRIGGER FRAME FOR UPLINK RESOURCE ALLOCATION

CROSS-REFERENCE TO RELATED APPLICATIONS

This application claims the benefit of U.S. Provisional Application No. 63/395,441, filed on Aug. 5, 2022. The above referenced application is hereby incorporated by reference in its entirety.

BACKGROUND

A station (STA) may be allocated with multiple resources for multiple uplink transmissions in time. Communications between the STA and an access point (AP) may be needed for the resource allocation and/or transmission.

SUMMARY

The following summary presents a simplified summary of certain features. The summary is not an extensive overview and is not intended to identify key or critical elements.

An AP may communicate with a STA. An AP may send a frame such as trigger frame to one or more STAs for allocating uplink resources for a corresponding STA. A STA may have a plurality of uplink resource allocations for use in different time resources. Instead of using a plurality of trigger frames for the uplink resource allocations, one trigger frame may be used to indicate the current or immediate uplink resource allocation as well as the presence/absence of a subsequent uplink resource allocation. A field in the trigger frame and corresponding to the STA may be modified to comprise an indication of a presence/absence of a subsequent uplink resource allocation for the STA. The trigger frame may comprise indication(s) for one or more additional STAs. Uplink resource allocations for multiple uplink transmissions may be determined based on the indications in the trigger frame. For example, based on an absence of the subsequent uplink resource allocation for a second STA, a first STA may use different subsequent uplink resource allocations.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 18 shows an example method for uplink transmission based on (e.g., in response to) a trigger frame.

FIG. 19 shows an example method for uplink transmission based on (e.g., in response to) a trigger frame.

FIG. 20 shows an example method for uplink transmission based on (e.g., in response to) a trigger frame.

FIG. 21 shows an example method for uplink transmission based on (e.g., in response to) a trigger frame.

FIG. 23 shows an example method for uplink transmission based on (e.g., in response to) a trigger frame.

DETAILED DESCRIPTION

Figure 1:
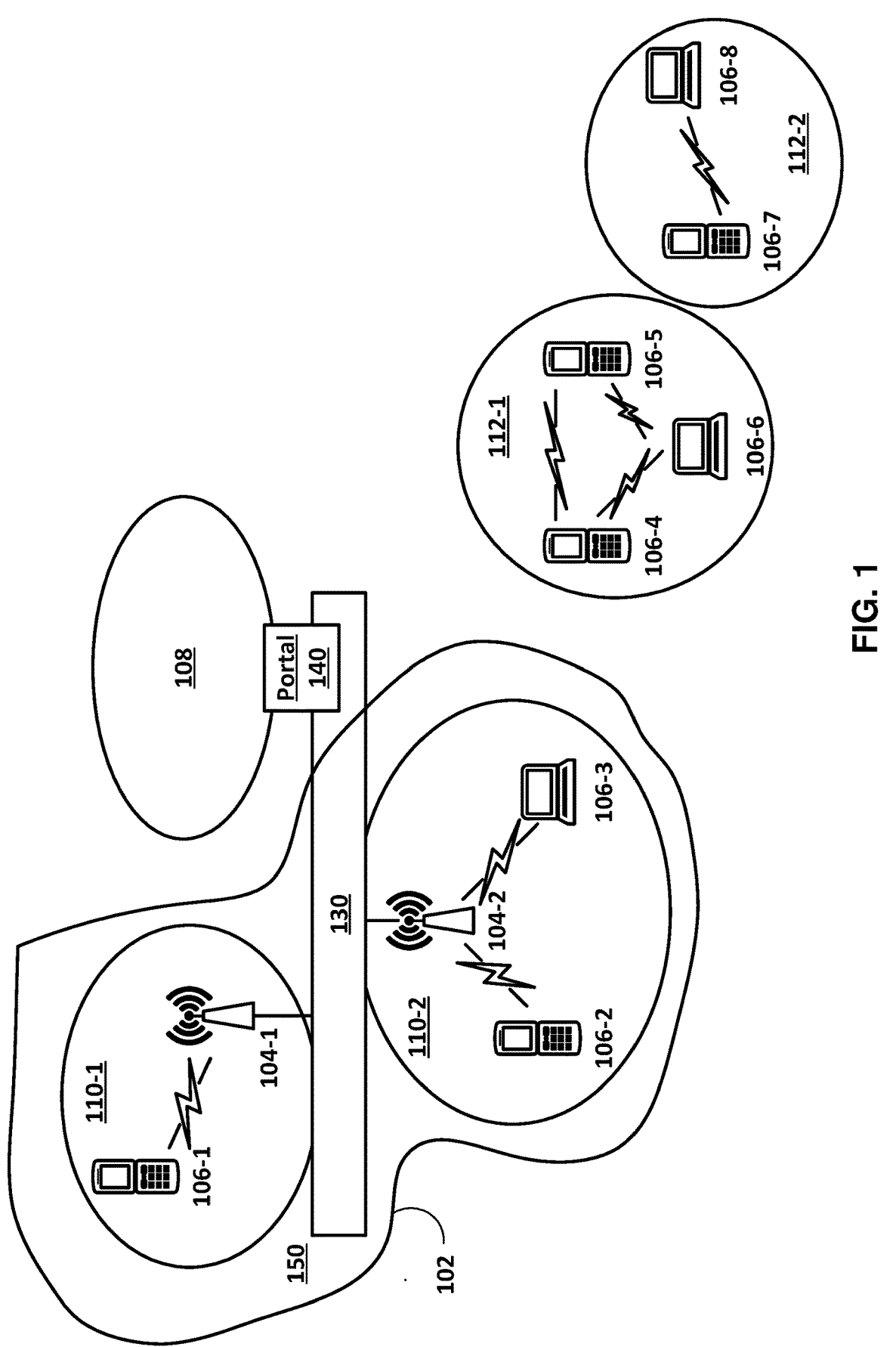
FIG. 1 shows example wireless communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1 shows example wireless communication networks. The example wireless communication networks may be a wireless local area network (WLAN) 102. The WLAN 102 may comprise an Institute of Electrical and Electronic Engineers (IEEE) 802.11 infra-structure network, or any other type of communication network. The WLAN 102 may comprise one or more basic service sets (BSSs) 110-1 and 110-2. BSSs 110-1 and 110-2 may each include a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS may be configured to perform an association procedure to communicate with each other.

The WLAN 102 may comprise a distribution system (DS) 130. DS 130 may be configured to connect BSS 110-1 and BSS 110-2. DS 130 may enable an extended service set (ESS) 150 by being configured to connect BSS 110-1 and BSS 110-2. The ESS 150 may be a network comprising one or more Aps (e.g., Aps 104-1 and AP 104-2) that may be connected via the DS 130. The APs included in ESS 150 may have the same service set identification (SSID). WLAN 102 may be coupled to one or more external networks. For example, WLAN 102 may be connected to another network 108 (e.g., 802.X) via a portal 140. Portal 140 may function as a bridge connecting DS 130 of WLAN 102 with the other network 108.

The example wireless communication networks may also, or alternatively, comprise one or more ad-hoc networks and/or independent BSSs (IB SS s). For example, FIG. 1 shows example IBSSs, where STAs 106-4, 106-5 and 106-6 may be configured to form a first IB SS 112-1 and STAs 106-7 and 106-8 may be configured to form a second IBSS 112-2. An ad-hoc network and/or IBSS is a network that includes a plurality of STAs without a centralized communication device, such as an AP. The plurality of STAs may be configured to communicate without requiring the presence of an AP. For example, the plurality of STAs in the IBSS may communicate with each other using peer-to-peer communication (e.g., not via an AP). IBSSs do not include a centralized management entity (e.g., an AP) configured to perform a centralized management. STAs within an IBSS are managed in a distributed manner. STAs forming an IBSS may be fixed and/or mobile. The STAs (e.g., STAs 106-4, 106-5, 106-6, 106-7, 106-8) may or may not be permitted to access the DS 130 to constitute a self-contained network.

A STA may comprise one or more layers in accordance with the open systems interconnection (OSI) model. For example, STAs may comprise a medium access control (MAC) layer that may be in accordance with a defined standard (e.g., an IEEE 802.11 standard, or any other standard). A physical (PHY) layer interface for a radio medium may include the APs and the non-AP stations (STAs). The STA may comprise one or more of a computing device, a mobile terminal, a wireless device, a wireless transmit/receive unit (WTRU), user equipment (UE), a mobile station (MS), a mobile subscriber unit, and/or a user device. For example, with respect to wireless LAN communications, a device participating in uplink multi-user, multiple input, multiple output (MU-MIMO) and/or uplink orthogonal frequency division multiple access (OFDMA) transmission may be referred to as a STA. STAs may not be limited to only participating in wireless LAN communications, and may perform other types of communications, operations, and/or procedures.

A frequency band to be used for communication may include multiple sub-bands and/or frequency channels. For example, messages (e.g., data packets, physical layer protocol data units (PPDUs)) conforming to the IEEE 802.11 standard (e.g., IEEE 802.11n, 802.11ac, 802.11ax, 802.11be, etc., standards) may be sent (e.g., transmitted) over the 2.4, 5 GHz, and/or 6 GHz bands. Each of the bands may be divided into multiple 20 MHz channels. PPDUs conforming to the IEEE 802.11 standard may be sent, for example, via a physical channel with a minimum bandwidth of 20 MHz. Larger channels may be formed through channel bonding. For example, the PPDUs may be sent via physical channels with bandwidths of 40 MHz, 80 MHz, 160 MHz, 520 MHz, or any other frequency greater than 20 MHz, by bonding together multiple 20 MHz channels.

A PPDU may be a composite structure that may comprise a PHY preamble and a payload in the form of a physical layer convergence protocol (PLCP) service data unit (PSDU). For example, the PSDU may comprise a PLCP preamble, a header, and/or one or more MAC protocol data units (MPDUs). Information indicated by the PHY preamble may be used by a receiving device to decode subsequent data in the PSDU. Preamble fields may be duplicated and sent in each of multiple component channels in a bonded channel, for example, if the PPDU is sent via the bonded channel. The PHY preamble may comprise both a legacy portion (e.g., a legacy preamble) and a non-legacy portion (e.g., a non-legacy preamble). The legacy preamble may be used for packet detection, automatic gain control and channel estimation, etc. The legacy preamble also may generally be used to maintain compatibility with legacy devices. The information provided in, and the format and coding of the non-legacy portion of the preamble may be based on the particular IEEE 802.11 protocol to be used to send the payload.

Figure 2:
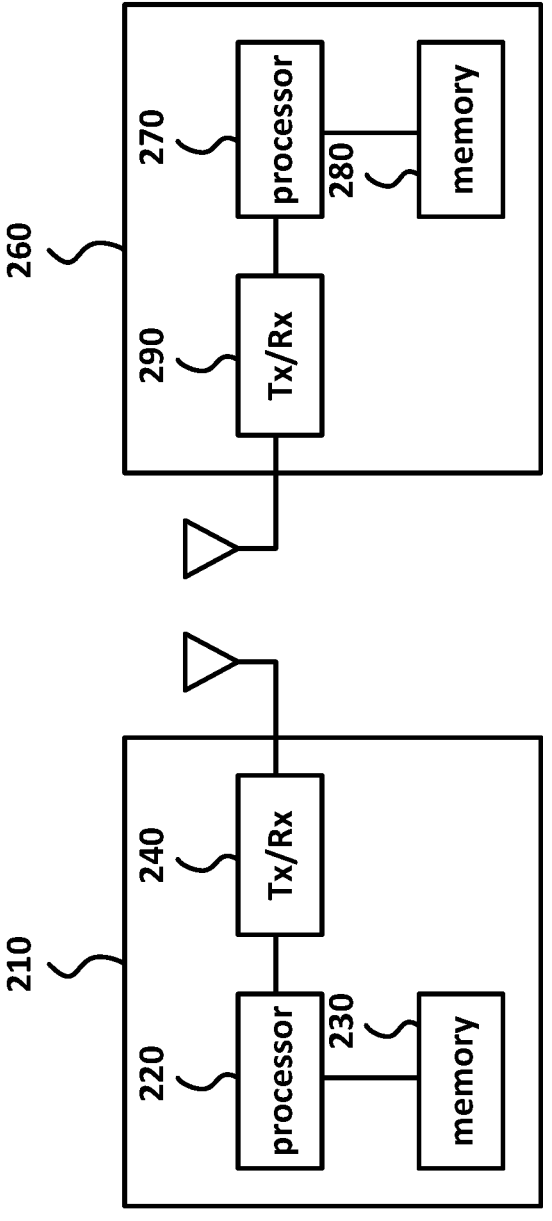
FIG. 2 shows example devices in a communication network.

FIG. 2 shows example devices in a communication network. The communication network of FIG. 2 may comprise multiple devices (e.g., communication devices 210 and 260). The communication devices 210 and 260 may perform various functions and procedures as described herein. For example, the communication device 210 may operate as an AP (e.g., an AP STA) and the communication device 260 may operate as a STA (e.g., a non-AP STA). The communication device 210 may operate as a STA (e.g., a non-AP STA) and the communication device 260 may operate as an AP (e.g., an AP STA). Also, or alternatively, the communication device 210 and the communication device 260 may both operate as STAs (e.g., a non-AP STAs) or may both operate as APs (e.g., AP STAs).

The communication device 210 may comprise at least one processor 220, a memory 230, and/or at least one transceiver (e.g., RF unit) 240. The communication device 260 may comprise at least one processor 270, memory 280, and/or at least one transceiver (e.g., RF unit) 290. The transceivers (e.g., transceivers 240, 290) may send/receive radio signals. The transceivers may operate as a PHY layer (e.g., a PHY layer in accordance with an IEEE 802.11 protocol, a $3^{rd}$ generation partnership project (3GPP) protocol, etc.). The processors (e.g., processors 220, 270) may operate as a PHY layer and/or MAC layer. The processors may be operatively connected to the transceivers, respectively. The communication devices 210 and/or 260 may be a multi-link device (MLD), that is a device capable of operating over multiple links (e.g., as defined by the IEEE 802.11be standard amendment). A MLD has multiple PHY layers. The multiple PHY layers may be implemented using one or more of transceivers 240 and/or 290. Processor 220 and/or 270 may implement functions of the PHY layer, the MAC layer, and/or a logical link control (LLC) layer of the corresponding communication devices 210 and/or 260.

The processors and/or the transceivers may comprise an application specific integrated circuit (ASIC), other chipset, logic circuit, and/or data processor. The memory (e.g., memory 230, 280) may include read-only memory (ROM), random access memory (RAM), flash memory, memory card, storage medium and/or other storage unit. The procedures described herein may be executed by modules that perform various functions described herein (e.g., in accordance with instructions stored in the memory). The modules can be stored in the memory and executed by the processor. The memory may be integrated with the processor or may be external to the processor. The memory may be operatively connected to the processor. The processor may implement the functions, processes and/or methods as described herein. For example, the processor 220 may be implemented to perform operations of the AP as described herein. For example, the processor 270 may be implemented to perform operations of the STA as described herein. The memory may store instructions that, when executed by one or more processors, cause the communication device to perform methods as described herein. For example, the memory may be a non-transitory computer-readable medium comprising instructions that, when executed by the one or more processors, cause the one or more processors to perform methods and operations described herein. For example, the memory 230 may store instructions that, when executed by the processor 220, cause the processor 220 to perform operations of the AP as described herein. For example, the memory 280 may store instructions that, when executed by the processor 270, cause the processor 270 to perform operations of the STA as described herein.

Figure 3:
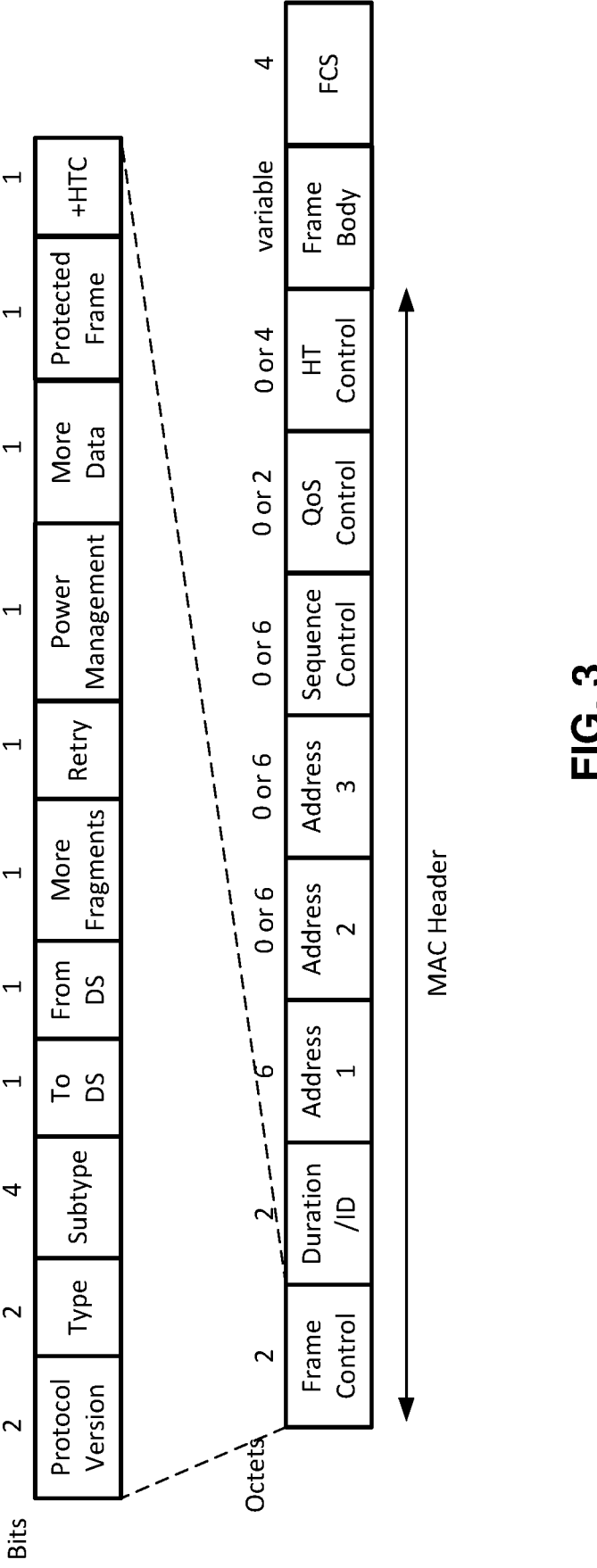
FIG. 3 shows an example format of a Medium Access Control (MAC) frame.

FIG. 3 shows an example format of a MAC frame. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using a frame check sequence (FCS) contained in the frame and may interpret certain fields from the MAC headers of all frames.

As shown in FIG. 3, a MAC frame may comprise a MAC header, a variable length frame body, and a frame check sequence (FCS). The MAC header may comprise a frame control field, an optional duration/ID field, address fields, an optional sequence control field, an optional QoS control field, and an optional high throughput (HT) control field.

The frame control field may comprise the following subfields: protocol version, type, subtype, To DS, From DS, more fragments, retry, power management, more data, protected frame, and +HTC (high throughput control). The protocol version subfield is invariant in size and placement across all revisions of the IEEE 802.11 standard. The value of the protocol version subfield may be 0 for MAC frames.

The type and subtype subfields together identify the function of the MAC frame. There are three frame types: control, data, and management. Each of the frame types has several defined subtypes. Bits within the subtype subfield may be used to indicate a specific modification of the basic data frame (subtype 0). For example, in data frames, the most significant bit (MSB) of the subtype subfield, bit 7 (B7) of the frame control field, is defined as the QoS subfield. For example, if the QoS subfield is set to 1, it may indicate a QoS subtype data frame, which is a data frame that contains a QoS control field in its MAC header. The second MSB of the subtype field, bit 6 (B6) of the frame control field, if set to 1 in data subtypes, may indicate a data frame that contain no frame body field.

The To DS subfield may indicate whether a data frame is destined to the distribution system (DS). The From DS subfield may indicate whether a data frame originates from the DS. The more fragments subfield may be set to 1 in all data or management frames that have another fragment to follow of the MAC service data unit (MSDU) or MAC management protocol data unit (MMPDU) carried by the MAC frame. The more fragments subfield may be set to 0 in all other frames in which the more fragments subfield is present.

The retry subfield may be set to 1 in any data or management frame that is a retransmission of an earlier frame. The retry subfield may be set to 0 in all other frames in which the retry subfield is present. A receiving STA may use this indication to aid in the process of eliminating duplicate frames. These rules may not apply for frames sent by a STA under a block agreement. The power management subfield may be used to indicate the power management mode of a STA.

The More Data subfield may indicate to a STA in power save (PS) mode that bufferable units (Bus) are buffered for that STA at the AP. The more data subfield may be valid in individually addressed data or management frames sent (e.g., transmitted) by an AP to a STA in PS mode. The more data subfield may be set to 1 to indicate that at least one additional buffered BU is present for the STA.

The protected frame subfield may be set to 1, for example, if the frame body field contains information that has been processed by a cryptographic encapsulation algorithm. The +HTC subfield may indicate that the MAC frame contains an HT control field.

The duration/ID field of the MAC header may indicate various contents depending on frame type and subtype and the QoS capabilities of the sending STA. For example, in control frames of the power save poll (PS-Poll) subtype, the duration/ID field may carry an association identifier (AID) of the STA that sent (e.g., transmitted) the frame in the 14 least significant bits (LSB), and the two most significant bits (MSB) may be both set to 1. In other frames sent by STAs, the duration/ID field may contain a duration value (in microseconds) which may be used by a recipient to update a network allocation vector (NAV). The NAV may be a counter that indicates to a STA an amount of time during which the STA must defer from accessing the shared medium.

There may be up to four address fields in the MAC frame format. These fields may be used to indicate the basic service set identifier (BSSID), source address (SA), destination address (DA), transmitting address (TA), and receiving address (RA). Certain frames might not contain some of the address fields. Certain address field usage may be specified by the relative position of the address field (1-4) within the MAC header, independent of the type of address present in that field. For example, the address 1 field always identifies the intended receiver(s) of the frame, and the address 2 field, where present, always identifies the transmitter of the frame.

The sequence control field may comprise two subfields, a sequence number subfield and a fragment number subfield. The sequence number subfield in data frames may indicate the sequence number of the MSDU (if not in an Aggregated MSDU (A-MSDU)) or A-MSDU. The sequence number subfield in management frames may indicate the sequence number of the frame. The fragment number subfield may indicate the number of each fragment of an MSDU or MMPDU. The fragment number may be set to 0 in the first or only fragment of an MSDU or MMPDU and may be incremented by one for each successive fragment of that MSDU or MMPDU. The fragment number may be set to 0 in a MAC protocol data unit (MPDU) containing an A-MSDU, or in an MPDU containing an MSDU or MMPDU that is not fragmented. The fragment number may remain constant in all retransmissions of the fragment.

The QoS control field may identify the traffic category (TC) or traffic stream (TS) to which the MAC frame belongs. The QoS control field may also indicate various other QoS related, A-MSDU related, and mesh-related information about the frame. This information can vary by frame type, frame subtype, and type of sending (e.g., transmitting) STA. The QoS control field is present in all data frames in which the QoS subfield of the subtype subfield is equal to 1.

The HT control field is present in QoS data, QoS null, and management frames as determined by the +HTC subfield of the frame control field. The frame body field is a variable length field that contains information specific to individual frame types and subtypes. It may comprise one or more MSDUs or MMPDUs. The minimum length of the frame body is 0 octets. The FCS field may contain a 32-bit Cyclic Redundancy Check (CRC) code. The FCS field value may be calculated over all of the fields of the MAC header and the frame body field.

Figure 4:
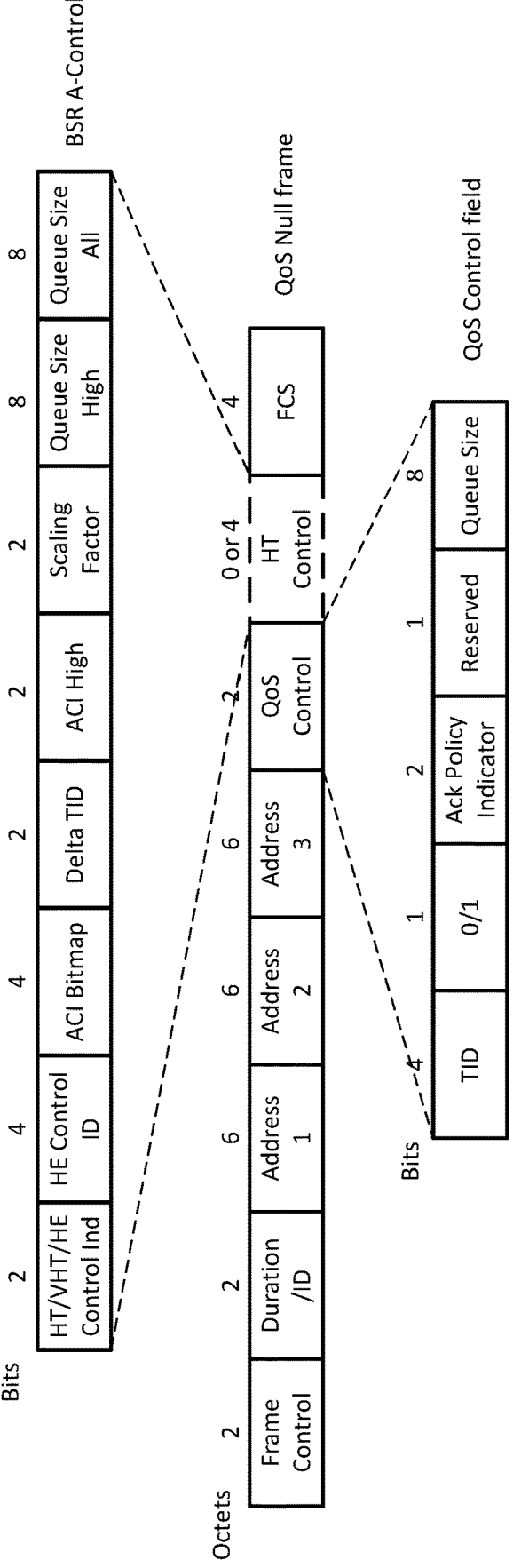
FIG. 4 shows an example of a Quality of Service (QoS) null frame indicating buffer status information.

FIG. 4 shows an example of a QoS null frame indicating buffer status information. A QoS null frame refers to a QoS data frame with an empty frame body. A QoS null frame may comprise a QoS control field and an optional HT control field which may contain a buffer status report (BSR) control subfield. A QoS null frame indicating buffer status information may be sent (e.g., transmitted) by a STA to an AP.

The QoS control field may comprise a traffic identifier (TID) subfield, an ack policy indicator subfield, and a queue size subfield (or a transmission opportunity (TXOP) duration requested subfield). The TID subfield may identify the TC or TS of traffic for which a TXOP is being requested, through the setting of the TXOP duration requested or queue size subfield. The encoding of the TID subfield depends on the access policy (e.g., allowed value 0 to 7 for enhanced distributed channel access (EDCA) access policy to identify user priority for either TC or TS). The ack policy indicator subfield, together with other information, may identify the acknowledgment policy followed upon delivery of the MPDU (e.g., normal ack, implicit block ack request, no ack, block ack, etc.)

The queue size subfield may be an 8-bit field that indicates the amount of buffered traffic for a given TC or TS at the STA for transmission to the AP identified by the receiver address of the frame containing the subfield. The queue size subfield may be present in QoS null frames sent by a STA, for example, if bit 4 of the QoS control field is set to 1. The AP may use information contained in the queue size subfield to determine the TXOP (transmission opportunity) duration assigned to the STA or to determine the uplink (UL) resources assigned to the STA.

In a frame sent by or to a non-High Efficiency (non-HE) STA, the following rules may apply to the queue size value:

The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field;

A queue size value of 0 is used solely to indicate the absence of any buffered traffic in the queue used for the specified TID;

A queue size value of 254 is used for all sizes greater than 64 768 octets;

A queue size value of 255 is used to indicate an unspecified or unknown size.

In a frame sent by an HE STA to an HE AP, the following rules may apply to the queue size value:

The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field;

The queue size subfield comprises a scaling factor subfield in bits B14-B15 of the QoS control field and an unscaled value, UV, in bits B8-B13 of the QoS control field. The scaling factor subfield provides the scaling factor, on.

A STA may obtain the queue size, QS, from a received QoS control field, which contains a scaling factor, SF, and an unscaled value, UV, as follows:

QS=

$16 \times UV$, if SF is equal to 0;

$1024 + 256 \times UV$, if SF is equal to 1;

$17408 + 2048 \times UV$, if SF is equal to 2;

$148480 + 32768 \times$, if SF is equal to 3 and UV is less than 62;

$>2147328$, if SF equal to is 3 and UV is equal to 62;

Unspecified or Unknown, if SF is equal to 3 and UV is equal to 63.

The TXOP duration requested subfield, which may be included instead of the queue size subfield, may indicate the duration, in units of 32 microseconds (us), that the sending STA determines it needs for its next TXOP for the specified TID. The TXOP duration requested subfield may be set to 0 to indicate that no TXOP is requested for the specified TID in the current service period (SP). The TXOP duration requested subfield may be set to a nonzero value to indicate a requested TXOP duration in the range of 32 us to 8160 us in increments of 32 us.

The HT control field may comprise a BSR control subfield which may contain buffer status information used for UL MU operation. The BSR control subfield may be formed by a control ID, an access category index (ACI) bitmap subfield, a delta TID subfield, an ACI high subfield, a scaling factor subfield, a queue size high subfield, and a queue size all subfield of the HT control field.

The ACI bitmap subfield may indicate the access categories for which buffer status is reported (e.g., B0: best effort (AC_BE), B1: background (AC_BK), B2: video (AC_VI), B3: voice (AC_VO), etc.). Each bit of the ACI bitmap subfield may be set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, may indicate the number of TIDs for which the STA is reporting the buffer status. The ACI high subfield may indicate the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO. The scaling factor subfield may indicate the unit SF, in octets, of the queue size high and queue size all subfields.

The queue size high subfield may indicate the amount of buffered traffic, in units of SF octets, for the AC identified by the ACI high subfield, that is intended for the STA identified by the receiver address of the frame containing the BSR control subfield. The queue size all subfield may indicate the amount of buffered traffic, in units of SF octets, for all Acs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields may indicate that the amount of buffered traffic is greater than $254 \times SF$ octets. A queue size value of 255 in the queue size high and queue size all subfields may indicate that the amount of buffered traffic is an unspecified or unknown size. The queue size value of QoS data frames containing fragments may remain constant even if the amount of queued traffic changes as successive fragments are sent (e.g., transmitted).

MAC service may provide peer entities with the ability to exchange MSDUs. To support this service, a local MAC may use the underlying PHY-level service to transport the MSDUs to a peer MAC entity. Such asynchronous MSDU transport may be performed on a connectionless basis.

Figure 5:
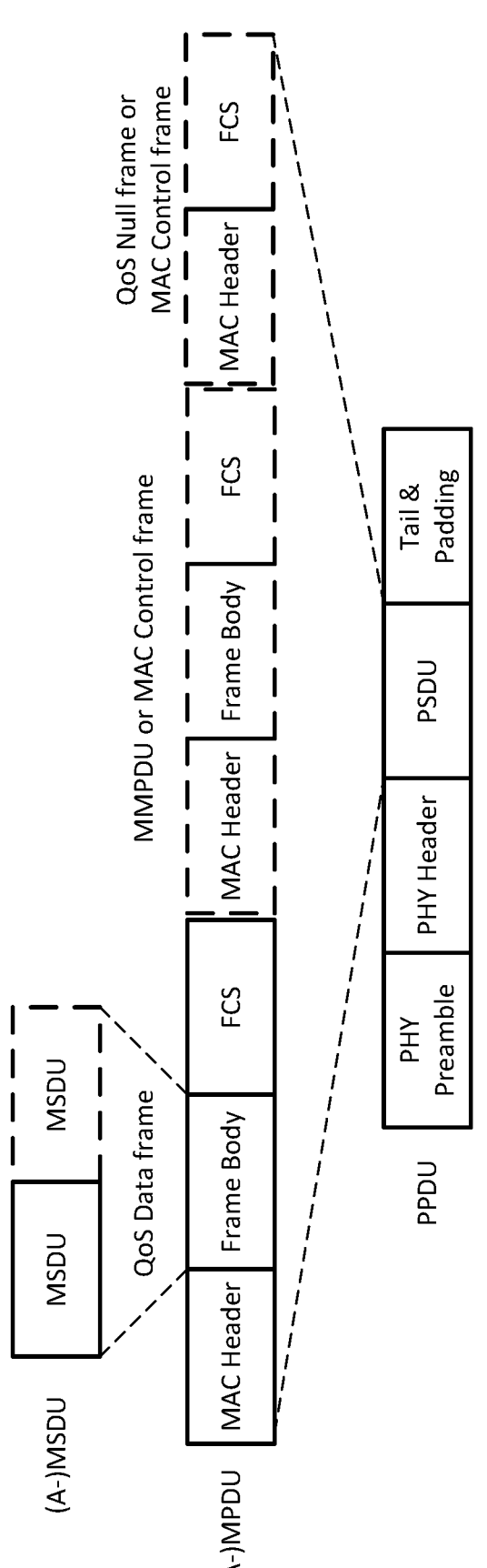
FIG. 5 shows an example format of a physical layer (PHY) protocol data unit (PPDU).

FIG. 5 shows an example format of a PPDU. As shown, the PPDU may comprise a PHY preamble, a PHY header, a PSDU, and tail and padding bits.

The PSDU may comprise one or more MPDUs, such as a QoS data frame, an MMPDU, a MAC control frame, or a QoS null frame. For an MPDU carrying a QoS data frame, the frame body of the MPDU may comprise a MSDU or an A-MSDU. By default, MSDU transport is on a best-effort basis. That is, there is no guarantee that a sent (e.g., transmitted) MSDU will be delivered successfully. The QoS facility may use a traffic identifier (TID) to specify differentiated services on a per-MSDU basis.

A STA may differentiate MSDU delivery according to designated traffic category (TC) or traffic stream (TS) of individual MSDUs. The MAC sublayer entities may determine a user priority (UP) for an MSDU based on a TID value provided with the MSDU. The QoS facility may support eight UP values. The UP values may range from 0 to 7 and may form an ordered sequence of priorities, with 1 being the lowest value, 7 the highest value, and 0 falling between 2 and 3.

An MSDU with a particular UP may belong to a traffic category with that UP. The UP may be provided with each MSDU at the medium access control service access point (MAC SAP) directly in a UP parameter. An aggregate MPDU (A-MPDU) may comprise MPDUs with different TID values.

A STA may deliver buffer status reports (BSRs) to assist an AP in allocating UL MU resources. The STA may either implicitly deliver BSRs in the QoS control field or BSR control subfield of any frame sent (e.g., transmitted) to the AP (unsolicited BSR) or explicitly deliver BSRs in a frame sent to the AP, for example, based on (e.g., in response to) a BSRP Trigger frame (solicited BSR).

The buffer status reported in the QoS control field may comprise a queue size value for a given TID. The buffer status reported in the BSR control field may comprise an ACI bitmap, delta TID, a high priority AC, and two queue sizes. A STA may report buffer status to the AP, in the QoS control field, of sent (e.g., transmitted) QoS null frames and QoS data frames and, in the BSR control subfield (if present), of sent (e.g., transmitted) QoS null frames, QoS data frames, and management frames as defined below.

The STA may report the queue size for a given TID in the queue size subfield of the QoS control field of sent (e.g., transmitted) QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of sent (e.g., transmitted) frames if the AP has indicated its support for receiving the BSR control subfield. A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC. A HE STA may report the queue size for ACs indicated by the ACI bitmap subfield in the queue size all subfield of the BSR control subfield. The STA may set the queue size all subfield to 255 to indicate an unknown/unspecified BSR for those ACs.

Figure 6:
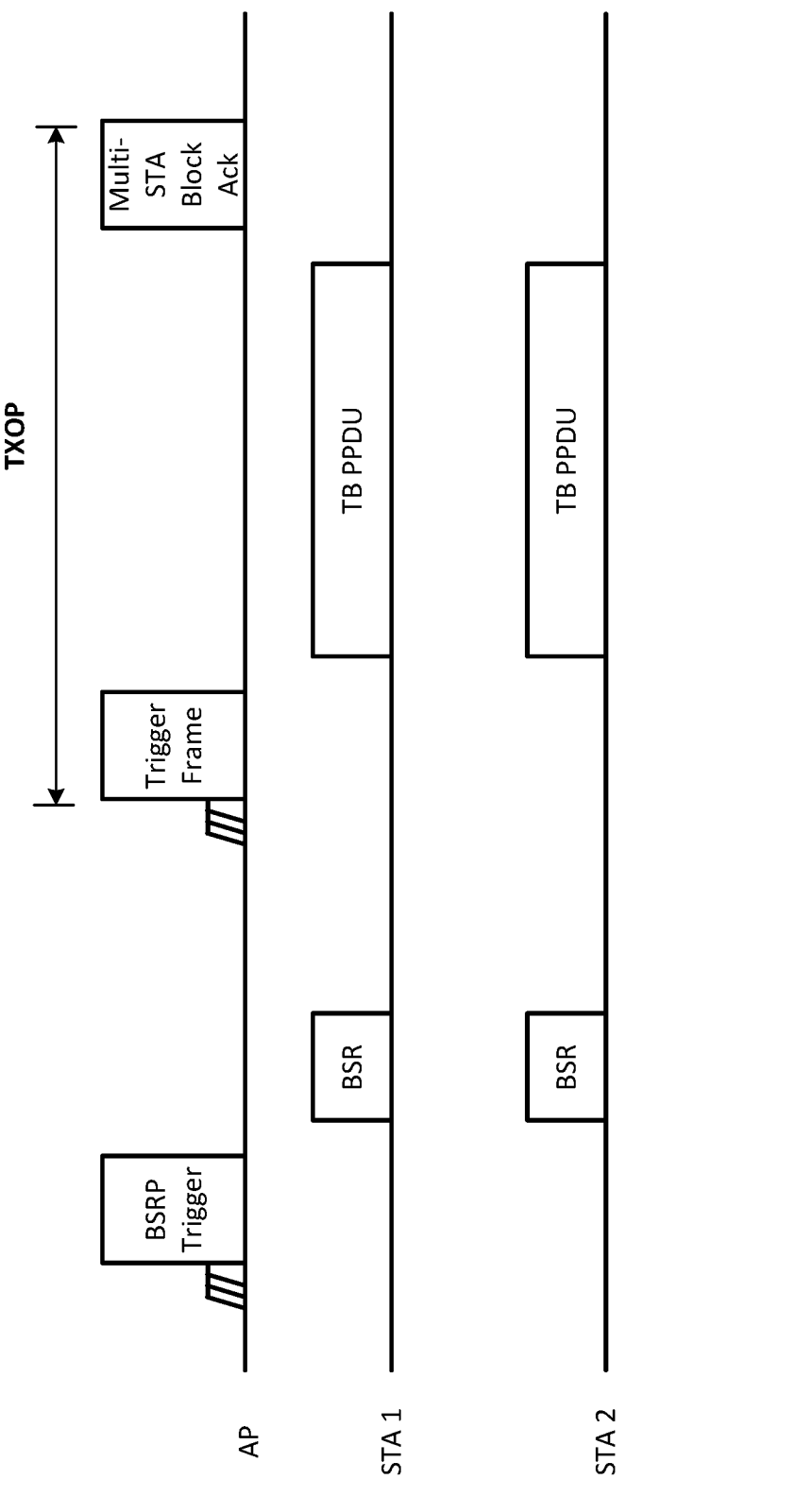
FIG. 6 shows an example that comprises buffer status reporting by STAs, scheduling by an AP of uplink multi-user (MU) transmissions, and transmission of scheduled uplink transmissions by the STAs.

FIG. 6 shows an example that comprises buffer status reporting by STAs, scheduling by an AP of uplink multi-user (MU) transmissions, and transmission of scheduled uplink transmissions by the STAs. The AP may solicit one or more associated STAs (e.g., STA 1 and STA 2) for buffer status, for example, by sending a trigger frame (e.g., buffer status report poll (BSRP) trigger frame). Based on (e.g., upon) receiving the trigger frame (e.g., BSRP trigger frame), the one or more associated STAs (e.g., STA 1 and/or STA 2) may each generate a frame (e.g., trigger-based (TB) PPDU), for example, if the trigger frame (e.g., the BSRP trigger frame) contains, in a user information (e.g., User Info) field, the 12 LSBs of the STA's AID.

The one or more associated STAs (e.g., STA 1 and/or STA 2) may each comprise in the TB PPDU one or more QoS null frames. The one or more QoS null frames may contain one or more QoS control fields or one or more BSR control subfields.

As described herein, a QoS control field may comprise a queue size subfield for a TID for which the STA has a queue size to report to the AP. For example, STA 1 may respond to the BSRP trigger frame from the AP by sending (e.g., transmitting) an A-MPDU including multiple QoS null frames. The QoS null frames each may indicate, in its respective QoS control field, a queue size for a respective TID, for example, TID 0 and TID 2. Similarly, STA 2 may respond to the BSRP trigger frame by sending (e.g., transmitting) an MPDU including a QoS null frame, which indicates a queue size for TID 2 in its QoS control field.

A BSR control subfield may comprise a queue size all subfield indicating the queue size for the ACs, indicated by the ACI bitmap subfield, for which the STA has a queue size to report to the AP, for example, if the AP has indicated its support for receiving the BSR control subfield. The STA may set a delta TID, a scaling factor, an ACI high, and the queue size high subfields of the BSR Control subfield.

The AP may send (e.g., transmit) a trigger frame (e.g., a basic trigger frame) to allocate resources (e.g., UL MU resources) to one or more STAs (e.g., STA 1 and STA 2), for example, based on (e.g., upon) receiving the BSRs from the one or more STAs (e.g., STA 1 and STA 2). The one or more STAs may send (e.g., transmit) a TB PPDU, for example, based on (e.g., in response to) the trigger frame. For example, STA 1 may send (e.g., transmit) a TB PPDU containing QoS data frames with TID 0 and TID 2, and STA 2 may send (e.g., transmit) a TB PPDU containing one or more QoS data frame(s) with TID 2. The AP may acknowledge the sent (e.g., transmitted) TB PPDUs from the one or more STAs (e.g., STA 1 and STA 2) by sending a frame (e.g., multi-STA block ack frame).

Figure 7:
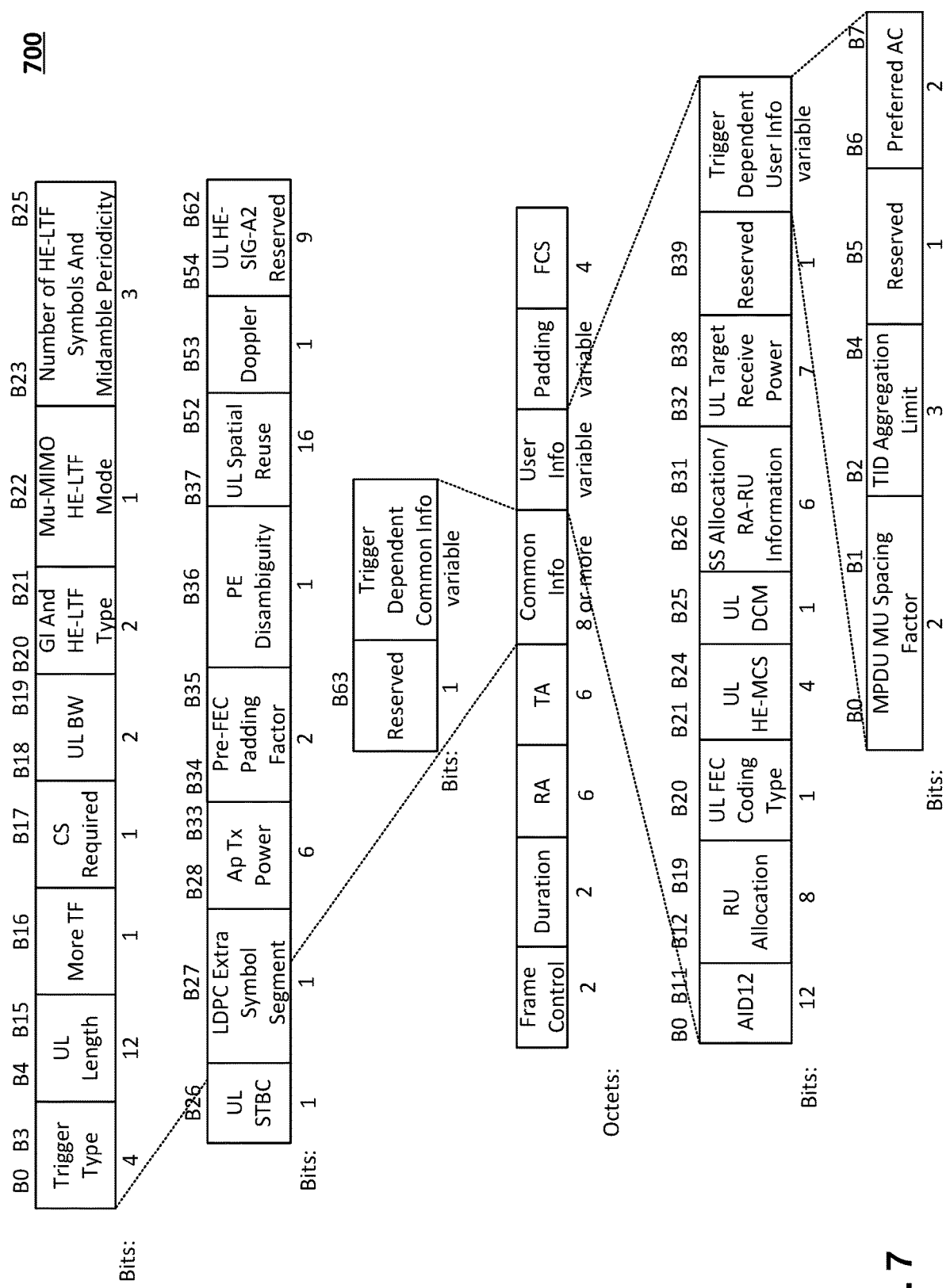
FIG. 7 shows an example format of a trigger frame.

FIG. 7 shows an example format of a trigger frame. Trigger frame 700 may correspond to a basic trigger frame as defined in the existing IEEE 802.11ax standard amendment. Trigger frame 700 may be used by an AP to allocate resources for and solicit one or more TB PPDU transmissions from one or more STAs. Trigger frame 700 may also carry other information required by a responding STA to send (e.g., transmit) a TB PPDU to the AP.

As shown in FIG. 7, trigger frame 700 may comprise a Frame Control field, a Duration field, a receiver address (RA) field, a transmitter address (TA) field, a Common Info field, a User Info field, a Padding field, and an FCS field. The Frame Control field may comprise the following subfields:

protocol version, type, subtype, To DS, From DS, more fragments, retry, power management, more data, protected frame, and +HTC.

The Duration field may indicate various contents depending on frame type and subtype and the QoS capabilities of the sending STA. For example, in control frames of the power save poll (PS-Poll) subtype, the Duration field may carry an association identifier (AID) of the STA that sent (e.g., transmitted) the frame in the 14 least significant bits (LSB), and the 2 most significant bits (MSB) may both be set to 1. In other frames sent by STAs, the Duration field may contain a duration value (in microseconds) which is used by a recipient to update a network allocation vector (NAV).

The RA field is the address of the STA that is intended to receive the incoming transmission from the transmitting station. The TA field is the address of the STA sending (e.g., transmitting) trigger frame 700, for example, if trigger frame 700 is addressed to STAs that belong to a single BSS. The TA field is the sent (e.g., transmitted) BSSID, for example, if the trigger frame 700 is addressed to STAs from at least two different BSSs of the multiple BSSID set.

The Common Info field may specify a trigger frame type of trigger frame 700, a transmit power of trigger frame 700 in dBm, and several key parameters of a TB PPDU that is sent (e.g., transmitted) by a STA, for example, based on (e.g., in response to) trigger frame 700. The trigger frame type of a trigger frame used by an AP to receive QoS data using UL MU operation is referred to as a basic trigger frame.

The User Info field may contain a User Info field per STA addressed in trigger frame 700. The per STA User Info field may comprise, among others, an AID subfield, an RU Allocation subfield, a Spatial Stream (SS) Allocation subfield, an MCS subfield to be used by a STA in a TB PPDU sent (e.g., transmitted), for example, based on (e.g., in response to) trigger frame 700, and a Trigger Dependent User Info subfield. The Trigger Dependent User Info subfield can be used by an AP to specify a preferred access category (AC) per STA. The preferred AC may set the minimum priority AC traffic that can be sent by a participating STA. The AP may determine the list of participating STAs, along with the BW, MCS, RU allocation, SS allocation, Tx power, preferred AC, and maximum duration of the TB PPDU per participating STA.

The Padding field is optionally present in trigger frame 700 to extend the frame length to give recipient STAs enough time to prepare a response for transmission one short interframe spacing (SIFS), for example, after the frame is received. The Padding field, if present, is at least two octets in length and may be set to all 1s. The FCS field may be used by a STA to validate a received frame and to interpret certain fields from the MAC headers of a frame.

Figure 8:
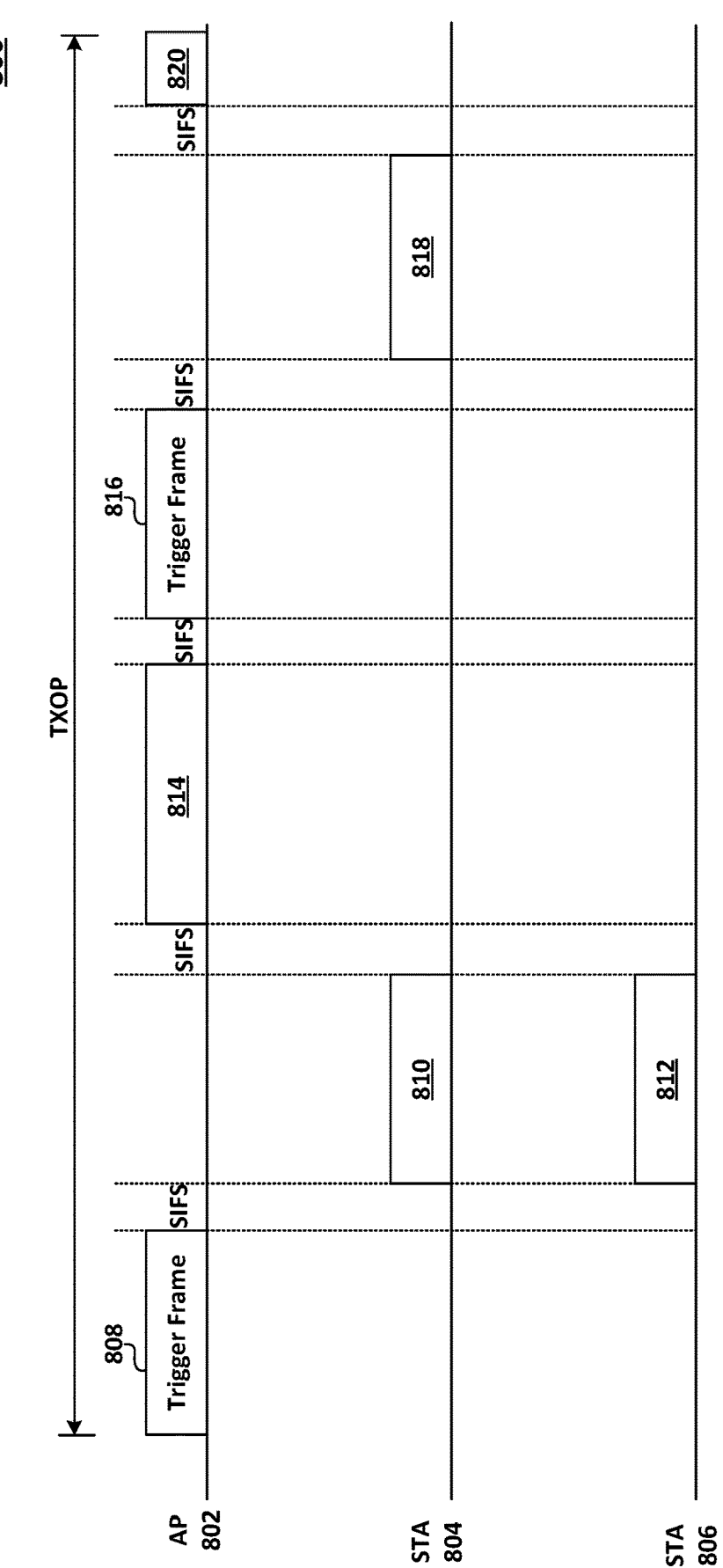
FIG. 8 shows an example of uplink transmission based on (e.g., in response to) a trigger frame.

FIG. 8 shows an example of uplink transmission, for example, based on (e.g., in response to) a trigger frame. As shown in FIG. 8, example 800 may comprise an AP 802, a STA 804, and a STA 806. STAs 804 and 806 may be associated with AP 802. AP 802 may obtain a TXOP and send (e.g., transmit) a basic trigger frame 808 to STA 804 and STA 806. Trigger frame 808 may identify STAs 804 and 806 and may allocate a first resource (e.g., resource unit (RU) and/or spatial stream) to STA 804 and a second resource to STA 806. STA 804 may send (e.g., transmit), via the first resource, a TB PPDU 810 to AP 802, and STA 806 may send (e.g., transmit), via the second resource, a TB PPDU 812 to AP 802, for example, based on (e.g., in response to) trigger frame 808. STAs 804 and 806 may send (e.g., transmit) TB PDDUs 810 and 812 one SIFS, for example, after reception of trigger frame 808.

Assuming all MPDUs contained in TB PDDUs 810 and 812 are successfully received, AP 802 may acknowledge TB PDDUs 810 and 812 by sending (e.g., transmitting) a multi-STA block acknowledgment (BlockAck or BA) frame 814 to STAs 804 and 806. AP 802 may send (e.g., transmit) multi-STA BA frame 814 one SIFS, for example, after reception of TB PPDUs 810 and 812. AP 802 may acknowledge TB PDDUs 810 and 812 by sending (e.g., transmitting) a separate BA frame to each of STAs 804 and 806.

In at least some wireless communications (e.g., such as in IEEE 802.11ax/be standard amendments), to allocate to a STA, using a trigger frame, multiple resources for multiple uplink transmissions in time (e.g., an initial transmission and one or more subsequent transmissions or re-transmissions), an AP must send (e.g., transmit) multiple trigger frames to the STA each allocating a respective resource for a respective uplink transmission. For example, referring to FIG. 8, to allocate a further resource to STA 804 (e.g., after transmission of TB PDDU 810, via the first resource, by STA 804), AP 802 would need to send (e.g., transmit) a further trigger frame 816 identifying STA 804 and assigning the further resource to STA 804. STA 804 may then send (e.g., transmit) a further TB PDDU 818, via the assigned further resource, to AP 802. STA 804 may send (e.g., transmit) TB PPDU 818 one SIFS, for example, after receiving trigger frame 816. AP 802 may acknowledge TB PDDU 818 by sending (e.g., transmitting) a BA frame 820 to STA 804. Sending multiple trigger frames may result in increased control overhead. In at least some examples, the AP may know that a STA that allocated (e.g., in a trigger frame) a resource for a first uplink transmission may continue using the same resource (or another resource allocated to another STA) for a subsequent uplink transmission. Sending multiple trigger frames might not be necessary.

As described herein, an AP may send a trigger frame to one or more STAs. This trigger frame may comprise an indication as to whether a STA may continue using the same uplink resource allocated to the STA (or to another STA) in the trigger frame for a subsequent uplink transmission. A field (e.g., a user info field) corresponding to the STA in the trigger frame may be modified to comprise an indication of presence/absence of a subsequent resource allocation for the STA. As a result, the STA may be allocated for the subsequent transmission without the need to transmit another trigger frame. For example, the trigger frame 816 as shown in FIG. 8 and/or the SIFS following the trigger frame 816 may not be needed, for example, if the trigger frame 808 further comprises indications of resource allocations associated with the TB PDDU 818. In examples such as if a subsequent transmission comprises resending (e.g., retransmitting) the same data, reliability may be increased. By eliminating the need to send multiple trigger frames, advantages may result such as reduced latency and/or increased system efficiency.

Figure 9:
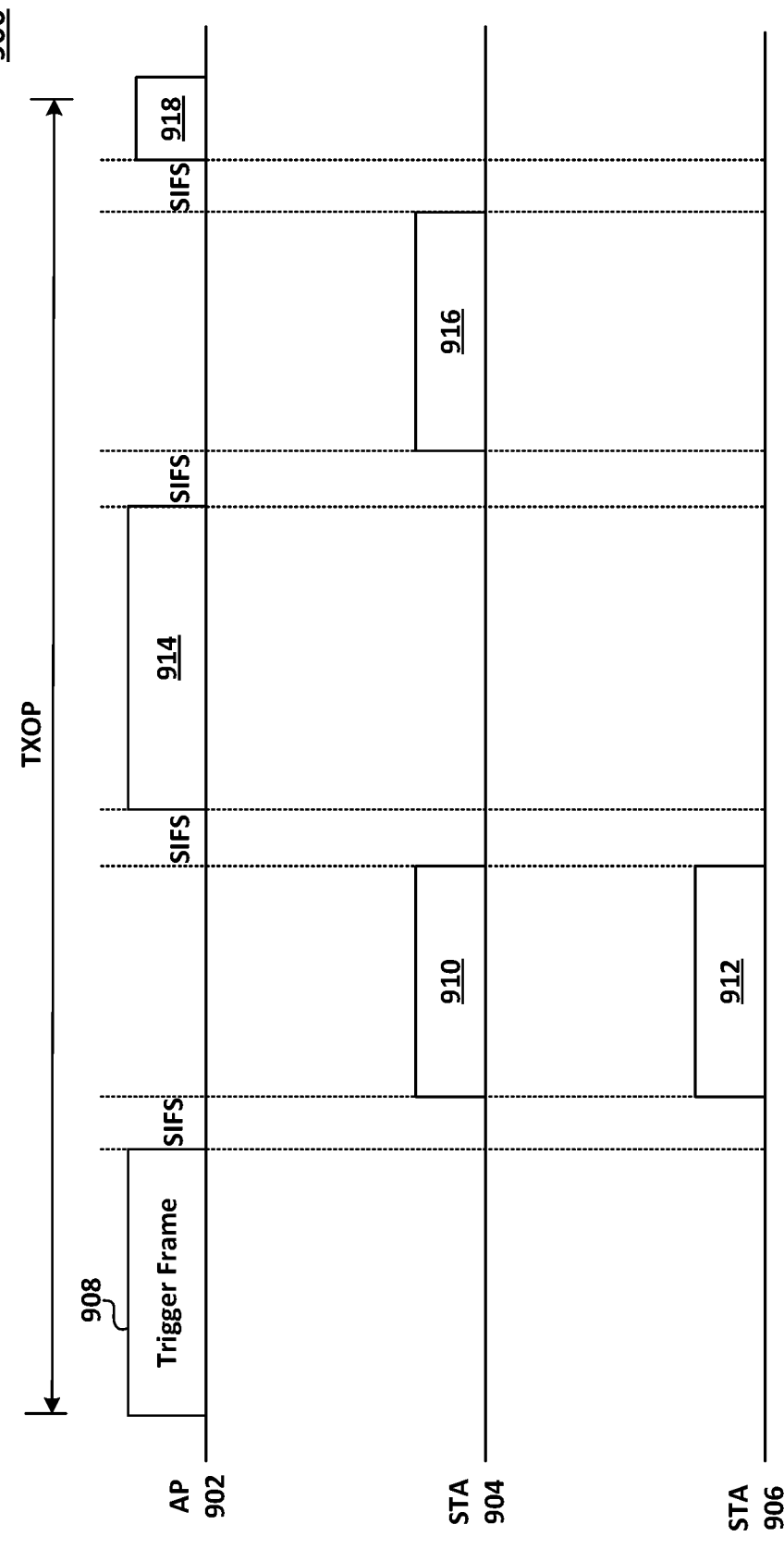
FIG. 9 shows an example of uplink transmission based on (e.g., in response to) a trigger frame.

FIG. 9 shows an example of uplink transmission, for example, based on (e.g., in response to) a trigger frame. The example 900 may comprise an AP and one or more associated STAs. For example, as shown in FIG. 9, example 900 may comprise an AP 902, a STA 904, and a STA 906. STAs 904 and 906 may be associated with AP 902.

The AP may send a trigger frame to the one or more associated STAs. For example, AP 902 may obtain a TXOP and send (e.g., transmit) a trigger frame 908 to STAs 904 and 906. Trigger frame 908 may be a frame that solicits one or more trigger-based (TB) physical layer (PHY) protocol data unit (PPDU) from one or more of STAs 904 and 906.

The trigger frame may comprise one or more indications associated with uplink resource allocation for the one or more associated STAs. For example, trigger frame 908 may comprise a first indication associated with a first uplink resource allocation for the STA 904; and a second indication associated with a second uplink resource allocation for STA 904. An uplink resource allocation may comprise a frequency resource and/or a spatial resource. The uplink resource allocation is associated with a time resource associated with a transmission interval.

A frequency resource may comprise a resource unit (RU), which may comprise one or more tones or frequency subcarriers. A spatial resource may comprise one or more spatial dimensions. A spatial dimension may be created by the use of multiple antennas at both ends of a communication link. A spatial stream may comprise a bit stream or modulated symbols sent (e.g., transmitted) over a respective spatial dimension.

Uplink resource allocations in the trigger frame may be associated with different time resources. For example, the first uplink resource allocation and the second resource uplink allocation contained in trigger frame 908 are associated with different time resources. The first uplink resource allocation is associated with a first time resource, and the second uplink resource allocation is associated with a second time resource. The different time resources may be associated with different transmission intervals. For example, the first time resource may be associated with a first transmission interval, and the second time resource may be associated with a second transmission interval different from the first transmission interval. The first/second transmission interval may correspond in duration to a time division duplex (TDD) slot as defined in the IEEE 802.11 standard. The first/second transmission interval may correspond in duration to a portion of a TDD slot as defined in the IEEE 802.11 standard.

Each associated STA may send a frame, via a corresponding uplink resource allocation, to the AP, for example, based on the trigger frame. The frame may comprise a TB PPDU. The time resource associated with the uplink resource allocation may start at a time spacing from an end of transmission of the trigger frame. For example, STA 904 may send (e.g., transmit) a frame 910, via the first uplink resource allocation, to AP 902, for example, based on (e.g., in response to) trigger frame 908. Frame 910 may comprise a TB PPDU. The first time resource associated with the first uplink resource allocation may start at a first time spacing from an end of transmission of trigger frame 908. As shown in FIG. 9, the first time spacing equals a SIFS duration, and frame 910 is sent (e.g., transmitted) one SIFS, for example, after transmission of trigger frame 908.

Trigger frame 908 may comprise a third indication associated with a third uplink resource allocation for STA 906. As shown in FIG. 9, the third uplink resource allocation may be associated with a same time resource as the first uplink resource allocation allocated to STA 904. The third uplink resource allocation may be associated with a different frequency resource and/or a different spatial resource than the first uplink resource allocation. The third uplink resource allocation may be associated with a same time resource as the second uplink resource allocation allocated to STA 904. The third uplink resource allocation may be associated with a different frequency resource and/or a different spatial resource than the second uplink resource allocation.

STA 906 may send (e.g., transmit) a frame 912, via the third uplink resource allocation, to AP 902, for example, based on (e.g., in response to) trigger frame 908. Frame 912 may comprise a TB PPDU. The time resource associated with the third resource allocation may start at a third time spacing from an end of transmission of trigger frame 908. As shown in FIG. 9, the third time spacing may equal a SIFS duration, and frame 912 may be sent (e.g., transmitted) one SIFS, for example, after transmission of trigger frame 908.

AP 902 may send (e.g., transmit) a frame 914, for example, after receiving frames 910 and 912 from STAs 904 and 906 respectively. Frame 914 may comprise a BlockAck (BA) frame or a multi-STA BA frame. Frame 914 may be sent (e.g., transmitted) one SIFS, for example, after reception of frames 910 and 912 by AP 902.

STA 904 may send (e.g., transmit) a frame 916, via the second uplink resource allocation, to AP 902, for example, based on (e.g., upon) receiving frame 914 from AP 902. Frame 916 may comprise a TB PPDU. The second time resource associated with the second uplink resource allocation may start at a second time spacing from an end of transmission of frame 914 sent (e.g., transmitted) by AP 902, for example, based on (e.g., in response to) frames 910 and 912. As shown in FIG. 9, the second time spacing equals a SIFS duration, and frame 916 is sent (e.g., transmitted) one SIFS, for example, after reception of frame 914 by STA 904.

AP 902 may send (e.g., transmit) a frame 918 to STA 904, for example, based on (e.g., in response to) frame 916. Frame 918 may be a BA frame for acknowledging frame 916.

Figure 10:
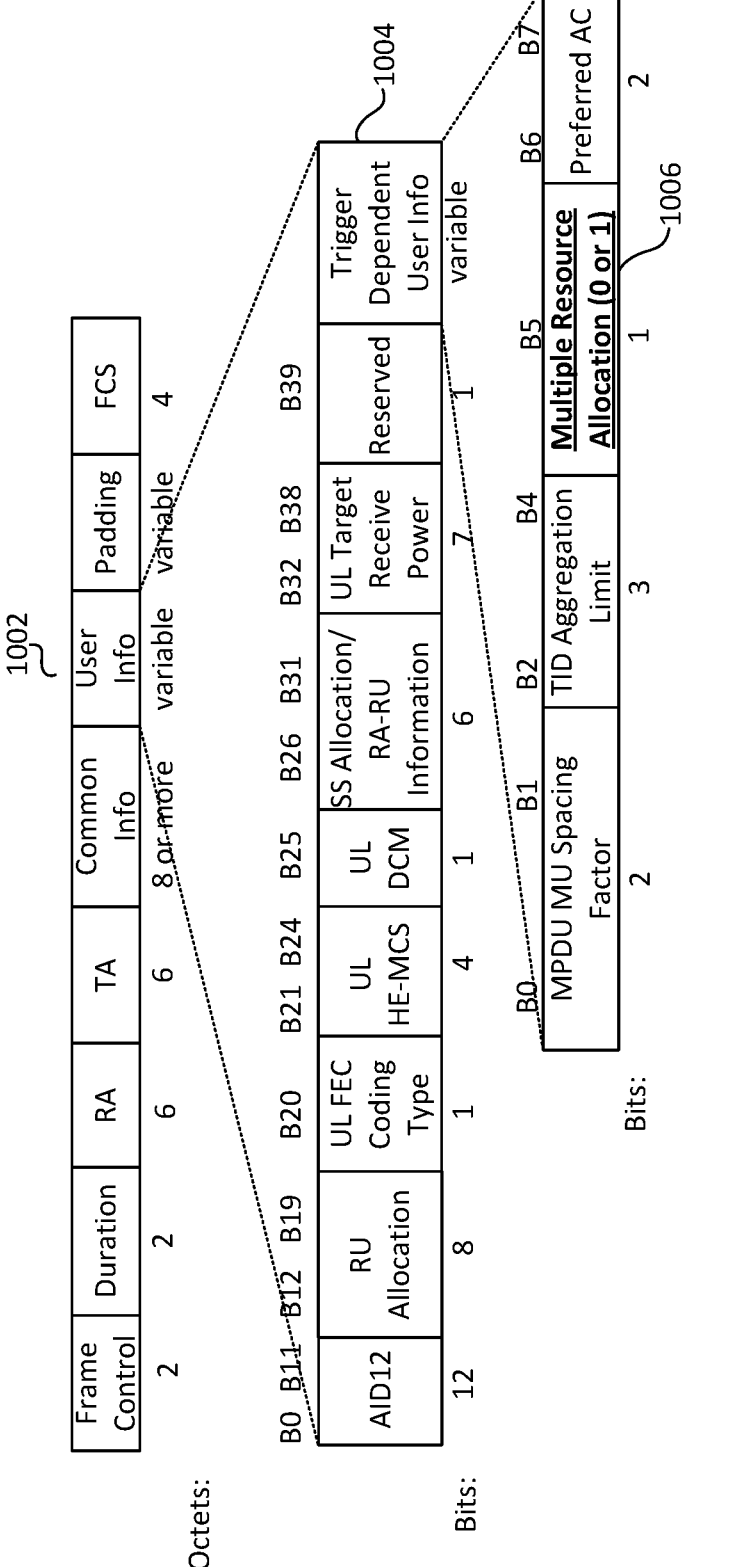
FIG. 10 shows an example format of a trigger frame.
Figure 11:
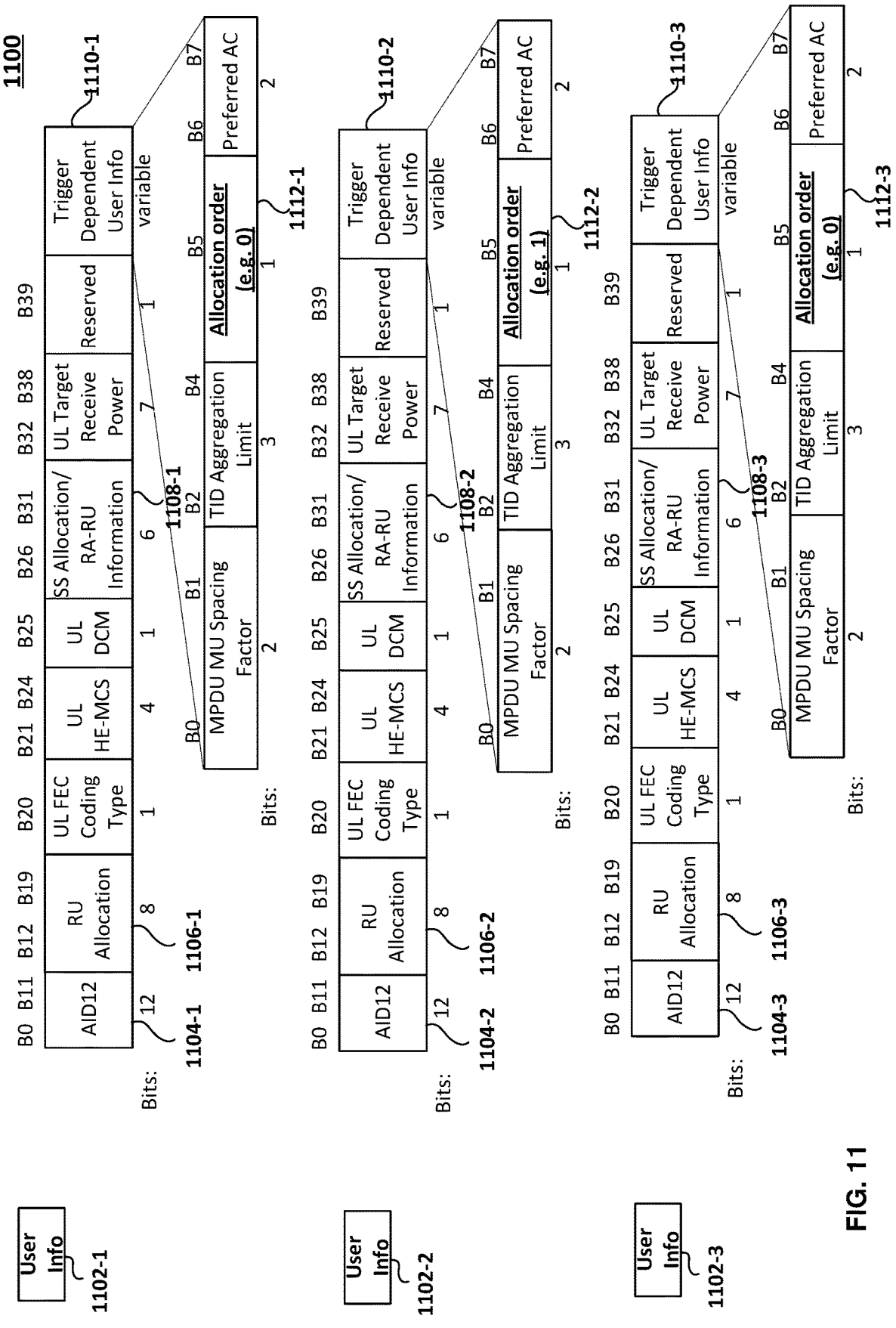
FIG. 11 shows an example format of a trigger frame.

As described herein, a trigger frame may comprise a first indication associated with a first uplink resource allocation for a STA; and a second indication associated with a second uplink resource allocation for the STA. FIGS. 10 and 11 described herein provide example trigger frame formats.

FIG. 10 shows an example format of a trigger frame. Example trigger frame 1000 may be a modified version of a basic trigger frame as defined in the existing IEEE 802.11ax standard amendment. For example, trigger frame 1000 may comprise a modified User Info field 1002, a modified Trigger Dependent User Info subfield 1004 (within the modified user info field 1002), and a new Multiple Resource Allocation subfield 1006 (within the modified Trigger Dependent User Info subfield 1004). Multiple Resource Allocation subfield 1006 replaces a Reserved Bit of the Trigger Dependent User Info subfield of the (User Info field of) existing basic trigger frame.

An RU Allocation subfield and/or an SS (Spatial Stream) Allocation subfield of User Info field 1002 may carry the first indication associated with the first uplink resource allocation. The RU Allocation subfield may comprise a value that maps to an RU index associated with an RU being allocated to the STA, for example, if the first uplink resource allocation comprises a frequency resource. The SS Allocation subfield may comprise a first value corresponding to a starting spatial stream and a second value corresponding to a number of spatial streams allocated to the STA (the first value and the second value are hereinafter referred to as a spatial stream allocation), for example, if the first uplink resource allocation comprises a spatial resource.

The Multiple Resource Allocation subfield 1006 may carry the second indication associated with the second uplink resource allocation. For example, the Multiple Resource Allocation subfield 1006 may comprise an indication of presence or absence of the second uplink resource allocation in trigger frame 1000.

The Multiple Resource Allocation subfield 1006 may take a value of 0 to indicate absence of the second uplink resource allocation in trigger frame 1000. As such, the STA is allocated a single resource allocation in trigger frame 1000.

The Multiple Resource Allocation subfield 1006 may take a value of 1 to indicate presence of, and to implicitly signal, the second uplink resource allocation in trigger frame 1000. The STA may assume that the frequency resource and/or the spatial resource associated with the second uplink resource allocation are equal to the frequency resource and/or the spatial resource associated with the first uplink resource allocation, for example, if the Multiple Resource Allocation subfield 1006 is equal to 1. The STA may determine the frequency resource and/or the spatial resource associated with the second uplink resource allocation based on the frequency resource and/or the spatial resource associated with the first uplink resource allocation, for example, if the Multiple Resource Allocation subfield 1006 is equal to 1. For example, the STA may use a predetermined rule to determine the frequency resource and/or the spatial resource associated with the second uplink resource allocation based on the frequency resource and/or the spatial resource associated with the first uplink resource allocation (e.g., if the frequency resource associated with the first uplink resource allocation is equal to RUi, then the frequency resource associated with the second uplink resource allocation may be equal to f(RUi), where f( ) is a function representing the predetermined rule).

As shown in FIG. 10, User Info field 1002 is a variable field such that it may comprise multiple User Info fields 1002 for multiple STAs. For example, trigger frame 1000 may be used to signal resource allocations for multiple STAs at the same time. The resource allocation for a given STA of the multiple STAs may comprise a single resource allocation or multiple resource allocations as described herein.

FIG. 11 shows an example format of a trigger frame. Example trigger frame 1100 may be a modified version of a basic trigger frame as defined in the existing IEEE 802.11ax standard amendment. For example, as shown in FIG. 11, trigger frame 1100 may comprise multiple User Info fields 1102-1, 1102-2, and 1102-3. User Info fields 1102-1 and 1102-2 may be associated with a same first STA being allocated by the AP, and User Info field 1102-3 may be associated with a second STA being allocated by the AP in trigger frame 1100.

A User Info field 1102 of trigger frame 1100 may be a modified version of the User Info field of the basic trigger frame. For example, a User Info field 1102 may comprise, among others, an AID12 subfield 1104, an RU Allocation subfield 1106, an SS Allocation subfield 1108, and a modified Trigger Dependent User Info subfield 1110.

The AID12 subfield 1104 may comprise an association identifier (AID) of the STA being allocated by the User Info field 1102. For example, in example trigger frame 1100, AID12 subfields 1104-1 and 1104-2 may comprise the AID of the first STA being allocated by the AP, and AID subfield 1104-3 may comprise the AID of the second STA being allocated by the AP.

The RU Allocation subfield 1106 and/or the SS Allocation subfield 1108 may carry an indication associated with an uplink resource allocation for the STA being allocated by the User Info field 1102. The RU Allocation subfield 1106 may comprise a value that maps to an RU index associated with an RU being allocated to the STA, for example, if the uplink resource allocation comprises a frequency resource. The SS Allocation subfield 1108 may comprise a first value corresponding to a starting spatial stream and a second value corresponding to a number of spatial streams allocated to the STA, for example, if the uplink resource allocation comprises a spatial resource.

The first occurring User Info field (e.g., User Info field 1102-1) among the multiple User Info fields for the STA may comprise a first indication associated with a first uplink resource allocation for the STA, for example, if trigger frame 1100 comprises multiple User Info fields 1102 for a STA. A subsequent User Info field (e.g., User Info field 1102-2) among the multiple User Info fields for the STA may comprise a second indication associated with a second uplink resource allocation for the STA. A subsequent User Info field (e.g., User Info field 1102-3) among the multiple User Info fields for the STA may comprise a third indication associated with a third uplink resource allocation for a second STA.

An Allocation Order subfield 1112 of the Trigger Dependent User Info subfield 1110 may be used to associate the indication of uplink resource allocation contained in the User Info field with a respective time resource, for example, if trigger frame 1100 comprises multiple User Info fields 1102 for a STA. For example, in example trigger frame 1100, Allocation Order subfield 1112-1 of Trigger Dependent User Info subfield 1110-1 may have a value of 0, thereby associating the first indication associated with the first uplink resource allocation contained in User Info field 1102-1 with a first time resource. The first time resource may start at a first time spacing from an end of transmission of trigger frame 1100. Allocation Order subfield 1112-2 of Trigger Dependent User Info subfield 1110-2 may have a value of 1, thereby associating the second indication of the second uplink resource allocation contained in User Info field 1102-2 with a second time resource. The second time resource associated may start at a second time spacing from an end of transmission of a frame (e.g., BA or multi-STA BA) that is sent (e.g., transmitted) by the AP, for example, based on (e.g., in response to) a frame sent (e.g., transmitted) by the AP via the first resource allocation (e.g., TB PPDU). Allocation Order subfield 1112-3 of Trigger Dependent User Info subfield 1110-3 may have a value of 0, thereby associating the third indication associated with the third uplink resource allocation contained in User Info field 1102-3 with a first time resource. The first time resource may start at a first time spacing from an end of transmission of trigger frame 1100.

Figure 12:
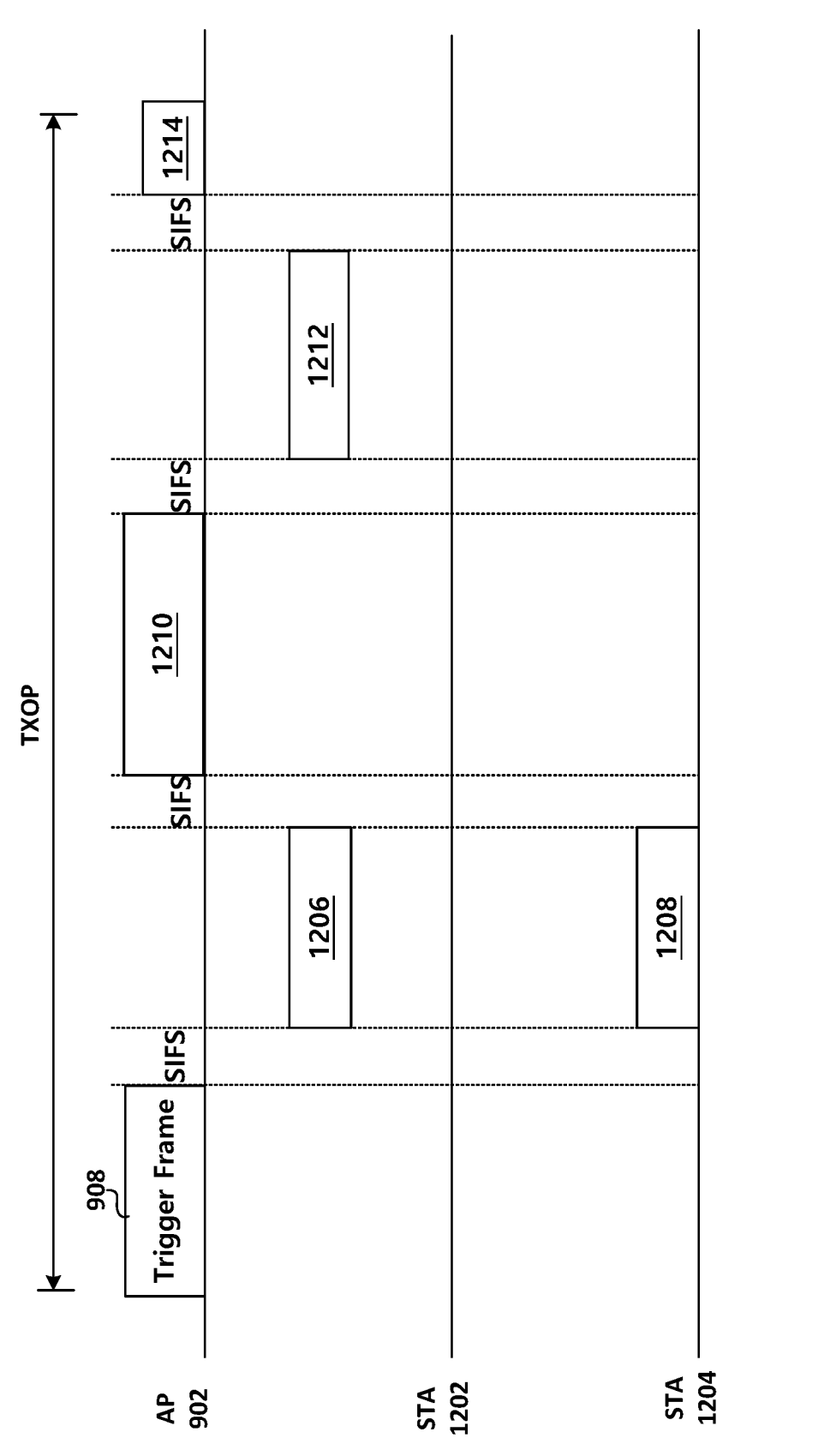
FIG. 12 shows an example of uplink transmission based on (e.g., in response to) a trigger frame.

FIG. 12 shows an example of uplink transmission, for example, based on (e.g., in response to) a trigger frame. The example 1200 may comprise an AP and one or more associated STAs. For example, As shown in FIG. 12, example 1200 may comprise AP 902, a STA 1202, and a STA 1204. STAs 1202 and 1204 may be associated with AP 902.

The AP may send a trigger frame to the one or more associated STAs. For example, AP 902 may obtain a TXOP and send (e.g., transmit) a trigger frame 908 to STAs 1202 and 1204. Trigger frame 908 may solicit one or more TB PPDUs from one or more of STAs 1202 and 1204.

The trigger frame may comprise one or more indications associated with uplink resource allocation for the one or more associated STAs. For example, trigger frame 908 may comprise a first indication associated with a first uplink resource allocation for STA 1202; and a second indication associated with a second uplink resource allocation for STA 1202. An uplink resource allocation may comprise a frequency resource and/or spatial resource.

Trigger frame 908 may have a format according to trigger frame 1000 described herein. As such, the first indication associated with the first uplink resource allocation for STA 1202 may be carried by an RU Allocation subfield and/or an SS Allocation subfield of a User Info field of trigger frame 908. The RU Allocation subfield may comprise a value that maps to an RU index associated with an RU being allocated to STA 1202, for example, if the first uplink resource allocation comprises a frequency resource. The SS Allocation subfield may comprise a first value corresponding to a starting spatial stream and a second value corresponding to a number of spatial streams allocated to STA 1202, for example, if the first uplink resource allocation comprises a spatial resource. The second indication associated with the second uplink resource allocation for STA 1202 may be carried in a Multiple Resource Allocation subfield of trigger frame 908.

The AP may allocate more than one uplink resource allocation to a STA. For example, as shown in FIG. 12, AP 902 may allocate both a first uplink resource allocation and a second uplink resource allocation to STA 1202. The first uplink resource allocation may be signaled by the RU Allocation subfield and/or the SS Allocation subfield. For example, the RU Allocation subfield may indicate a first RU (e.g., RU1) and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1202 based on the first uplink resource allocation and/or an uplink resource allocation for another STA indicated in trigger frame 908.

Trigger frame 908 may have a format according to trigger frame 1100 described herein. As such, trigger frame 908 may comprise multiple User Info fields for STA 1202. A first occurring User Info field among the multiple User Info fields may comprise a first indication associated with the first uplink resource allocation for STA 1202, and a subsequent User Info field among the multiple User Info fields for STA 1202 may comprise a second indication associated with the second uplink resource allocation for STA 1202.

As shown in FIG. 12, AP 902 may allocate both a first uplink resource allocation and a second uplink resource allocation to STA 1202. The first uplink resource allocation may be signaled by the RU Allocation subfield and/or the SS Allocation subfield of a first User Info field of trigger frame 908, and the second uplink resource allocation may be signaled by the RU Allocation subfield and/or the SS Allocation subfield of a second User Info field of trigger frame 908. For example, the RU Allocation subfield of the first User Info field may indicate a first RU, and/or the SS Allocation subfield of the first User Info field may indicate a first spatial stream allocation. The RU Allocation subfield of the second User Info field may indicate a second RU, and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 908 may be associated with different time resources. The first uplink resource allocation is associated with a first time resource, and the second uplink resource allocation is associated with a second time resource. The first time resource may be associated with a first transmission interval, and the second time resource may be associated with a second transmission interval different from the first transmission interval. The first/second transmission interval may correspond in duration to a TDD slot as defined in the IEEE 802.11 standard. The first/second transmission interval may correspond in duration to a portion of a TDD slot as defined in the IEEE 802.11 standard.

STA 1202 may send (e.g., transmit) a frame 1206, via the first uplink resource allocation, to AP 902, for example, based on (e.g., in response to) trigger frame 908. The first uplink resource allocation may comprise a first RU and/or a first spatial stream allocation. Frame 1206 may comprise a TB PPDU. The first time resource associated with the first uplink resource allocation may start at a first time spacing from an end of transmission of trigger frame 908. As shown in FIG. 12, the first time spacing equals a SIFS duration, and frame 1206 may be sent (e.g., transmitted) one SIFS, for example, after transmission of trigger frame 908.

Trigger frame 908 may further include a third indication associated with a third uplink resource allocation for STA 1204. The third indication may be carried by an RU Allocation subfield and/or an SS Allocation subfield of a User Info field for STA 1204 in trigger frame 908. As shown in FIG. 12, the third uplink resource allocation may be associated with a same time resource as the first uplink resource allocation allocated to STA 1202. The third uplink resource allocation may be associated with a different frequency resource and/or a different spatial resource than the first uplink resource allocation. The third uplink resource allocation may be associated with a same time resource as the second uplink resource allocation allocated to STA 1202. The third uplink resource allocation may be associated with a different frequency resource and/or a different spatial resource than the second uplink resource allocation.

STA 1204 may send (e.g., transmit) a frame 1208, via the third uplink resource allocation, to AP 902, for example, based on (e.g., in response to) trigger frame 908. Frame 1208 may comprise a TB PPDU. The time resource associated with the third resource allocation may start at a third time spacing from an end of transmission of trigger frame 908. As shown in FIG. 12, the third time spacing equals a SIFS duration, and frame 1208 may be sent (e.g., transmitted) one SIFS, for example, after transmission of trigger frame 908.

AP 902 may send (e.g., transmit) a frame 1210, for example, after receiving frames 1206 and 1208 from STAs 1202 and 1204 respectively. Frame 1210 may comprise a BlockAck (BA) frame or a multi-STA BA frame. Frame 1210 may be sent (e.g., transmitted) one SIFS, for example, after reception of frames 1206 and 1208 by AP 902.

STA 1202 may send (e.g., transmit) a frame 1212, via the second uplink resource allocation, to AP 902, for example, based on (e.g., upon) receiving frame 1210 from AP 902. Frame 1212 may comprise a TB PPDU. Frame 1212 may be a re-transmission of frame 1206. Re-transmission of frame 1206 using a different time resource may increase time-diversity gain.

The second uplink resource allocation may comprise a second RU that is equal to the first RU associated with the first uplink resource allocation and/or a second spatial stream allocation that is equal to the first spatial stream allocation associated with the first uplink resource allocation. As such, frame 1212 may be sent (e.g., transmitted) via the same RU and/or via the same spatial stream allocation as frame 1206 sent (e.g., transmitted), for example, based on (e.g., in response to) trigger frame 908. Re-using the same RU and/or the same spatial stream allocation for frame 1212 (e.g., if frame 1212 is a re-transmission of frame 1206) allows AP 902 to combine frames 1206 and 1212 (e.g., using maximum-ratio combining), thereby increasing the effective signal-to-noise ratio of the transmission. Additionally, this re-use of RU and/or spatial stream allocation may result in less transmission/re-transmission complexity at STA 1202.

The second time resource associated with the second uplink resource allocation may start at a second time spacing from an end of transmission of frame 1210 sent (e.g., transmitted) by AP 902, for example, based on (e.g., in response to) frames 1206 and 1208. As shown in FIG. 12, the second time spacing equals a SIFS duration, and frame 1212 may be sent (e.g., transmitted) one SIFS, for example, after reception of frame 1210 by STA 1202.

AP 902 may send (e.g., transmit) a frame 1214 to STA 1202, for example, based on (e.g., in response to) frame 1212. Frame 1214 may be a BA frame acknowledging frame 1212.

Figure 13:
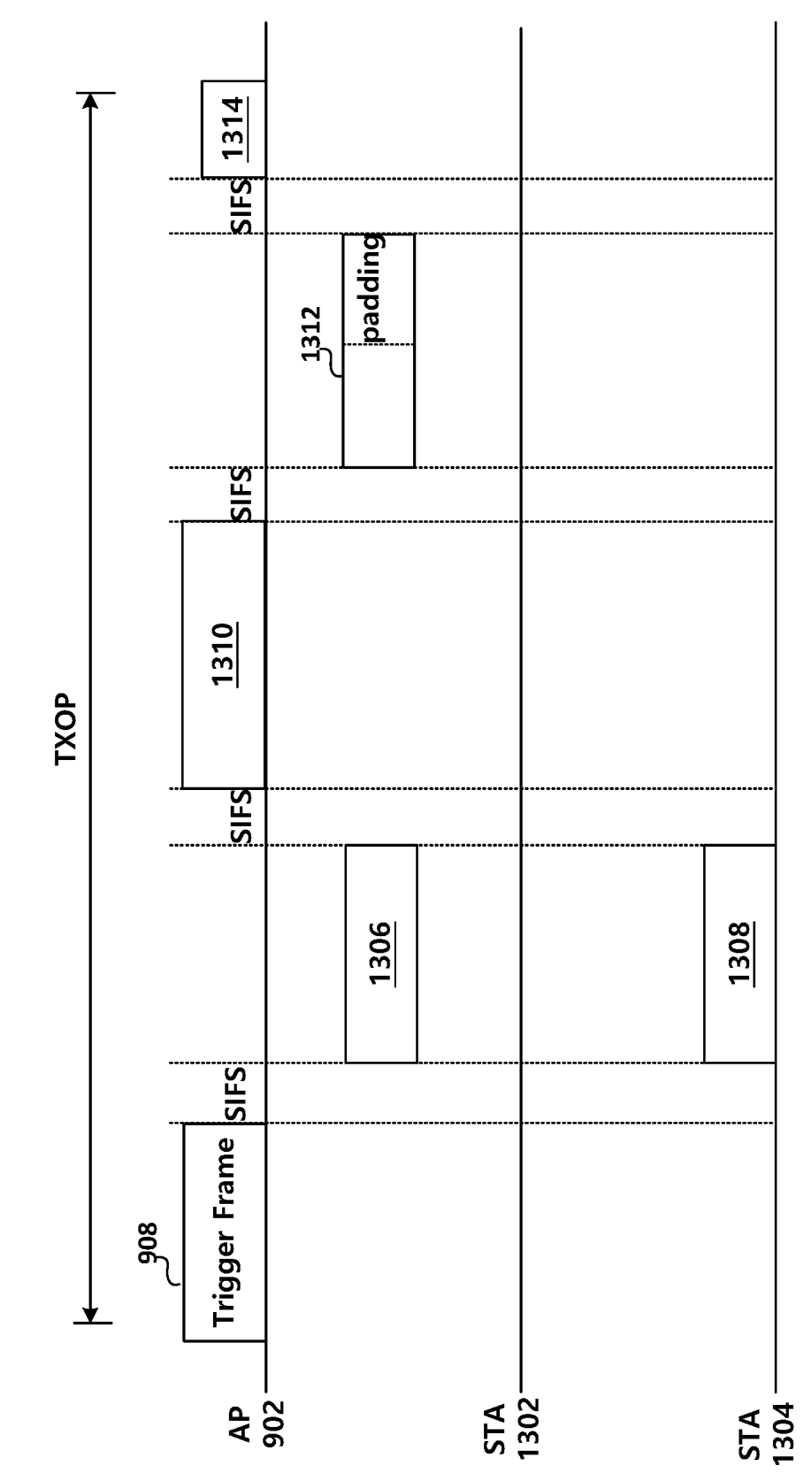
FIG. 13 shows an example of uplink transmission based on (e.g., in response to) a trigger frame.

FIG. 13 shows an example of uplink transmission, for example, based on (e.g., in response to) a trigger frame. The example 1300 may comprise an AP and one or more associated STAs. For example, as shown in FIG. 13, example 1300 may comprise an AP 902, a STA 1302, and a STA 1304. STAs 1302 and 1304 may be associated with AP 902.

The AP may send a trigger frame to the one or more associated STAs. For example, AP 902 may obtain a TXOP and send (e.g., transmit) a trigger frame 908 to STAs 1302 and 1304. Trigger frame 908 may solicit one or more TB PPDU from one or more of STAs 1302 and 1304.

The trigger frame may comprise one or more indications associated with uplink resource allocation for the one or more associated STAs. For example, trigger frame 908 may comprise a first indication associated with a first uplink resource allocation for the STA 1302; and a second indication associated with a second uplink resource allocation for STA 1302. An uplink resource allocation may comprise a frequency resource and/or spatial resource.

Trigger frame 908 may have a format according to trigger frame 1000 described herein. As such, the first indication associated with the first uplink resource allocation for STA 1302 may be carried by an RU Allocation subfield and/or an SS Allocation subfield of a User Info field of trigger frame 908. The second indication associated with the second uplink resource allocation for STA 1302 may be carried in a Multiple Resource Allocation subfield of trigger frame 908.

The AP may allocate more than one uplink resource allocation to a STA. For example, as shown in FIG. 13, AP 902 may allocate both a first uplink resource allocation and a second uplink resource allocation to STA 1302. The first uplink resource allocation may be signaled by the RU Allocation subfield and/or the SS Allocation subfield. For example, the RU Allocation subfield may indicate a first RU, and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1302 based on the first uplink resource allocation and/or an uplink resource allocation for another STA indicated in trigger frame 908.

Trigger frame 908 may have a format according to trigger frame 1100 described herein. As such, trigger frame 908 may comprise multiple User Info fields for STA 1302. A first occurring User Info field among the multiple User Info fields may comprise a first indication associated with the first uplink resource allocation for STA 1302, and a subsequent User Info field among the multiple User Info fields for STA 1302 may comprise a second indication associated with the second uplink resource allocation for STA 1302. For example, the RU Allocation subfield of the first User Info field may indicate a first RU, and/or the SS Allocation subfield of the first User Info field may indicate a first spatial stream allocation. The RU Allocation subfield of the subsequent User Info field may indicate a second RU, and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 908 may be associated with different time resources. The first uplink resource allocation is associated with a first time resource, and the second uplink resource allocation is associated with a second time resource. The first time resource may be associated with a first transmission interval, and the second time resource may be associated with a second transmission interval different than the first transmission interval. The first/second transmission interval may correspond in duration to a TDD slot as defined in the IEEE 802.11 standard. The first/second transmission interval may correspond in duration to a portion of a TDD slot as defined in the IEEE 802.11 standard.

STA 1302 may send (e.g., transmit) a frame 1306, via the first uplink resource allocation, to AP 902, for example, based on (e.g., in response to) trigger frame 908. The first uplink resource allocation may comprise a first RU and/or a first spatial stream allocation. Frame 1306 may comprise a TB PPDU. The first time resource associated with the first uplink resource allocation may start at a first time spacing from an end of transmission of trigger frame 908. As shown in FIG. 13, the first time spacing equals a SIFS duration, and frame 1306 may be sent (e.g., transmitted) one SIFS, for example, after transmission of trigger frame 908.

Trigger frame 908 may comprise a third indication associated with a third uplink resource allocation for STA 1304. The third indication may be carried by an RU Allocation subfield and/or an SS Allocation subfield of a User Info field for STA 1304 in trigger frame 908. As shown in FIG. 13, the third uplink resource allocation may be associated with a same time resource as the first uplink resource allocation allocated to STA 1302. The third uplink resource allocation may be associated with a different frequency resource (e.g., RU2) and/or a different spatial resource than the first uplink resource allocation. The third uplink resource allocation may be associated with a same time resource as the second uplink resource allocation allocated to STA 1302. The third uplink resource allocation may be associated with a different frequency resource and/or a different spatial resource than the second uplink resource allocation.

STA 1304 may send (e.g., transmit) a frame 1308, via the third uplink resource allocation, to AP 902, for example, based on (e.g., in response to) trigger frame 908. Frame 1208 may comprise a TB PPDU. The time resource associated with the third resource allocation may start at a third time spacing from an end of transmission of trigger frame 908. As shown in FIG. 13, the third time spacing equals a SIFS duration, and frame 1308 may be sent (e.g., transmitted) one SIFS, for example, after transmission of trigger frame 908.

AP 902 may send (e.g., transmit) a frame 1310, for example, after receiving frames 1306 and 1308 from STAs 1302 and 1304 respectively. Frame 1310 may comprise a BlockAck (BA) frame or a multi-STA BA frame. Frame 1310 may be sent (e.g., transmitted) one SIFS, for example, after reception of frames 1306 and 1308 by AP 902.

STA 1302 may send (e.g., transmit) a frame 1312, via the second uplink resource allocation, to AP 902, for example, based on (e.g., upon) receiving frame 1310 from AP 902. Frame 1312 may be a re-transmission of frame 1306. Re-transmission of frame 1306 using a different time resource may increase time-diversity gain.

Trigger frame 908 may have a format according to trigger frame 1000 described herein and may allocate both a first uplink resource allocation and a second uplink resource allocation to STA 1302. The first uplink resource allocation may be signaled by the RU Allocation subfield and/or the SS Allocation subfield of a first User Info field of trigger frame 908 associated with STA 1302. For example, the RU Allocation subfield may indicate a first RU (e.g., RU1), and/or the SS Allocation subfield may indicate a first spatial stream allocation (e.g., STR1). The second uplink resource allocation may be implicitly signaled by a Multiple Resource Allocation subfield of the first User Info field being set to 1 as described herein.

Additionally, trigger frame 908 may allocate a third resource allocation to STA 1304. The third uplink resource allocation may be signaled by the RU Allocation subfield and/or the SS Allocation subfield of a second User Info field of trigger frame 908 associated with STA 1304. For example, the RU Allocation subfield may indicate a second RU (e.g., RU2) and/or the SS Allocation subfield may indicate a second spatial stream allocation (e.g., STR2). A Multiple Resource Allocation subfield of the second User Info field may be set to 0, to indicate that no subsequent uplink resource allocation is being allocated to STA 1304.

STA 1302 may determine based on the second User Info field associated with STA 1304 (and particularly based on the Multiple Resource Allocation subfield) that STA 1304 is not being allocated a subsequent uplink resource allocation for transmission following frame 1310. Based on this determination, STA 1302 may determine that it may send (e.g., transmit) frame 1312 on either or both: the RU (e.g., RU1) and spatial stream allocation (e.g., STR1) associated with the first uplink resource allocation allocated to STA 1302 and the RU (e.g., RU2) and spatial stream allocation (e.g., STR2) associated with the third uplink resource allocation allocated to STA 1304.

STA 1302 may use the same frequency resource (e.g., RU1) and spatial stream allocation (e.g., STR1) associated with the first uplink resource allocation allocated to STA 1302 to send (e.g., transmit) frame 1312. As such, a PSDU associated with frame 1312 may be made shorter than a PSDU associated with frame 1306. For example, the PSDU associated with frame 1312 may omit certain fields used for training purposes by the AP as frame 1312 may use the same frequency resource and spatial stream allocation as frame 1306. This results in latency gain from the AP perspective. Padding bits may be inserted into frame 1312 to ensure equal frame (PPDU) length between frame 1306 and frame 1312.

The second time resource associated with the second uplink resource allocation may start at a second time spacing from an end of transmission of frame 1310 sent (e.g., transmitted) by AP 902, for example, based on (e.g., in response to) frames 1306 and 1308. As shown in FIG. 13, the second time spacing equals a SIFS duration, and frame 1312 may be sent (e.g., transmitted) one SIFS, for example, after reception of frame 1310 by STA 1302.

AP 902 may send (e.g., transmit) a frame 1314 to STA 1302, for example, based on (e.g., in response to) frame 1312. Frame 1314 may be a BA frame acknowledging frame 1312.

Figure 14:
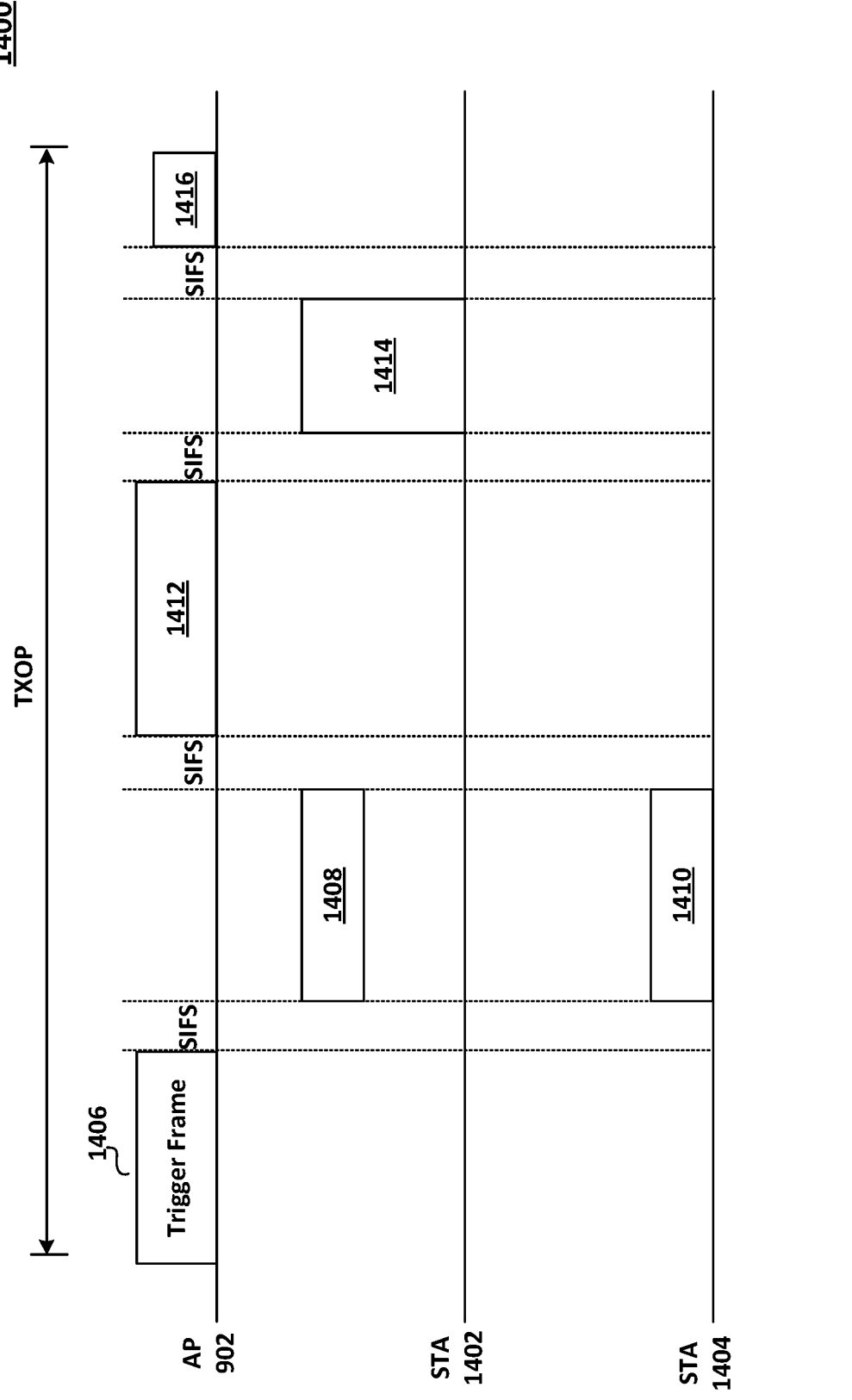
FIG. 14 shows an example of uplink transmission based on (e.g., in response to) a trigger frame.

FIG. 14 shows an example of uplink transmission, for example, based on (e.g., in response to) a trigger frame. The example 1400 may comprise an AP and one or more associated STAs. For example, as shown in FIG. 14, example 1400 may comprise an AP 902, a STA 1402, and a STA 1404. STAs 1402 and 1404 may be associated with AP 902.

The AP may send a trigger frame to the one or more associated STAs. For example, AP 902 may obtain a TXOP and send (e.g., transmit) a trigger frame 1406 to STAs 1402 and 1404. Trigger frame 1406 may solicit one or more TB PPDU from one or more of STAs 1402 and 1404.

The trigger frame may comprise one or more indications associated with uplink resource allocation for the one or more associated STAs. For example, trigger frame 1406 may comprise a first indication associated with a first uplink resource allocation for the STA 1402; and a second indication associated with a second uplink resource allocation for STA 1402. An uplink resource allocation may comprise a frequency resource and/or spatial resource.

Trigger frame 1406 may have a format according to trigger frame 1000 described herein. As such, the first indication associated with the first uplink resource allocation for STA 1402 may be carried by an RU Allocation subfield and/or an SS Allocation subfield of a User Info field of trigger frame 1406. The second indication associated with the second uplink resource allocation for STA 1402 may be carried in a Multiple Resource Allocation subfield of trigger frame 1406.

The AP may allocate more than one uplink resource allocation to a STA. For example, as shown in FIG. 14, AP 902 may allocate both a first uplink resource allocation and a second uplink resource allocation to STA 1402. The first uplink resource allocation may be signaled by the RU Allocation subfield and/or the SS Allocation subfield. For example, the RU Allocation subfield may indicate a first RU, and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1402 based on the first uplink resource allocation and/or an uplink resource allocation for another STA indicated in trigger frame 1406.

Trigger frame 1406 may have a format according to trigger frame 1100 described herein. As such, trigger frame 1406 may comprise multiple User Info fields for STA 1402. A first occurring User Info field among the multiple User Info fields may comprise a first indication associated with the first uplink resource allocation for STA 1402, and a subsequent User Info field among the multiple User Info fields for STA 1402 may comprise a second indication associated with the second uplink resource allocation for STA 1402. For example, the RU Allocation subfield of the first User Info field may indicate a first RU, and/or the SS Allocation subfield of the first User Info field may indicate a first spatial stream allocation. The RU Allocation subfield of the subsequent User Info field may indicate a second RU, and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 1406 may be associated with different time resources. The first uplink resource allocation is associated with a first time resource, and the second uplink resource allocation is associated with a second time resource. The first time resource may be associated with a first transmission interval, and the second time resource may be associated with a second transmission interval different than the first transmission interval. The first/second transmission interval may correspond in duration to a TDD slot, such as defined in an IEEE 802.11 standard. The first/second transmission interval may correspond in duration to a portion of a TDD slot as defined in an IEEE 802.11 standard.

STA 1402 may send (e.g., transmit) a frame 1408, via the first uplink resource allocation, to AP 902, for example, based on (e.g., in response to) trigger frame 1406. The first uplink resource allocation may comprise a first RU and/or a first spatial resource allocation. Frame 1408 may comprise a TB PPDU. The first time resource associated with the first uplink resource allocation may start at a first time spacing from an end of transmission of trigger frame 1406. As shown in FIG. 14, the first time spacing equals a SIFS duration, and frame 1408 may be sent (e.g., transmitted) one SIFS, for example, after transmission of trigger frame 1406.

Trigger frame 1406 may further comprise a third indication associated with a third uplink resource allocation for STA 1404. The third indication may be carried by an RU Allocation subfield and/or an SS Allocation subfield of a User Info field for STA 1404 in trigger frame 1406. As shown in FIG. 14, the third uplink resource allocation may be associated with a same time resource as the first uplink resource allocation allocated to STA 1402. The third uplink resource allocation may be associated with a different frequency resource and/or a different spatial resource than the first uplink resource allocation. The third uplink resource allocation may be associated with a same time resource as the second uplink resource allocation allocated to STA 1402. The third uplink resource allocation may be associated with a different frequency resource and/or a different spatial resource than the second uplink resource allocation.

STA 1404 may send (e.g., transmit) a frame 1410, via the third uplink resource allocation, to AP 902, for example, based on (e.g., in response to) trigger frame 1406. Frame 1410 may comprise a TB PPDU. The time resource associated with the third resource allocation may start at a third time spacing from an end of transmission of trigger frame 1406. As shown in FIG. 14, the third time spacing equals a SIFS duration, and frame 1410 may be sent (e.g., transmitted) one SIFS, for example, after transmission of trigger frame 1406.

AP 902 may send (e.g., transmit) a frame 1412, for example, after receiving frames 1408 and 1412 from STAs 1402 and 1404 respectively. Frame 1412 may comprise a BlockAck (BA) frame or a multi-STA BA frame. Frame 1412 may be sent (e.g., transmitted) one SIFS, for example, after reception of frames 1408 and 1410 by AP 902.

STA 1402 may send (e.g., transmit) a frame 1414, via the second uplink resource allocation, to AP 902, for example, based on (e.g., upon) receiving frame 1412 from AP 902. Frame 1414 may comprise a TB PPDU. Frame 1414 may be a re-transmission of frame 1408. Re-transmission of frame 1408 using a different time resource may increase time-diversity gain.

Trigger frame 1406 may have a format according to trigger frame 1000 described herein and may allocate both a first uplink resource allocation and a second uplink resource allocation to STA 1402. The first uplink resource allocation may be signaled by the RU Allocation subfield and/or the SS Allocation subfield of a first User Info field of trigger frame 1406 associated with STA 1402. For example, the RU Allocation subfield may indicate a first RU (e.g., RU1) and/or the SS Allocation subfield may indicate a first spatial stream allocation (e.g., STR1). The second uplink resource allocation may be implicitly signaled by a Multiple Resource Allocation subfield of the first User Info field being set to 1 as described herein.

Additionally, trigger frame 1406 may allocate a third resource allocation to STA 1404. The third uplink resource allocation may be signaled by the RU Allocation subfield and/or the SS Allocation subfield of a second User Info field of trigger frame 1406 associated with STA 1404. For example, the RU Allocation subfield may indicate a second RU (e.g., RU2) and/or the SS Allocation subfield may indicate a second spatial stream allocation (e.g., STR2). A Multiple Resource Allocation subfield of the second User Info field may be set to 0, to indicate that no subsequent uplink resource allocation is being allocated to STA 1404.

STA 1402 may determine based on the second User Info field associated with STA 1404 (and particularly based on the Multiple Resource Allocation subfield) that STA 1404 is not being allocated a subsequent uplink resource allocation for transmission following frame 1414. Based on this determination, STA 1402 may determine that it may send (e.g., transmit) frame 1414 on either or both of: the RU (e.g., RU1) and spatial stream allocation (e.g., STR1) associated with the first uplink resource allocation allocated to STA 1402 and the RU (e.g., RU2) and spatial stream allocation (e.g., STR2) associated with the third uplink resource allocation allocated to STA 1404. STA 1402 may thus determine the second uplink resource allocation based on the first uplink resource allocation and/or the third uplink resource allocation.

STA 1402 may use both the frequency resource (e.g., RU1) and spatial stream allocation (e.g., STR1) associated with the first uplink resource allocation and the frequency resource (e.g., RU2) and spatial stream allocation (e.g., STR2) associated with the third uplink resource allocation to send (e.g., transmit) frame 1414. As such, a transmission time of frame 1414 may be made shorter than (e.g., approximately half) a transmission time of frame 1408. This results in improved transmission latency.

The second time resource associated with the second uplink resource allocation may start at a second time spacing from an end of transmission of frame 1412 sent (e.g., transmitted) by AP 902, for example, based on (e.g., in response to) frames 1408 and 1410. As shown in FIG. 14, the second time spacing equals a SIFS duration, and frame 1414 may be sent (e.g., transmitted) one SIFS, for example, after reception of frame 1412 by STA 1402.

AP 902 may send (e.g., transmit) a frame 1416 to STA 1402, for example, based on (e.g., in response to) frame 1414. Frame 1416 may be a BA frame acknowledging frame 1414.

Figure 15:
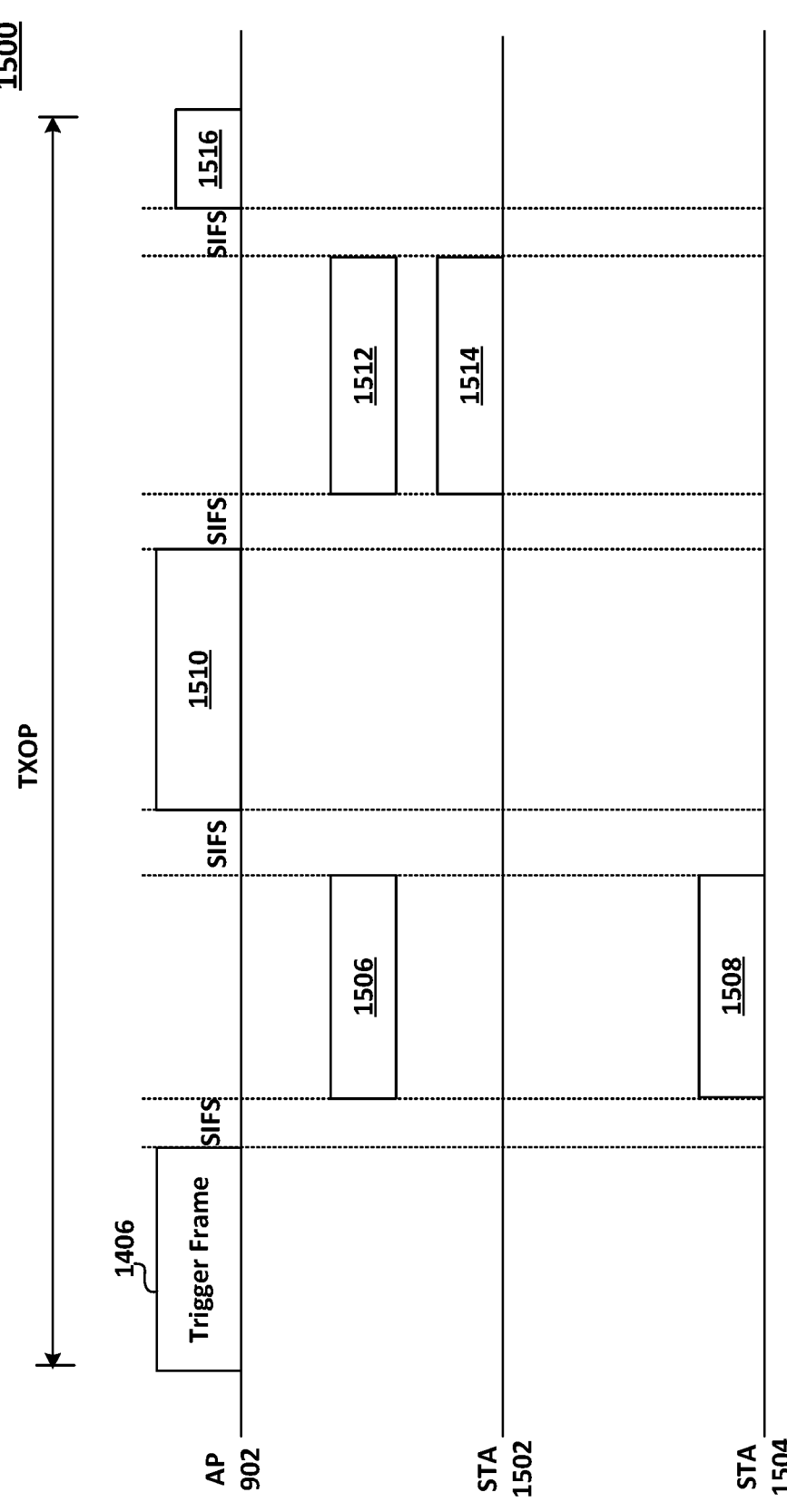
FIG. 15 shows an example of uplink transmission based on (e.g., in response to) a trigger frame.

FIG. 15 shows an example of uplink transmission, for example, based on (e.g., in response to) a trigger frame. The example 1500 may comprise an AP and one or more associated STAs. For example, as shown in FIG. 15, example 1500 may comprise an AP 902, a STA 1502, and a STA 1504. STAs 1502 and 1504 may be associated with AP 902.

The AP may send a trigger frame to the one or more associated STAs. For example, AP 902 may obtain a TXOP and send (e.g., transmit) a trigger frame 1406 to STAs 1502 and 1504. Trigger frame 1406 may solicit one or more TB PPDU from one or more of STAs 1502 and 1504.

The trigger frame may comprise one or more indications associated with uplink resource allocation for the one or more associated STAs. For example, trigger frame 1406 may comprise a first indication associated with a first uplink resource allocation for the STA 1502; and a second indication associated with a second uplink resource allocation for STA 1502. An uplink resource allocation may comprise a frequency resource and/or spatial resource.

Trigger frame 1406 may have a format according to trigger frame 1000 described herein. As such, the first indication associated with the first uplink resource allocation for STA 1502 may be carried by an RU Allocation subfield and/or an SS Allocation subfield of a User Info field of trigger frame 1406. The second indication associated with the second uplink resource allocation for STA 1502 may be carried in a Multiple Resource Allocation subfield of trigger frame 1406.

The AP may allocate more than one uplink resource allocation to a STA. For example, as shown in FIG. 15, AP 902 may allocate both a first uplink resource allocation and a second uplink resource allocation to STA 1502. The first uplink resource allocation may be signaled by the RU Allocation subfield and/or the SS Allocation subfield. For example, the RU Allocation subfield may indicate a first RU, and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1502 based on the first uplink resource allocation and/or an uplink resource allocation for another STA indicated in trigger frame 1406.

Trigger frame 1406 may have a format according to trigger frame 1100 described herein. As such, trigger frame 1406 may comprise multiple User Info fields for STA 1502.

A first occurring User Info field among the multiple User Info fields may comprise a first indication associated with the first uplink resource allocation for STA 1502, and a subsequent User Info field among the multiple User Info fields for STA 1502 may comprise a second indication associated with the second uplink resource allocation for STA 1502. For example, the RU Allocation subfield of the first User Info field may indicate a first RU and/or the SS Allocation subfield of the first User Info field may indicate a first spatial stream allocation. The RU Allocation subfield of the subsequent User Info field may indicate a second RU and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 1406 may be associated with different time resources. The first uplink resource allocation is associated with a first time resource, and the second uplink resource allocation is associated with a second time resource. The first time resource may be associated with a first transmission interval, and the second time resource may be associated with a second transmission interval different than the first transmission interval. The first/second transmission interval may correspond in duration to a TDD slot as defined in the IEEE 802.11 standard. The first/second transmission interval may correspond in duration to a portion of a TDD slot as defined in the IEEE 802.11 standard.

STA 1502 may send (e.g., transmit) a frame 1506, via the first uplink resource allocation, to AP 902, for example, based on (e.g., in response to) trigger frame 1406. The first uplink resource allocation may comprise a first RU and/or a first spatial resource allocation. Frame 1506 may comprise a TB PPDU. The first time resource associated with the first uplink resource allocation may start at a first time spacing from an end of transmission of trigger frame 1406. As shown in FIG. 15, the first time spacing equals a SIFS duration, and frame 1506 may be sent (e.g., transmitted) one SIFS, for example, after transmission of trigger frame 1406.

Trigger frame 1406 may further comprise a third indication associated with a third uplink resource allocation for STA 1504. The third indication may be carried by an RU Allocation subfield and/or an SS Allocation subfield of a User Info field for STA 1504 in trigger frame 1406. As shown in FIG. 15, the third uplink resource allocation may be associated with a same time resource as the first uplink resource allocation allocated to STA 1502. The third uplink resource allocation may be associated with a different frequency resource and/or a different spatial resource than the first uplink resource allocation. The third uplink resource allocation may be associated with a same time resource as the second uplink resource allocation allocated to STA 1502. The third uplink resource allocation may be associated with a different frequency resource and/or a different spatial resource than the second uplink resource allocation.

STA 1504 may send (e.g., transmit) a frame 1508, via the third uplink resource allocation, to AP 902, for example, based on (e.g., in response to) trigger frame 1406. Frame 1508 may comprise a TB PPDU. The time resource associated with the third resource allocation may start at a third time spacing from an end of transmission of trigger frame 1406. As shown in FIG. 15, the third time spacing equals a SIFS duration, and frame 1508 may be sent (e.g., transmitted) one SIFS, for example, after transmission of trigger frame 1406.

AP 902 may send (e.g., transmit) a frame 1510, for example, after receiving frames 1506 and 1508 from STAs 1502 and 1504 respectively. Frame 1510 may comprise a BlockAck (BA) frame or a multi-STA BA frame. Frame 1510 may be sent (e.g., transmitted) one SIFS, for example, after reception of frames 1506 and 1508 by AP 902.

STA 1502 may send (e.g., transmit) frames 1512 and 1514, via the second uplink resource allocation, to AP 902, for example, based on (e.g., upon) receiving frame 1510 from AP 902. Frame 1512 or 1514 may comprise a TB PPDU. Frame 1512 and/or 1514 may be a re-transmission of frame 1506. Re-transmission of frame 1506 using a different time resource may increase time-diversity gain.

Trigger frame 1406 may have a format according to trigger frame 1000 described herein and may allocate both a first uplink resource allocation and a second uplink resource allocation to STA 1502. The first uplink resource allocation may be signaled by the RU Allocation subfield and/or the SS Allocation subfield of a first User Info field of trigger frame 1406 associated with STA 1502. For example, the RU Allocation subfield may indicate a first RU (e.g., RU1) and/or the SS Allocation subfield may indicate a first spatial stream allocation (e.g., STR1). The second uplink resource allocation may be implicitly signaled by a Multiple Resource Allocation subfield of the first User Info field being set to 1 as described herein.

Additionally, trigger frame 1406 may allocate a third resource allocation to STA 1504. The third uplink resource allocation may be signaled by the RU Allocation subfield and/or the SS Allocation subfield of a second User Info field of trigger frame 1406 associated with STA 1504. For example, the RU Allocation subfield may indicate a second RU (e.g., RU2) and/or the SS Allocation subfield may indicate a second spatial stream allocation (e.g., STR2). A Multiple Resource Allocation subfield of the second User Info field may be set to 0, to indicate that no subsequent uplink resource allocation is being allocated to STA 1504.

STA 1502 may determine based on the second User Info field associated with STA 1504 (and particularly based on the Multiple Resource Allocation subfield) that STA 1504 is not being allocated a subsequent uplink resource allocation for transmission following frame 1510. Based on this determination, STA 1502 may determine that it may send (e.g., transmit) frames 1512 and 1514 using the RU (e.g., RU1) and spatial stream allocation (e.g., STR1) associated with the first uplink resource allocation and the RU (e.g., RU2) and spatial stream allocation (e.g., STR2) associated with the third uplink resource allocation. STA 1402 may thus determine the second uplink resource allocation based on the first uplink resource allocation and/or the third uplink resource allocation.

STA 1402 may send (e.g., transmit) frame 1512 using the frequency resource (e.g., RU1) and spatial stream allocation (e.g., STR1) associated with the first uplink resource allocation allocated to STA 1502 and may send (e.g., transmit) frame 1514 using the frequency resource (e.g., RU2) and spatial stream allocation (e.g., STR2) associated with the third uplink resource allocation allocated to STA 1504. Frames 1512 and 1514 may be duplicate frames, which results in increased transmission reliability. Frames 1512 and 1514 may be different frames, allowing more data to be sent (e.g., transmitted) per uplink resource allocation.

The second time resource associated with the second uplink resource allocation may start at a second time spacing from an end of transmission of frame 1510 sent (e.g., transmitted) by AP 902, for example, based on (e.g., in response to) frames 1506 and 1508. As shown in FIG. 15, the second time spacing equals a SIFS duration, and frames 1512 and 1514 are sent (e.g., transmitted) one SIFS, for example, after reception of frame 1510 by STA 1502. Uplink resource allocation of frame 1512 and frame 1514 may provide reliable transmission for the STA 1502. The information in frame 1512 may be duplicated into frame 1514.

AP 902 may send (e.g., transmit) a frame 1516 to STA 1502, for example, based on (e.g., in response to) frame 1512/1514. Frame 1516 may be a BA frame acknowledging frame 1512 and 1514.

Figure 16:
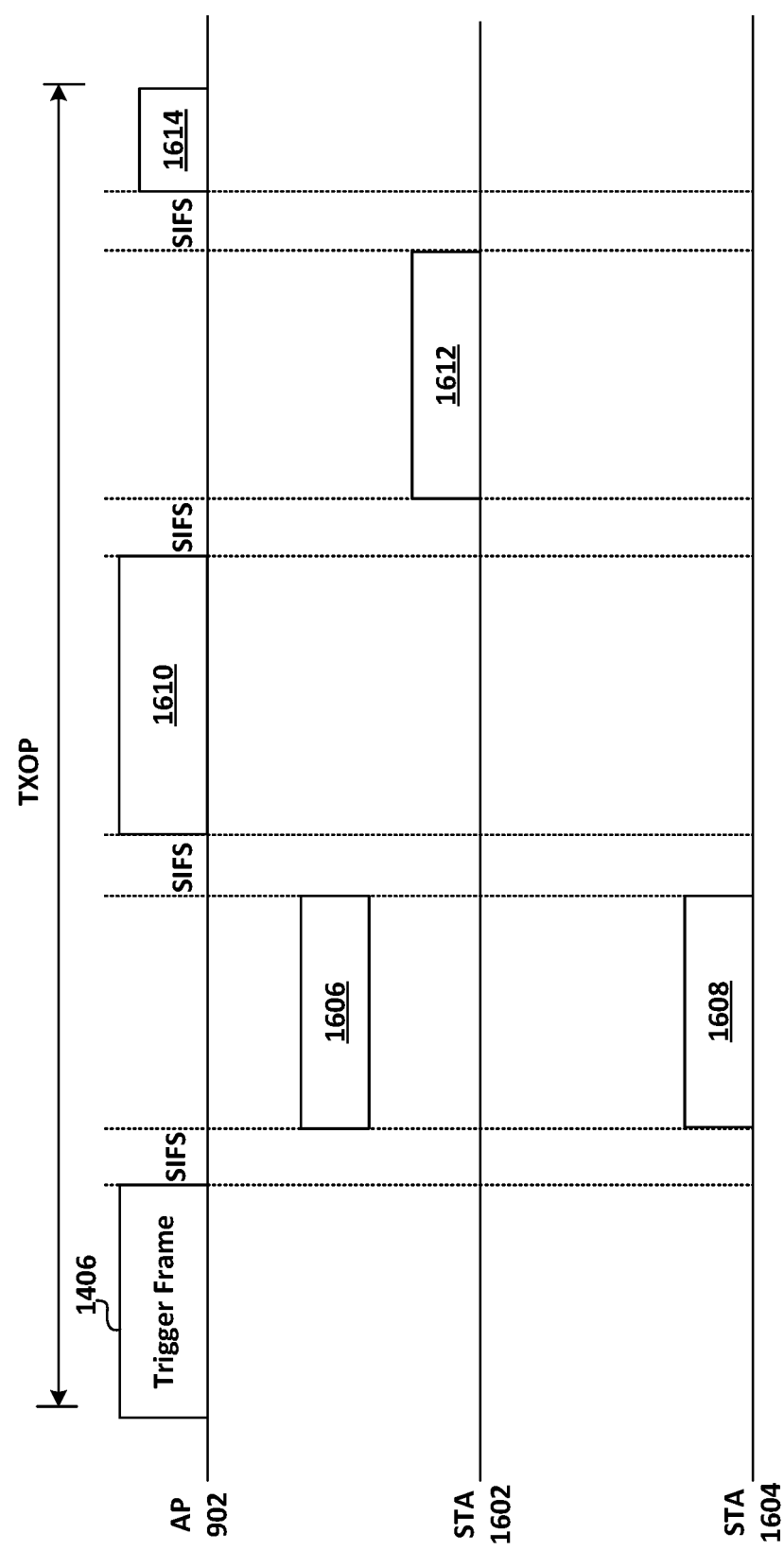
FIG. 16 shows an example of uplink transmission based on (e.g., in response to) a trigger frame.

FIG. 16 shows an example of uplink transmission, for example, based on (e.g., in response to) a trigger frame. The example 1600 may comprise an AP and one or more associated STAs. For example, as shown in FIG. 16, example 1600 may comprise an AP 902, a STA 1602, and a STA 1604. STAs 1602 and 1604 may be associated with AP 902.

The AP may send a trigger frame to the one or more associated STAs. For example, AP 902 may obtain a TXOP and send (e.g., transmit) a trigger frame 1406 to STAs 1602 and 1604. Trigger frame 1406 may solicit one or more TB PPDU from one or more of STAs 1602 and 1604.

The trigger frame may comprise one or more indications associated with uplink resource allocation for the one or more associated STAs. For example, trigger frame 1406 may comprise a first indication associated with a first uplink resource allocation for the STA 1602; and a second indication associated with a second uplink resource allocation for STA 1602. An uplink resource allocation may comprise a frequency resource and/or spatial resource.

Trigger frame 1406 may have a format according to trigger frame 1000 described herein. As such, the first indication associated with the first uplink resource allocation for STA 1602 may be carried by an RU Allocation subfield and/or an SS Allocation subfield of a User Info field of trigger frame 1406. The second indication associated with the second uplink resource allocation for STA 1602 may be carried in a Multiple Resource Allocation subfield of trigger frame 1406.

The AP may allocate more than one uplink resource allocation to a STA. For example, as shown in FIG. 16, AP 902 may allocate both a first uplink resource allocation and a second uplink resource allocation to STA 1602. The first uplink resource allocation may be signaled by the RU Allocation subfield and/or the SS Allocation subfield. For example, the RU Allocation subfield may indicate a first RU and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1602 based on the first uplink resource allocation and/or an uplink resource allocation for another STA indicated in trigger frame 1406.

Trigger frame 1406 may have a format according to trigger frame 1100 described herein. As such, trigger frame 1406 may comprise multiple User Info fields for STA 1602. A first occurring User Info field among the multiple User Info fields may comprise a first indication associated with the first uplink resource allocation for STA 1602, and a subsequent User Info field among the multiple User Info fields for STA 1602 may comprise a second indication associated with the second uplink resource allocation for STA 1602. For example, the RU Allocation subfield of the first User Info field may indicate a first RU and/or the SS Allocation subfield of the first User Info field may indicate a first spatial stream allocation. The RU Allocation subfield of the subsequent User Info field may indicate a second RU and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 1406 may be associated with different time resources. The first uplink resource allocation is associated with a first time resource, and the second uplink resource allocation is associated with a second time resource. The first time resource may be associated with a first transmission interval, and the second time resource may be associated with a second transmission interval different than the first transmission interval. The first/second transmission interval may correspond in duration to a TDD slot as defined in the IEEE 802.11 standard. The first/second transmission interval may correspond in duration to a portion of a TDD slot as defined in the IEEE 802.11 standard.

STA 1602 may send (e.g., transmit) a frame 1606, via the first uplink resource allocation, to AP 902, for example, based on (e.g., in response to) trigger frame 1406. The first uplink resource allocation may comprise a first RU and/or a first spatial resource allocation. Frame 1606 may comprise a TB PPDU. The first time resource associated with the first uplink resource allocation may start at a first time spacing from an end of transmission of trigger frame 1406. As shown in FIG. 16, the first time spacing equals a SIFS duration, and frame 1606 may be sent (e.g., transmitted) one SIFS, for example, after transmission of trigger frame 1406.

Trigger frame 1406 may further comprise a third indication associated with a third uplink resource allocation for STA 1604. The third indication may be carried by an RU Allocation subfield and/or an SS Allocation subfield of a User Info field for STA 1504 in trigger frame 1406. As shown in FIG. 16, the third uplink resource allocation may be associated with a same time resource as the first uplink resource allocation allocated to STA 1602. The third uplink resource allocation may be associated with a different frequency resource and/or a different spatial resource than the first uplink resource allocation. The third uplink resource allocation may be associated with a same time resource as the second uplink resource allocation allocated to STA 1602. The third uplink resource allocation may be associated with a different frequency resource and/or a different spatial resource than the second uplink resource allocation.

STA 1604 may send (e.g., transmit) a frame 1608, via the third uplink resource allocation, to AP 902, for example, based on (e.g., in response to) trigger frame 1406. Frame 1608 may comprise a TB PPDU. The time resource associated with the third resource allocation may start at a third time spacing from an end of transmission of trigger frame 1406. As shown in FIG. 16, the third time spacing equals a SIFS duration, and frame 1608 may be sent (e.g., transmitted) one SIFS, for example, after transmission of trigger frame 1406.

AP 902 may send (e.g., transmit) a frame 1610, for example, after receiving frames 1606 and 1608 from STAs 1602 and 1604 respectively. Frame 1610 may comprise a BlockAck (BA) frame or a multi-STA BA frame. Frame 1510 may be sent (e.g., transmitted) one SIFS, for example, after reception of frames 1606 and 1608 by AP 902.

STA 1602 may send (e.g., transmit) a frame 1612, via the second uplink resource allocation, to AP 902, for example, based on (e.g., upon) receiving frame 1610 from AP 902. Frame 1612 may comprise a TB PPDU. Frame 1612 may be a re-transmission of frame 1606. Re-transmission of frame 1606 using a different time resource may increase time-diversity gain.

Trigger frame 1406 may have a format according to trigger frame 1000 described herein and may allocate both a first uplink resource allocation and a second uplink resource allocation to STA 1602. The first uplink resource allocation may be signaled by the RU Allocation subfield and/or the SS Allocation subfield of a first User Info field of trigger frame 1406 associated with STA 1602. For example, the RU Allocation subfield may indicate a first RU (e.g., RU1) and/or the SS Allocation subfield may indicate a first spatial stream allocation (e.g., STR1). The second uplink resource allocation may be implicitly signaled by a Multiple Resource Allocation subfield of the first User Info field being set to 1 as described herein.

Additionally, trigger frame 1406 may allocate a third resource allocation to STA 1604. The third uplink resource allocation may be signaled by the RU Allocation subfield and/or the SS Allocation subfield of a second User Info field of trigger frame 1406 associated with STA 1604. For example, the RU Allocation subfield may indicate a second RU (e.g., RU2) and/or the SS Allocation subfield may indicate a second spatial stream allocation (e.g., STR2). A Multiple Resource Allocation subfield of the second User Info field may be set to 0, to indicate that no subsequent uplink resource allocation is being allocated to STA 1604.

STA 1602 may determine based on the second User Info field associated with STA 1604 (and particularly based on the Multiple Resource Allocation subfield) that STA 1604 is not being allocated a subsequent uplink resource allocation for transmission following frame 1610. Based on this determination, STA 1602 may determine that it may send (e.g., transmit) frame 1612 on either or both: the RU (e.g., RU1) and spatial stream allocation (e.g., STR1) associated with the first uplink resource allocation allocated to STA 1602 and the RU (e.g., RU2) and spatial stream allocation (e.g., STR2) associated with the third uplink resource allocation allocated to STA 1604. STA 1602 may thus determine the second uplink resource allocation based on the first uplink resource allocation and/or the third uplink resource allocation. STA 1602 may send (e.g., transmit) frame 1612 using the frequency resource (e.g., RU2) and spatial stream allocation (e.g., STR2) associated with the third uplink resource allocation allocated to STA 1604 in trigger frame 1406.

The second time resource associated with the second uplink resource allocation may start at a second time spacing from an end of transmission of frame 1610 sent (e.g., transmitted) by AP 902, for example, based on (e.g., in response to) frames 1606 and 1608. As shown in FIG. 16, the second time spacing equals a SIFS duration, and frame 1612 may be sent (e.g., transmitted) one SIFS, for example, after reception of frame 1610 by STA 1602. Different RU may be allocated to frame 1606 and frame 1612 for the STA 1602.

AP 902 may send (e.g., transmit) a frame 1614 to STA 1602, for example, based on (e.g., in response to) frame 1612. Frame 1614 may be a BA frame acknowledging frame 1612.

Figure 17:
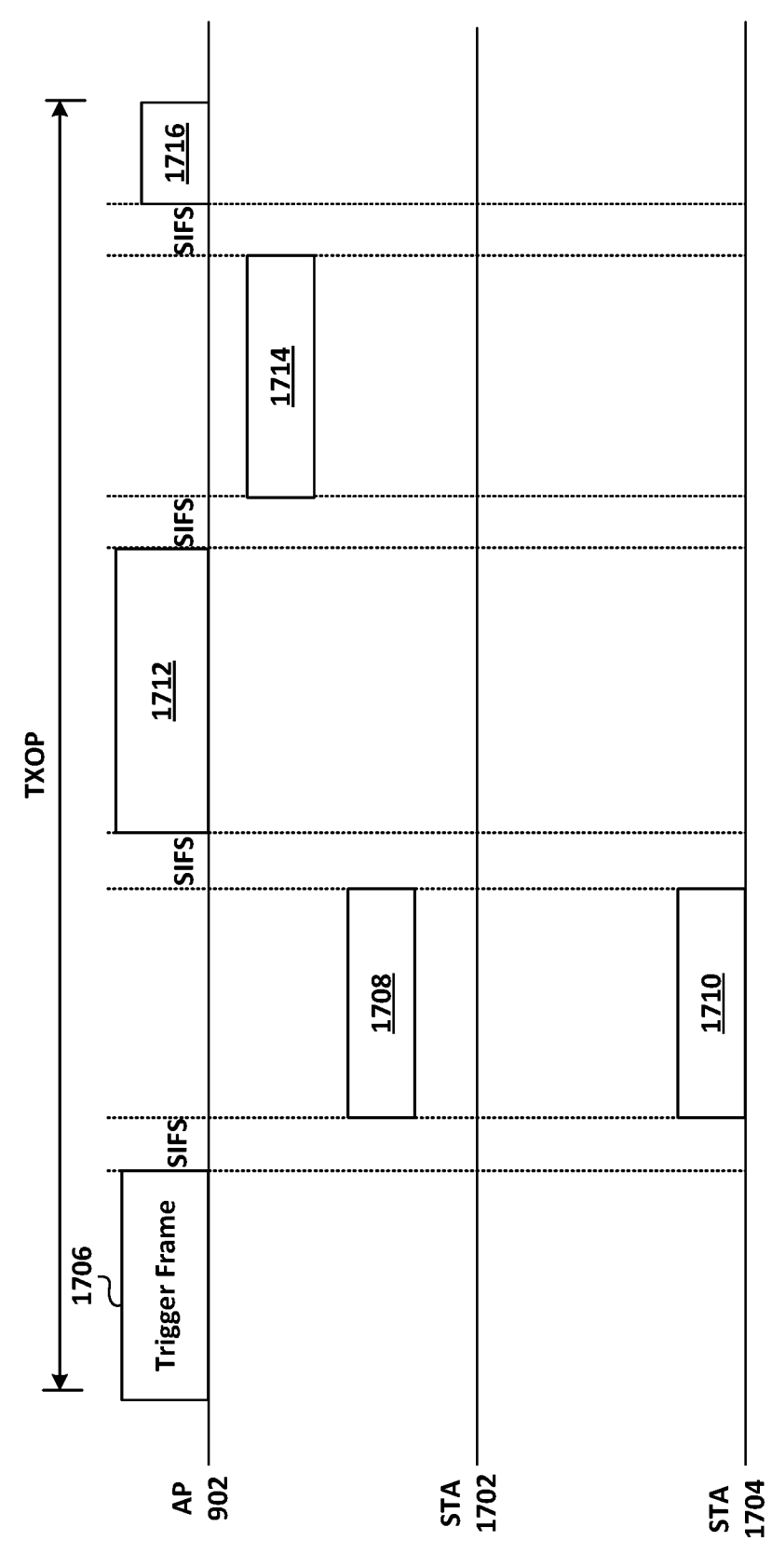
FIG. 17 shows an example of uplink transmission based on (e.g., in response to) a trigger frame.

FIG. 17 shows an example 1700 of uplink transmission, for example, based on (e.g., in response to) a trigger frame. The example 1700 may comprise an AP and one or more associated STAs. For example, as shown in FIG. 17, example 1700 may comprise an AP 902, a STA 1702, and a STA 1704. STAs 1702 and 1704 may be associated with AP 902.

The AP may send a trigger frame to the one or more associated STAs. For example, AP 902 may obtain a TXOP and send (e.g., transmit) a trigger frame 1706 to STAs 1702 and 1704. Trigger frame 1706 may solicit one or more trigger-based (TB) physical layer (PHY) protocol data unit (PPDU) from one or more of STAs 1702 and 1704.

The trigger frame may comprise one or more indications associated with uplink resource allocation for the one or more associated STAs. For example, trigger frame 1706 may comprise a first indication associated with a first uplink resource allocation for the STA 1702; and a second indication associated with a second uplink resource allocation for STA 1704. An uplink resource allocation may comprise a frequency resource and/or spatial resource.

Trigger frame 1706 may have a format according to trigger frame 1000 described herein. As such, the first indication associated with the first uplink resource allocation for STA 1702 may be carried by an RU Allocation subfield and/or an SS Allocation subfield of a User Info field of trigger frame 1706. The second indication associated with the second uplink resource allocation for STA 1702 may be carried in a Multiple Resource Allocation subfield of trigger frame 1706.

The AP may allocate more than one uplink resource allocation to a STA. For example, as shown in FIG. 17, AP 902 may allocate both a first uplink resource allocation and a second uplink resource allocation to STA 1702. The first uplink resource allocation may be signaled by the RU Allocation subfield and/or the SS Allocation subfield. For example, the RU Allocation subfield may indicate a first RU and/or the SS Allocation subfield may indicate a first spatial stream allocation. The second uplink resource allocation may be implicitly signaled by the Multiple Resource Allocation subfield. For example, a value of 1 for the Multiple Resource Allocation subfield may indicate that an RU associated with the second uplink resource allocation is the same as the first RU associated with the first uplink resource allocation and/or that a spatial stream allocation associated with the second uplink resource allocation is the same as the first spatial stream allocation associated with the first uplink resource allocation. A value of 1 for the Multiple Resource Allocation subfield may indicate that an RU associated with the second uplink resource allocation may be determined by STA 1702 based on the first uplink resource allocation and/or an uplink resource allocation for another STA indicated in trigger frame 1706.

Trigger frame 1706 may have a format according to trigger frame 1100 described herein. As such, trigger frame 1706 may comprise multiple User Info fields for STA 1702. A first occurring User Info field among the multiple User Info fields may comprise a first indication associated with the first uplink resource allocation for STA 1702, and a subsequent User Info field among the multiple User Info fields for STA 1702 may comprise a second indication associated with the second uplink resource allocation for STA 1702. For example, the RU Allocation subfield of the first User Info field may indicate a first RU and/or the SS Allocation subfield of the first User Info field may indicate a first spatial stream allocation. The RU Allocation subfield of the subsequent User Info field may indicate a second RU and/or the SS Allocation subfield of the second User Info field may indicate a second spatial stream allocation. The first RU and the second RU may be the same. The first spatial stream allocation and the second spatial stream allocation may be the same or different.

The first uplink resource allocation and the second resource uplink allocation contained in trigger frame 1706 may be associated with different time resources. The first uplink resource allocation is associated with a first time resource, and the second uplink resource allocation is associated with a second time resource. The first time resource may be associated with a first transmission interval, and the second time resource may be associated with a second transmission interval different than the first transmission interval. The first/second transmission interval may correspond in duration to a time division duplex (TDD) slot as defined in the IEEE 802.11 standard. The first/second transmission interval may correspond in duration to a portion of a TDD slot as defined in the IEEE 802.11 standard.

STA 1702 may send (e.g., transmit) a frame 1708, via the first uplink resource allocation, to AP 902, for example, based on (e.g., in response to) trigger frame 1706. The first uplink resource allocation may comprise a first RU and/or a first spatial resource allocation. Frame 1708 may comprise a TB PPDU. The first time resource associated with the first uplink resource allocation may start at a first time spacing from an end of transmission of trigger frame 1706. As shown in FIG. 17, the first time spacing equals a SIFS duration, and frame 1708 may be sent (e.g., transmitted) one SIFS, for example, after transmission of trigger frame 1706.

Trigger frame 1706 may further comprise a third indication associated with a third uplink resource allocation for STA 1704. The third indication may be carried by an RU Allocation subfield and/or an SS Allocation subfield of a User Info field for STA 1704 in trigger frame 1406. As shown in FIG. 17, the third uplink resource allocation may be associated with a same time resource as the first uplink resource allocation allocated to STA 1702. The third uplink resource allocation may be associated with a different frequency resource and/or a different spatial resource than the first uplink resource allocation. The third uplink resource allocation may be associated with a same time resource as the second uplink resource allocation allocated to STA 1702. The third uplink resource allocation may be associated with a different frequency resource and/or a different spatial resource than the second uplink resource allocation.

STA 1704 may send (e.g., transmit) a frame 1710, via the third uplink resource allocation, to AP 902, for example, based on (e.g., in response to) trigger frame 1706. Frame 1710 may comprise a TB PPDU. The time resource associated with the third resource allocation may start at a third time spacing from an end of transmission of trigger frame 1706. As shown in FIG. 17, the third time spacing equals a SIFS duration, and frame 1710 may be sent (e.g., transmitted) one SIFS, for example, after transmission of trigger frame 1706.

AP 902 may send (e.g., transmit) a frame 1712, for example, after receiving frames 1708 and 1710 from STAs 1702 and 1704 respectively. Frame 1712 may comprise a BlockAck (BA) frame or a multi-STA BA frame. Frame 1712 may be sent (e.g., transmitted) one SIFS, for example, after reception of frames 1708 and 1710 by AP 902.

STA 1702 may send (e.g., transmit) a frame 1714, via the second uplink resource allocation, to AP 902, for example, based on (e.g., upon) receiving frame 1712 from AP 902. Frame 1714 may comprise a TB PPDU. Frame 1714 may be a re-transmission of frame 1708. Re-transmission of frame 1708 using a different time resource may increase time-diversity gain.

Trigger frame 1706 may have a format according to trigger frame 1100 described herein and may allocate both a first uplink resource allocation and a second uplink resource allocation to STA 1702. As such, trigger frame 1706 may comprise a first and a second User Info field for STA 1702. The first User Info field may comprise a first indication associated with the first uplink resource allocation for STA 1702, and the second User Info field may comprise a second indication associated with the second uplink resource allocation for STA 1702. For example, the RU Allocation subfield of the first User Info field may indicate a first RU (e.g., RU1) and/or the SS Allocation subfield of the first User Info field may indicate a first spatial stream allocation (e.g., STR1). The RU Allocation subfield of the second User Info field may indicate a second RU (e.g., RU2) and/or the SS Allocation subfield of the second User Info field may indicate a second spatial stream allocation (e.g., STR2).

Additionally, trigger frame 1706 may allocate a third resource allocation to STA 1704. The third uplink resource allocation may be signaled by the RU Allocation subfield and/or the SS Allocation subfield of a third User Info field of trigger frame 1706 associated with STA 1704. For example, the RU Allocation subfield may indicate a third RU (e.g., RU3) and/or the SS Allocation subfield may indicate a third spatial stream allocation (e.g., STR3).

The second RU of the second uplink resource allocation for STA 1702 may be equal to the third RU of the third uplink resource allocation for STA 1704. The second spatial stream allocation of the second uplink resource allocation may or may not be equal to the third spatial stream allocation of the third uplink resource allocation.

The first RU of the first uplink resource allocation for STA 1702 may be equal to the third RU of the third uplink resource allocation for STA 1704, and the first spatial stream allocation of the first uplink resource allocation for STA 1702 may be equal or different from the third spatial stream allocation of the third uplink resource allocation for STA 1704. The second RU of the second uplink resource allocation for STA 1702 may be equal to the first RU (and the third RU). The second spatial stream allocation of the second uplink resource allocation for STA 1702 may be equal or different from the first spatial stream allocation (or the third spatial stream allocation).

The second time resource associated with the second uplink resource allocation may start at a second time spacing from an end of transmission of frame 1712 sent (e.g., transmitted) by AP 902, for example, based on (e.g., in response to) frames 1708 and 1710. As shown in FIG. 17, the second time spacing equals a SIFS duration, and frame 1714 may be sent (e.g., transmitted) one SIFS, for example, after reception of frame 1712 by STA 1702.

AP 902 may send (e.g., transmit) a frame 1716 to STA 1702, for example, based on (e.g., in response to) frame 1714. Frame 1716 may be a BA frame acknowledging frame 1714.

FIG. 18 shows an example method for uplink transmission based on (e.g., in response to) a trigger frame. Example process 1800 may be performed by an AP, such as AP 902.

As shown in FIG. 18, process 1800 may begin in step 1802, which may comprise sending (e.g., transmitting) a first frame comprising: a first indication associated with a first resource allocation for a first STA; and a second indication associated with a second resource allocation for the first STA. The first resource allocation and the second resource allocation may be associated with different time resources.

The first indication may indicate a resource associated with the first uplink resource allocation. The resource may comprise a frequency resource and/or a spatial resource.

The second indication may comprise an indication of the presence/absence of the second uplink resource allocation in the first frame. Where the indication of presence/absence of the second uplink resource allocation indicates presence of the second uplink resource allocation, the second uplink resource allocation may have a same frequency resource as the first uplink resource allocation. Where the indication of presence/absence of the second uplink resource allocation indicates presence of the second uplink resource allocation, the second uplink resource allocation may have a same spatial resource as the first uplink resource allocation.

The first indication may indicate a first frequency resource and/or a first spatial resource associated with the first uplink resource allocation. The second indication may indicate a second frequency resource and/or a second spatial resource associated with the second uplink resource allocation. The first frame may further comprise a third indication associating the second indication with a second time resource and/or a fourth indication associating the first indication with a first time resource.

The first frame may be a trigger frame. The trigger frame may comprise a user info field comprising the first indication. The user info field may comprise an RU allocation field and/or an SS allocation field comprising the first indication. The user info field may also comprise the second indication.

In step 1804, process 1800 may comprise receiving a second frame via the first resource allocation from the first STA. The second frame may comprise a TB PPDU.

Process 1800 may further comprise sending (e.g., transmitting) a third frame, for example, based on (e.g., in response to) the second frame. The third frame may comprise a BA or a multi-STA BA frame. Process 1800 may further comprise receiving a fourth frame via the second uplink resource allocation from the first STA.

A first time resource associated with the first uplink resource allocation may start at a first time spacing from an end of transmission of the first frame. The first time spacing may be equal to a SIFS duration. A second time resource associated with the second uplink resource allocation may start at a second time spacing from an end of transmission of the third frame sent (e.g., transmitted), for example, based on (e.g., in response to) the second frame. The second time spacing may be equal to a SIFS duration.

The first frame may further comprise a third indication associated with a third uplink resource allocation for a second STA. The third uplink resource allocation may be associated with a same time resource as the first uplink resource allocation or the second uplink resource allocation. The third uplink resource allocation may be associated with a same time resource as the first uplink resource allocation but with a different frequency resource and/or a different spatial resource than the first uplink resource allocation. Process 1800 may further comprise receiving a third frame via the third uplink resource allocation from the second STA.

FIG. 19 shows an example method for uplink transmission based on (e.g., in response to) a trigger frame. Example process 1900 may be performed by an AP, such as AP 902.

As shown in FIG. 19, process 1900 may comprise, in step 1902, sending (e.g., transmitting) a first frame comprising: a first indication associated with a first resource allocation for a first STA; and a second indication of presence or absence of a second resource allocation for the first STA. The first indication may indicate a resource associated with the first uplink resource allocation. The resource may comprise a frequency resource and/or a spatial resource. Where the second indication of presence/absence of the second uplink resource allocation indicates presence of the second uplink resource allocation, the second uplink resource allocation may have a same frequency resource as the first uplink resource allocation. Where the second indication of presence/absence of the second uplink resource allocation indicates presence of the second uplink resource allocation, the second uplink resource allocation may have a same spatial resource as the first uplink resource allocation.

The first frame may be a trigger frame. The trigger frame may comprise a user info field comprising the first indication. The user info field may comprise an RU allocation field and/or an SS allocation field comprising the first indication. The user info field may also comprise the second indication.

In step 1904, process 1900 may comprise receiving a second frame via the first resource allocation from the first STA. The second frame may comprise a TB PPDU. Process 1900 may further comprise sending (e.g., transmitting) a third frame, for example, based on (e.g., in response to) the second frame. The third frame may comprise a BA or a multi-STA BA frame. Where the second indication indicates presence of the second uplink resource allocation, process 1900 may further comprise receiving a fourth frame via the second uplink resource allocation from the first STA.

A first time resource associated with the first uplink resource allocation may start at a first time spacing from an end of transmission of the first frame. The first time spacing may be equal to a SIFS duration. A second time resource associated with the second uplink resource allocation may start at a second time spacing from an end of transmission of the third frame sent (e.g., transmitted), for example, based on (e.g., in response to) the second frame. The second time spacing may be equal to a SIFS duration.

The first frame may further comprise a third indication associated with a third uplink resource allocation for a second STA. The third uplink resource allocation may be associated with a same time resource as the first uplink resource allocation or the second uplink resource allocation. The third uplink resource allocation may be associated with a same time resource as the first uplink resource allocation but with a different frequency resource and/or a different spatial resource than the first uplink resource allocation. Process 1900 may further comprise receiving a third frame via the third uplink resource allocation from the STA.

FIG. 20 shows an example method for uplink transmission based on (e.g., in response to) a trigger frame. Example process 2000 may be performed by an AP, such as AP 902.

As shown in FIG. 20, process 2000 may begin in step 2002, which may comprise sending (e.g., transmitting) a trigger frame soliciting one or more TB PPDU from a first STA. The trigger frame may comprise: a first frequency resource and/or a first spatial resource associated with a first uplink resource allocation for the first STA; and a second frequency resource and/or a first spatial resource associated with a second uplink resource allocation for the first STA, where the first uplink resource allocation and the second uplink resource allocation are associated with different time resources.

The first indication may indicate a first frequency resource and/or a first spatial resource associated with the first uplink resource allocation. The second indication may indicate a second frequency resource and/or a second spatial resource associated with the second uplink resource allocation. The first frame may further comprise a third indication associating the second indication with a second time resource and/or a fourth indication associating the first indication with a first time resource.

The trigger frame may comprise a first user info field comprising the first indication and a second user info field comprising the second indication. The first user info field may comprise an RU allocation field and/or an SS allocation field comprising the first indication. The second user info field may comprise an RU allocation field and/or an SS allocation field comprising the second indication.

In step 2004, process 2000 may comprise receiving, from the first STA, a first TB PDDU via the first uplink resource allocation, for example, based on (e.g., in response to) the trigger frame. In step 2006, process 2000 may comprise sending (e.g., transmitting) a third frame acknowledging the first TB PPDU. The third frame may comprise a BA or a multi-STA BA frame. In step 2008, process 2000 may comprise receiving a second TB PPDU, via the second uplink resource allocation, from the first STA. The second TB PPDU may be sent (e.g., transmitted), for example, based on (e.g., in response to) the third frame.

A first time resource associated with the first uplink resource allocation may start at a first time spacing from an end of transmission of the trigger. The first time spacing may be equal to a SIFS duration. A second time resource associated with the second uplink resource allocation may start at a second time spacing from an end of transmission of the third frame sent (e.g., transmitted), for example, based on (e.g., in response to) the first TB PPDU. The second time spacing may be equal to a SIFS duration.

The trigger frame may further comprise a third indication associated with a third uplink resource allocation for a second STA. The third uplink resource allocation may be associated with a same time resource as the first uplink resource allocation or the second uplink resource allocation. The third uplink resource allocation may be associated with a same time resource as the first uplink resource allocation but with a different frequency resource and/or a different spatial resource than the first uplink resource allocation. Process 2000 may further comprise receiving a third frame via the third uplink resource allocation from the second STA.

FIG. 21 shows an example method for uplink transmission based on (e.g., in response to) a trigger frame. Example process 2100 may be performed by a STA, such as STA 904, 1202, 1302, 1402, 1502, 1602, or 1702.

As shown in FIG. 21, process 2100 may begin in step 2102, which may comprise receiving a first frame from an AP. The first frame may comprise: a first indication associated with a first resource allocation for a first STA; and a second indication associated with a second resource allocation for the first STA. The first resource allocation and the second resource allocation may be associated with different time resources.

The first indication may indicate a resource associated with the first uplink resource allocation. The resource may comprise a frequency resource and/or a spatial resource.

The second indication may comprise an indication of the presence/absence of the second uplink resource allocation in the first frame. Where the indication of presence/absence of the second uplink resource allocation indicates presence of the second uplink resource allocation, the second uplink resource allocation may have a same frequency resource as the first uplink resource allocation. Where the indication of presence/absence of the second uplink resource allocation indicates presence of the second uplink resource allocation, the second uplink resource allocation may have a same spatial resource as the first uplink resource allocation.

The first indication may indicate a first frequency resource and/or a first spatial resource associated with the first uplink resource allocation. The second indication may indicate a second frequency resource and/or a second spatial resource associated with the second uplink resource allocation. The first frame may further comprise a third indication associating the second indication with a second time resource and/or a fourth indication associating the first indication with a first time resource.

The first frame may be a trigger frame. The trigger frame may comprise a user info field comprising the first indication. The user info field may comprise an RU allocation field and/or an SS allocation field comprising the first indication. The user info field may also comprise the second indication.

In step 2104, process 2100 may comprise sending (e.g., transmitting) a second frame via the first uplink resource allocation to the AP. The second frame may be sent (e.g., transmitted), for example, based on (e.g., in response to) the first frame. The second frame may comprise a TB PPDU.

Process 2100 may further comprise receiving, from the AP, a third frame, for example, based on (e.g., in response to) the second frame. The third frame may be a BA or a multi-STA BA frame. The BA frame may be a compressed BA frame.

A first time resource associated with the first uplink resource allocation may start at a first time spacing from an end of transmission of the first frame. The first time spacing may be equal to a SIFS duration. A second time resource associated with the second uplink resource allocation may start at a second time spacing from an end of transmission of the third frame sent (e.g., transmitted), for example, based on (e.g., in response to) the second frame. The second time spacing may be equal to a SIFS duration.

Process 2100 may further comprise sending (e.g., transmitting), to the AP, a fourth frame via the second uplink resource allocation regardless of content of the third frame. Process 2100 may further comprise decoding the third frame; and determining whether to send (e.g., transmit) a fourth frame via the second uplink resource allocation based on the decoding of the third frame. Where the decoding of the third frame indicates unsuccessful reception by the AP of an MPDU or an A-MPDU contained in the second frame, process 2100 may further comprise sending (e.g., transmitting), to the AP, the fourth frame via the second uplink resource allocation. Where the decoding of the third frame indicates successful reception by the AP of an MPDU or an A-MPDU contained in the second frame, process 2100 may further comprise not sending (e.g., transmitting), to the AP, the fourth frame via the second uplink resource allocation.

The fourth frame may be the same as the second frame. The second frame and the fourth frame comprise a first TB PPDU and a second TB PPDU respectively, and the first TB PPDU and the second TB PPDU are of equal length. A PSDU of the second TB PPDU may be shorter than a PSDU of the first PPDU. Where the first TB PPDU and the second TB PPDU are of equal length, the second TB PPDU may comprise padding bits.

The first frame may further indicate: a third indication associated with a third uplink resource allocation for a second STA; and a fourth indication associated with a fourth uplink resource allocation for the second STA. Sending (e.g., transmitting) the fourth frame may comprise sending (e.g., transmitting) the fourth frame via the second uplink resource allocation and/or the third uplink resource allocation. Where the fourth indication comprises an indication of presence/absence of the fourth uplink resource allocation for the second STA, sending (e.g., transmitting) the fourth frame may comprise sending (e.g., transmitting) the second frame via the second uplink resource allocation and/or the third uplink resource allocation based on the fourth indication. Where the indication of presence/absence of the fourth uplink resource allocation for the second STA indicates absence of the fourth uplink resource allocation for the second STA, sending (e.g., transmitting) the fourth frame may comprise sending (e.g., transmitting) the fourth frame via a combined resource allocation comprising the second uplink resource allocation and the third uplink resource allocation. Where the indication of presence/absence of the fourth uplink resource allocation for the second STA indicates absence of the fourth uplink resource allocation for the second STA, sending (e.g., transmitting) the fourth frame may comprise: sending (e.g., transmitting) the fourth frame via the second uplink resource allocation; and sending (e.g., transmitting) the fourth frame via the third uplink resource allocation. Where the indication of presence/absence of the fourth uplink resource allocation for the second STA indicates absence of the fourth uplink resource allocation for the second STA, sending (e.g., transmitting) the fourth frame may comprise sending (e.g., transmitting) the fourth frame via the third uplink resource allocation. The second uplink resource allocation and the fourth uplink resource allocation are associated with a same time resource.

Figure 22:
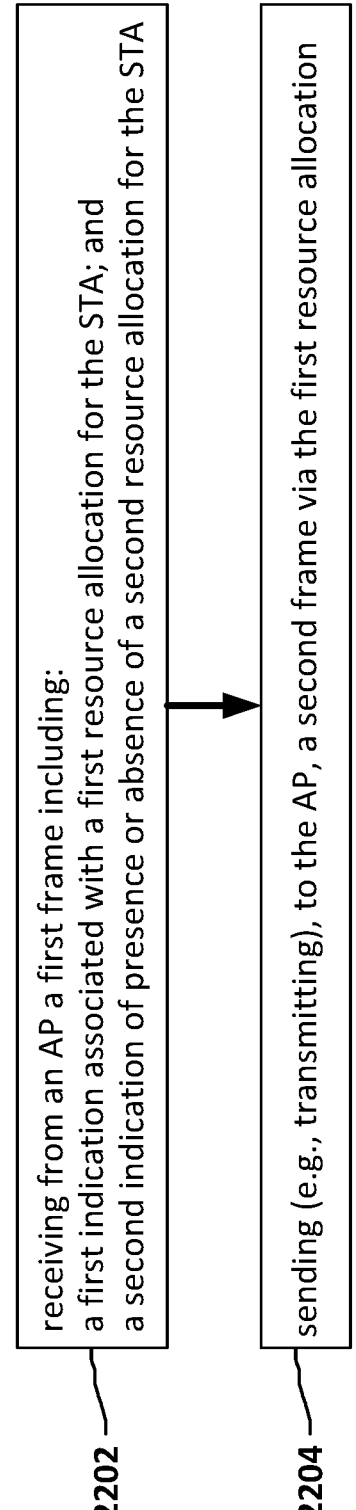
FIG. 22 shows an example method for uplink transmission based on (e.g., in response to) a trigger frame.

FIG. 22 shows an example method for uplink transmission based on (e.g., in response to) a trigger frame. Example process 2200 may be performed by a STA, such as STA 904, 1202, 1302, 1402, 1502, 1602, or 1702.

As shown in FIG. 22, process 2200 may begin in step 2202, which may comprise receiving from an AP a first frame comprising: a first indication associated with a first resource allocation for the STA; and a second indication of presence or absence of a second resource allocation for the STA. The first indication may indicate a resource associated with the first uplink resource allocation. The resource may comprise a frequency resource and/or a spatial resource. Where the second indication of presence/absence of the second uplink resource allocation indicates presence of the second uplink resource allocation, the second uplink resource allocation may have a same frequency resource as the first uplink resource allocation. Where the second indication of presence/absence of the second uplink resource allocation indicates presence of the second uplink resource allocation, the second uplink resource allocation may have a same spatial resource as the first uplink resource allocation.

The first frame may be a trigger frame. The trigger frame may comprise a user info field comprising the first indication. The user info field may comprise an RU allocation field and/or an SS allocation field comprising the first indication. The user info field may also comprise the second indication.

In step 2204, process 2200 may comprise sending (e.g., transmitting), to the AP, a second frame via the first resource allocation. The second frame may be sent (e.g., transmitted), for example, based on (e.g., in response to) the first frame. The second frame may comprise a TB PPDU.

Process 2200 may further comprise receiving, from the AP, a third frame, for example, based on (e.g., in response to) the second frame. The third frame may be a BA or a multi-STA BA frame. The BA frame may be a compressed BA frame.

The first uplink resource allocation and the second uplink resource allocation may be associated with different time resources. A first time resource associated with the first uplink resource allocation may start at a first time spacing from an end of transmission of the first frame. The first time spacing may be equal to a SIFS duration. A second time resource associated with the second uplink resource allocation may start at a second time spacing from an end of transmission of the third frame sent (e.g., transmitted), for example, based on (e.g., in response to) the second frame. The second time spacing may be equal to a SIFS duration.

Where the second indication indicates presence of the second uplink resource allocation, process 2200 may further comprise sending (e.g., transmitting), to the AP, a fourth frame via the second uplink resource allocation regardless of content of the third frame. Process 2200 may further comprise decoding the third frame; and determining whether to send (e.g., transmit) a fourth frame via the second uplink resource allocation based on the decoding of the third frame. Where the decoding of the third frame indicates unsuccessful reception by the AP of an MPDU or an A-MPDU contained in the second frame, process 2200 may further comprise sending (e.g., transmitting), to the AP, the fourth frame via the second uplink resource allocation. Where the decoding of the third frame indicates successful reception by the AP of an MPDU or an A-MPDU contained in the second frame, process 2200 may further comprise not sending (e.g., transmitting), to the AP, the fourth frame via the second uplink resource allocation.

The fourth frame may be the same as the second frame. The second frame and the fourth frame comprise a first TB PPDU and a second TB PPDU respectively, and the first TB PPDU and the second TB PPDU are of equal length. A PSDU of the second TB PPDU may be shorter than a PSDU of the first PPDU. Where the first TB PPDU and the second TB PPDU are of equal length, the second TB PPDU may comprise padding bits.

The first frame may further indicate: a third indication associated with a third uplink resource allocation for a second STA; and a fourth indication associated with a fourth uplink resource allocation for the second STA. Sending (e.g., transmitting) the fourth frame may comprise sending (e.g., transmitting) the fourth frame via the second uplink resource allocation and/or the third uplink resource allocation. Where the fourth indication comprises an indication of presence/absence of the fourth uplink resource allocation for the second STA, sending (e.g., transmitting) the fourth frame may comprise sending (e.g., transmitting) the second frame via the second uplink resource allocation and/or the third uplink resource allocation based on the fourth indication. Where the indication of presence/absence of the fourth uplink resource allocation for the second STA indicates absence of the fourth uplink resource allocation for the second STA, sending (e.g., transmitting) the fourth frame may comprise sending (e.g., transmitting) the fourth frame via a combined resource allocation comprising the second uplink resource allocation and the third uplink resource allocation. Where the indication of presence/absence of the fourth uplink resource allocation for the second STA indicates absence of the fourth uplink resource allocation for the second STA, sending (e.g., transmitting) the fourth frame may comprise: sending (e.g., transmitting) the fourth frame via the second uplink resource allocation; and sending (e.g., transmitting) the fourth frame via the third uplink resource allocation. Where the indication of presence/absence of the fourth uplink resource allocation for the second STA indicates absence of the fourth uplink resource allocation for the second STA, sending (e.g., transmitting) the fourth frame may comprise sending (e.g., transmitting) the fourth frame via the third uplink resource allocation.

FIG. 23 shows an example method for uplink transmission based on (e.g., in response to) a trigger frame. Example process 2300 may be performed by a STA, such as such as STA 904, 1202, 1302, 1402, 1502, 1602, or 1702.

As shown in FIG. 23, process 2300 may begin in step 2302, which may comprise receiving, from an AP, a trigger frame soliciting one or more TB PPDU from the STA. The trigger frame may comprise: a first frequency resource and/or spatial resource associated with a first uplink resource allocation for the first STA; and a second frequency resource and/or spatial resource associated with a second uplink resource allocation for the first STA, where the first uplink resource allocation and the second uplink resource allocation are associated with different time resources.

The first indication may indicate a first frequency resource and/or a first spatial resource associated with the first uplink resource allocation. The second indication may indicate a second frequency resource and/or a second spatial resource associated with the second uplink resource allocation. The first frame may further comprise a third indication associating the second indication with a second time resource and/or a fourth indication associating the first indication with a first time resource.

The trigger frame may comprise a first user info field comprising the first indication and a second user info field comprising the second indication. The first user info field may comprise an RU allocation field and/or an SS allocation field comprising the first indication. The second user info field may comprise an RU allocation field and/or an SS allocation field comprising the second indication.

In step 2304, process 2300 may comprise sending (e.g., transmitting), to the first STA, a first TB PDDU via the first uplink resource allocation, for example, based on (e.g., in response to) the trigger frame. In step 2306, process 2300 may comprise receiving, from the AP, a third frame acknowledging the first TB PPDU. The third frame may comprise a BA or a multi-STA BA frame. In step 2308, process 2300 may comprise sending (e.g., transmitting), to the AP, a second TB PPDU, via the second uplink resource allocation. The second TB PPDU may be sent (e.g., transmitted), for example, based on (e.g., in response to) the third frame.

A first time resource associated with the first uplink resource allocation may start at a first time spacing from an end of transmission of the trigger. The first time spacing may be equal to a SIFS duration. A second time resource associated with the second uplink resource allocation may start at a second time spacing from an end of transmission of the third frame sent (e.g., transmitted), for example, based on (e.g., in response to) the first TB PPDU. The second time spacing may be equal to a SIFS duration.

The trigger frame may further comprise a third indication associated with a third uplink resource allocation for a second STA. The third uplink resource allocation may be associated with a same time resource as the first uplink resource allocation or the second uplink resource allocation. The third uplink resource allocation may be associated with a same time resource as the first uplink resource allocation but with a different frequency resource and/or a different spatial resource than the first uplink resource allocation.

Figure 24:
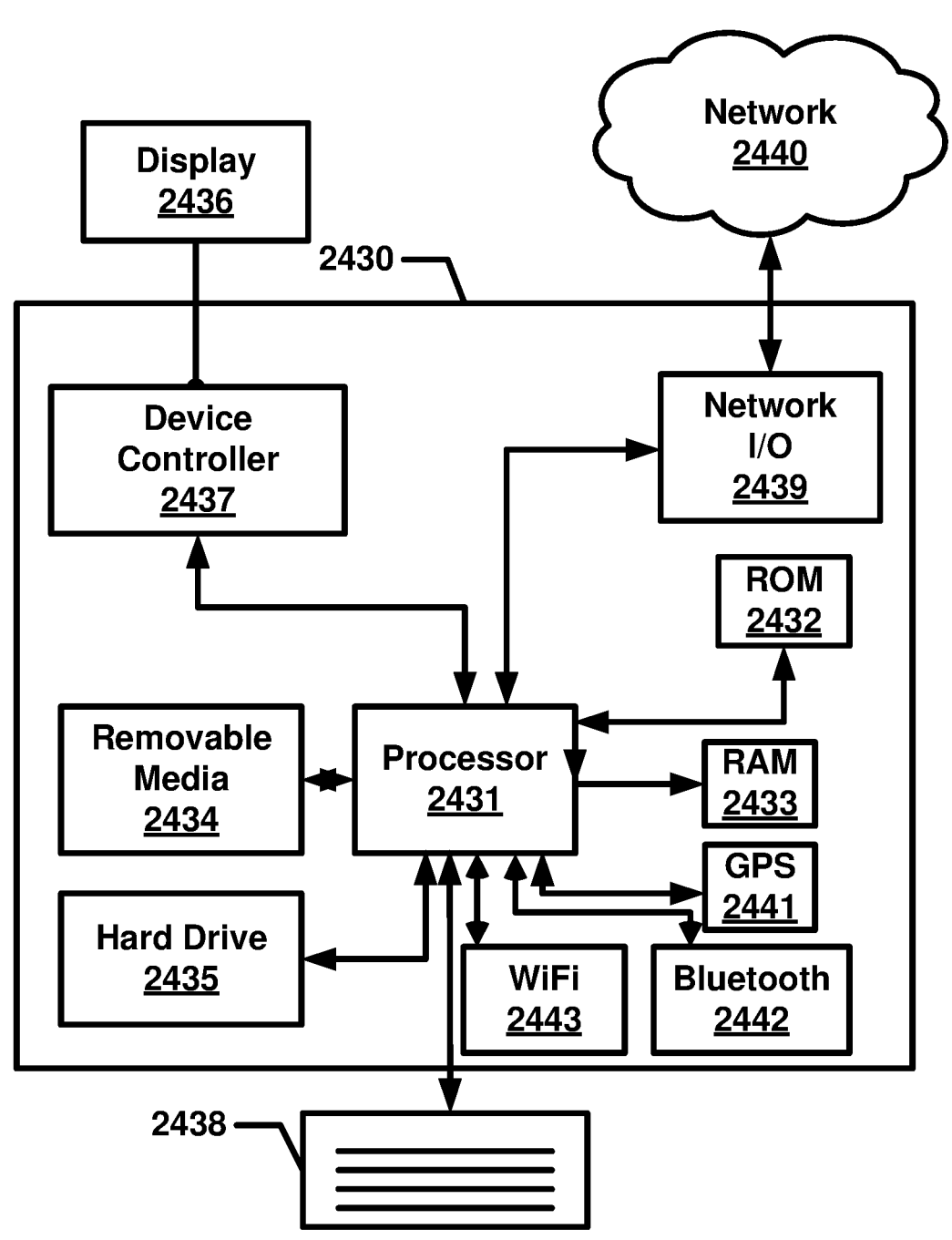
FIG. 24 shows example elements of a computing device that may be used to implement any of the various devices described herein.

FIG. 24 shows example elements of a computing device that may be used to implement any of the various devices described herein, including, for example, a STA (e.g., 106-1, 106-2, 106-3, 106-4, 106-5, 106-6, 106-7, 106-8, 804, 806, 904, 906, 1202, 1204, 1302, 1304, 1402, 1404, 1502, 1504, 1602, 1604, 1702, 1704), an AP (e.g., 104-1, 104-2, 802, 902), communication devices (e.g., 210, 260), and/or any computing and/or communication device described herein. The computing device 2430 may comprise one or more processors 2431, which may execute instructions stored in the random-access memory (RAM) 2433, the removable media 2434 (such as a Universal Serial Bus (USB) drive, compact disk (CD) or digital versatile disk (DVD), or floppy disk drive), or any other desired storage medium. Instructions may also be stored in an attached (or internal) hard drive 2435. The computing device 2430 may also comprise a security processor (not shown), which may execute instructions of one or more computer programs to monitor the processes executing on the processor 2431 and any process that requests access to any hardware and/or software components of the computing device 2430 (e.g., ROM 2432, RAM 2433, the removable media 2434, the hard drive 2435, the device controller 2437, a network interface 2439, a GPS 2441, a Bluetooth interface 2442, a WiFi interface 2443, etc.). The computing device 2430 may comprise one or more output devices, such as the display 2436 (e.g., a screen, a display device, a monitor, a television, etc.), and may comprise one or more output device controllers 2437, such as a video processor. There may also be one or more user input devices 2438, such as a remote control, keyboard, mouse, touch screen, microphone, etc. The computing device 2430 may also comprise one or more network interfaces, such as a network interface 2439, which may be a wired interface, a wireless interface, or a combination of the two. The network interface 2439 may provide an interface for the computing device 2430 to communicate with a network 2440 (e.g., a RAN, or any other network). The network interface 2439 may comprise a modem (e.g., a cable modem), and the external network 2440 may comprise communication links, an external network, an in-home network, a provider's wireless, coaxial, fiber, or hybrid fiber/coaxial distribution system (e.g., a DOCSIS network), or any other desired network. Additionally, the computing device 2430 may comprise a location-detecting device, such as a global positioning system (GPS) microprocessor 2441, which may be configured to receive and process global positioning signals and determine, with possible assistance from an external server and antenna, a geographic position of the computing device 2430.

The example in FIG. 24 may be a hardware configuration, although the components shown may be implemented as software as well. Modifications may be made to add, remove, combine, divide, etc. components of the computing device 2430 as desired. Additionally, the components may be implemented using basic computing devices and components, and the same components (e.g., processor 2431, ROM storage 2432, display 2436, etc.) may be used to implement any of the other computing devices and components described herein. For example, the various components described herein may be implemented using computing devices having components such as a processor executing computer-executable instructions stored on a computer-readable medium, as shown in FIG. 24. Some or all of the entities described herein may be software based, and may co-exist in a common physical platform (e.g., a requesting entity may be a separate software process and program from a dependent entity, both of which may be executed as software on a common computing device).

An access point may perform a method comprising multiple operations. The access point (AP) may send a first frame to a station (STA). The first frame may comprise an indication of a first uplink resource allocation for the STA and an indication of presence or absence of a second uplink resource allocation for the STA. The AP may receive, from the STA, a second frame via the first uplink resource allocation. The AP may receive, from the STA and based on the indication indicating presence of the second uplink resource allocation, a third frame via the second uplink resource allocation. The AP may send, to a second station (STA), the first frame. The first frame may further comprise an indication of a third uplink resource allocation for the second STA and an indication of presence or absence of a fourth uplink resource allocation for the second STA. The AP may receive, from the second STA, a fourth frame via the third uplink resource allocation. The AP may receive, from the STA and based on the indication indicating absence of the fourth uplink resource allocation, a fifth frame via at least one of the second uplink resource allocation or the third uplink resource allocation. The second uplink resource allocation may be associated with a same frequency resource and spatial resource as the first uplink resource allocation. The first frame may be a trigger frame. The receiving the second frame may comprise receiving the second frame based on the first frame. The receiving the third frame may comprise receiving the third frame based on the first frame. At least one of the second frame or the third frame may comprise a trigger-based (TB) physical protocol data unit (PPDU). The first frame may be a trigger frame. The trigger frame may comprise a user information field. The user information field may comprise the indication of presence or absence of a second uplink resource allocation for the STA. The AP may send, to a second station (STA), the first frame. The first frame may further comprise an indication of a third uplink resource allocation for the second STA and an indication of presence or absence of a fourth uplink resource allocation for the second STA. The AP may receive, from the second STA, a fourth frame via the third uplink resource allocation. The AP may send, based on at least one of the second frame or the fourth frame, a sixth frame. The AP may send, to a second station (STA), the first frame. The first frame may further comprise an indication of a third uplink resource allocation for the second STA and an indication of presence or absence of a fourth uplink resource allocation for the second STA. The third uplink resource allocation may be associated with a same time resource as the first uplink resource allocation. The fourth uplink resource allocation may be associated with a same time resource as the second uplink resource allocation. The AP may send, to a second station (STA), the first frame. The first frame may further comprise an indication of a third uplink resource allocation for the second STA and an indication of presence or absence of a fourth uplink resource allocation for the second STA. The third uplink resource allocation may be associated with a different frequency resource or a different spatial resource as the first uplink resource allocation. The AP may send, to a second station (STA), the first frame. The first frame may further comprise an indication of a third uplink resource allocation for the second STA and an indication of presence or absence of a fourth uplink resource allocation for the second STA. The AP may receive, from the second STA, a fourth frame via the third uplink resource allocation. The AP may send, based on at least one of the second frame or the fourth frame, a block acknowledgment (BA) frame. A first time resource associated with the first uplink resource allocation may start at a first time spacing from an end of transmission of the first frame. The third frame may be the same as the second frame. The access point may comprise one or more processors; and memory storing instructions that, when executed by the one or more processors, cause the access point to perform the described method, additional operations and/or include the additional elements. A system may comprise an access point configured to perform the described method, additional operations and/or include the additional elements; and a station configured to communicate with the access point. A computer-readable medium may store instructions that, when executed, cause performance of the described method, additional operations, and/or include the additional elements.

An access point may perform a method comprising multiple operations. The access point (AP) may send, to a first station (STA) and a second station (STA), a first frame. The first frame may comprise: a first indication of a first uplink resource allocation for the first STA; a second indication of presence or absence of a second uplink resource allocation for the first STA; a third indication of a third uplink resource allocation for the second STA; and a fourth indication of presence or absence of a fourth uplink resource allocation for the second STA. The AP may receive, from the first STA, a second frame via the first uplink resource allocation. The AP may receive, from the second STA, a third frame via the third uplink resource allocation. The AP may receive, from the first STA, a fourth frame via at least one of the second uplink resource allocation or the third uplink resource allocation, based on the fourth indication indicating absence of the fourth uplink resource allocation. The AP may send, based on at least one of the second frame or the third frame, a fifth frame. The third uplink resource allocation may be associated with a same time resource as the first uplink resource allocation. The fourth uplink resource allocation may be associated with a same time resource as the second uplink resource allocation. The third uplink resource allocation may be associated with a different frequency resource or a different spatial resource as the first uplink resource allocation. The first frame may be a trigger frame for triggering one or more trigger-based (TB) physical protocol data unit (PPDU). The first frame may be a trigger frame. The trigger frame may comprise a user information field. The user information field may comprise the second indication and the fourth indication. The AP may send, based on at least one of the second frame or the third frame, a block acknowledgment (BA) frame. A first time resource associated with the first uplink resource allocation may start at a first time spacing from an end of transmission of the first frame. The access point may comprise one or more processors; and memory storing instructions that, when executed by the one or more processors, cause the access point to perform the described method, additional operations and/or include the additional elements. A system may comprise an access point configured to perform the described method, additional operations and/or include the additional elements; and a station configured to communicate with the access point. A computer-readable medium may store instructions that, when executed, cause performance of the described method, additional operations, and/or include the additional elements.

A station may perform a method comprising multiple operations. The station (STA) may receive, from an access point (AP), a first frame. The first frame may comprise: an indication of a first uplink resource allocation for the STA and an indication of presence or absence of a second uplink resource allocation for the STA. The STA may send, to the AP, a second frame via the first uplink resource allocation. The STA may send, to the AP and based on the indication indicating presence of the second uplink resource allocation, a third frame via the second uplink resource allocation. A second station (STA) may receive, from the AP, the first frame. The first frame may further comprise an indication of a third uplink resource allocation for the second STA and an indication of presence or absence of a fourth uplink resource allocation for the second STA. The second STA may send, to the AP, a fourth frame via the third uplink resource allocation. The STA may send, to the AP and based on the indication indicating absence of the fourth uplink resource allocation, the third frame via at least one of the second uplink resource allocation or the third uplink resource allocation. The STA may receive, based on the second frame, a fifth frame, and may determine whether to send the third frame via the second uplink resource allocation, based on the fifth frame. The second uplink resource allocation may be associated with a same frequency resource and spatial resource as the first uplink resource allocation. The first frame may be a trigger frame. The second frame and the third frame may be sent based on the first frame. At least one of the second frame or the third frame may include trigger-based (TB) physical protocol data unit (PPDU). The first frame may be a trigger frame. The trigger frame may comprise a user information field. The user information field may comprise the indication of presence or absence of a second uplink resource allocation for the STA. A second station (STA) may receive, from the AP, the first frame. The first frame may further comprise an indication of a third uplink resource allocation for the second STA and an indication of presence or absence of a fourth uplink resource allocation for the second STA. The second STA may send, to the AP, a fourth frame via the third uplink resource allocation and may receive, from the AP and based on at least one of the second frame or the fourth frame, a sixth frame. A second station (STA) may receive, from the AP, the first frame. The first frame may further comprise an indication of a third uplink resource allocation for the second STA and an indication of presence or absence of a fourth uplink resource allocation for the second STA. The third uplink resource allocation may be associated with a same time resource as the first uplink resource allocation. The fourth uplink resource allocation may be associated with a same time resource as the second uplink resource allocation. A second station (STA) may receive, from the AP, the first frame. The first frame may further comprise an indication of a third uplink resource allocation for the second STA and an indication of presence or absence of a fourth uplink resource allocation for the second STA. The third uplink resource allocation may be associated with a different frequency resource or a different spatial resource as the first uplink resource allocation. A second station (STA) may receive, from the AP, the first frame. The first frame may further comprise an indication of a third uplink resource allocation for the second STA and an indication of presence or absence of a fourth uplink resource allocation for the second STA. The second STA may send, to the AP, a fourth frame via the third uplink resource allocation and may receive, from the AP and based on at least one of the second frame or the fourth frame, a block acknowledgment (BA) frame. A first time resource associated with the first uplink resource allocation may start at a first time spacing from an end of transmission of the first frame. The third frame may be the same as the second frame. The station may comprise one or more processors; and memory storing instructions that, when executed by the one or more processors, cause the station to perform the described method, additional operations and/or include the additional elements. A system may comprise a station configured to perform the described method, additional operations and/or include the additional elements; and an access point (AP) configured to communicate with the station. A computer-readable medium may store instructions that, when executed, cause performance of the described method, additional operations, and/or include the additional elements.

An access point may perform a method comprising multiple operations. The access point (AP) may transmit, a trigger frame soliciting one or more trigger-based (TB) physical protocol data unit (PPDU) from a station (STA). The trigger frame may comprise a first indication of a first uplink resource allocation for the STA and a second indication of presence or absence of a second uplink resource allocation for the STA. The AP may receive, from the STA, a first TB PPDU via the first uplink resource allocation. The AP may receive, from the STA, a second TB PPDU via the second uplink resource allocation, based on the second indication indicating presence of the second uplink resource allocation for the STA. The access point may comprise one or more processors; and memory storing instructions that, when executed by the one or more processors, cause the access point to perform the described method, additional operations and/or include the additional elements. A system may comprise an access point configured to perform the described method, additional operations and/or include the additional elements; and a station configured to communicate with the access point. A computer-readable medium may store instructions that, when executed, cause performance of the described method, additional operations, and/ or include the additional elements.

An access point may perform a method comprising multiple operations. The access point (AP) may transmit a first frame. The first frame may comprise a first indication of a first uplink resource allocation for a first station (STA) and a second indication of presence or absence of a second uplink resource allocation for the first STA. The AP may receive, from the first STA, a second frame via the first uplink resource allocation. The AP may receive, from the STA, a third frame via the second uplink resource allocation, based on the second indication indicating presence of the second uplink resource allocation. The indication of presence or absence of the second uplink resource allocation may indicate presence of the second uplink resource allocation. The second uplink resource allocation may have a same frequency resource as the first uplink resource allocation. The indication of presence or absence of the second uplink resource allocation may indicate presence of the second uplink resource allocation. The second uplink resource allocation may have a same spatial resource as the first uplink resource allocation. The second indication of presence or absence of the second uplink resource allocation may indicate presence of the second uplink resource allocation. The AP may receive from the first STA, the third frame, via the second uplink resource allocation. The first frame may further include a third indication for a third uplink resource allocation for a second STA. The third uplink resource allocation may be associated with a same time resource as the first uplink resource allocation or the second uplink resource allocation. The third uplink resource allocation may be associated with a same time resource as the first uplink resource allocation but with a different frequency resource or a different spatial resource than the first uplink resource allocation. The AP may receive from the second STA, a fourth frame, via the third uplink resource allocation. The first frame may be a trigger frame. The trigger frame may comprise a user info field. The user info field may comprise the first indication. The user info field may comprise the second indication. The user info field may comprise an RU allocation field and/or an SS allocation field. The user info field may comprise the first indication.

The second frame or the third frame may include a TB PPDU. The AP may transmit a fifth frame in response to the second frame. The fifth frame may include a BlockAck (BA) or a multi-STA BA frame. The first indication may indicate a resource associated with the first uplink resource allocation. The resource may comprise a frequency resource or a spatial resource. A first time resource associated with the first uplink resource allocation may start at a first time spacing from an end of transmission of the first frame. The first time spacing may equal a short interframe spacing (SIFS) duration. A second time resource associated with the second uplink resource allocation may start at a second time spacing from an end of transmission of a fifth frame. The fifth frame may be transmitted by the AP in response to the second frame. The second time spacing may equal a short interframe spacing (SIFS) duration. The first uplink resource allocation and the second uplink resource allocation may be associated with different time resources. The access point may comprise one or more processors; and memory storing instructions that, when executed by the one or more processors, cause the access point to perform the described method, additional operations and/or include the additional elements. A system may comprise an access point configured to perform the described method, additional operations and/or include the additional elements; and a station configured to communicate with the access point. A computer-readable medium may store instructions that, when executed, cause performance of the described method, additional operations, and/or include the additional elements.

A station may perform a method comprising multiple operations. The station (STA) may receive, from an access point (AP), a trigger frame soliciting one or more trigger-based (TB) physical protocol data unit (PPDU) from the STA. The trigger frame may comprise a first indication of a first uplink resource allocation for the STA and a second indication of presence or absence of a second uplink resource allocation for the STA. The STA may transmit, to the AP, a first TB PDDU, via the first uplink resource allocation. The STA may transmit, to the AP, a second TB PPDU, via the second uplink resource allocation, based on the second indication indicating presence of the second uplink resource allocation for the STA. The station may comprise one or more processors; and memory storing instructions that, when executed by the one or more processors, cause the station to perform the described method, additional operations and/or include the additional elements. A system may comprise a station configured to perform the described method, additional operations and/or include the additional elements; and an access point (AP) configured to communicate with the station. A computer-readable medium may store instructions that, when executed, cause performance of the described method, additional operations, and/ or include the additional elements.

A station may perform a method comprising multiple operations. The station (STA) may receive, from an access point (AP), a first frame. The first frame may comprise a first indication of a first uplink resource allocation for the STA and a second indication of presence or absence of a second uplink resource allocation for the STA. The STA may transmit, to the AP, a second frame, via the first uplink resource allocation and in response to the trigger frame. The STA may transmit, to the AP, a third frame, via the second uplink resource allocation, based on the second indication indicating presence of the second uplink resource allocation. The indication of presence/absence of the second uplink resource allocation may indicate presence of the second uplink resource allocation. The resource allocation may have a same frequency resource as the first uplink resource allocation. The indication of presence/absence of the second uplink resource allocation may indicate presence of the second uplink resource allocation. The resource allocation may have a same spatial resource as the first uplink resource allocation. The STA may receive a fourth frame in response to the second frame. The STA may transmit, to the AP, the third frame, via the second uplink resource allocation regardless of content of the fourth frame. The STA may decode the fourth frame, and may determine whether to transmit the third frame via the second uplink resource allocation based on the decoding of the fourth frame. The STA may transmit, to the AP, the third frame, via the second uplink resource allocation. The STA may not transmit, to the AP, the third frame, via the second uplink resource allocation. The third frame may be the same as the second frame. The second frame and the third frame may include a first TB PPDU and a second TB PPDU respectively. The first TB PPDU and the second TB PPDU may be of equal length. A PSDU of the second TB PPDU may be shorter than a PSDU of the first PPDU. The second TB PPDU may include padding bits. The fourth frame may be a BA or a multi-STA BA frame. The BA frame may be a compressed BA frame. The first frame may further indicate a third indication of a third uplink resource allocation for a second STA and a fourth indication of presence/absence of a fourth uplink resource allocation for the second STA. Transmitting the third frame may comprise transmitting the third frame via the second uplink resource allocation and/or the third uplink resource allocation based on the fourth indication. The indication of presence/absence of the fourth uplink resource allocation for the second STA may indicate absence of the fourth uplink resource allocation for the second STA. Transmitting the third frame may comprise transmitting the third frame via a combined resource allocation that may comprise the second uplink resource allocation and the third uplink resource allocation. The indication of presence/absence of the fourth uplink resource allocation for the second STA may indicate absence of the fourth uplink resource allocation for the second STA. Transmitting the third frame may comprise transmitting the third frame via the second uplink resource allocation and transmitting the third frame via the third uplink resource allocation. The indication of presence/absence of the fourth uplink resource allocation for the second STA may indicate absence of the fourth uplink resource allocation for the second STA. Transmitting the third frame may comprise transmitting the third frame via the third uplink resource allocation. The second uplink resource allocation and the fourth uplink resource allocation may be associated with a same time resource. A first time resource associated with the first uplink resource allocation may start at a first time spacing from an end of reception of the first frame. The first time spacing may equal a short interframe spacing (SIFS) duration. A second time resource associated with the second uplink resource allocation may start at a second time spacing from an end of reception of a third frame received from the AP in response to the second frame. The second time spacing may equal a short interframe spacing (SIFS) duration. The station may comprise one or more processors; and memory storing instructions that, when executed by the one or more processors, cause the station to perform the described method, additional operations and/or include the additional elements. A system may comprise a station configured to perform the described method, additional operations and/or include the additional elements; and an access point (AP) configured to communicate with the station. A computer-readable medium may store instructions that, when executed, cause performance of the described method, additional operations, and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

An access point (and an AP MLD) may communicate with one or more wireless devices (e.g., computing device(s), non-AP MLD(s), station(s), etc.). Computing devices described herein may support multiple technologies, and/or multiple releases of the same technology. Computing devices may have some specific capability(ies) depending on wireless device category and/or capability(ies). Computing devices referred to herein may correspond to a plurality of computing devices compatible with a given LTE, 5G, 3GPP or non-3GPP release, IEEE 802.11 Standard(s) (e.g., IEEE 802.11be, beyond IEEE 802.11be), or Wi-Fi Alliance (WFA) Standard(s) (e.g., Wi-Fi 7, Wi-Fi 8) technology. A plurality of computing devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of access points and/or a plurality of wireless devices in a coverage area that may not comply with the disclosed methods, for example, because those wireless devices and/or access points may perform based on other (e.g., older or newer) releases of LTE, 5G, 6G, 3GPP or non-3GPP, IEEE 802.11 Standards (e.g., IEEE 802.11be, beyond IEEE 802.11be), or Wi-Fi Alliance (WFA) Standards (e.g., Wi-Fi 7, Wi-Fi 8) technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as access points (APs), AP multi-link devices (MLDs), stations (STAs), non-AP STAs, non-AP MLDs, base stations, wireless devices or user equipment (wireless device), servers, switches, antennas, and/or the like. A network may comprise any wireless technology, including but not limited to, cellular, wireless, Wi-Fi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
sending, by an access point (AP) and to a station (STA), a first frame comprising:
an indication of a first uplink resource allocation for the STA; and
an indication of presence or absence of a second uplink resource allocation for the STA;
receiving, by the AP and from the STA, a second frame via the first uplink resource allocation; and
based on the first frame indicating presence of the second uplink resource allocation, receiving, by the AP and from the STA, a third frame via the second uplink resource allocation.

2. The method of claim 1, further comprising:
sending, by the AP and to a second station (STA), the first frame, wherein the first frame further comprises:
an indication of a third uplink resource allocation for the second STA; and
an indication of presence or absence of a fourth uplink resource allocation for the second STA;
receiving, by the AP and from the second STA, a fourth frame via the third uplink resource allocation; and
based on the first frame indicating absence of the fourth uplink resource allocation, receiving, by the AP and from the STA, a fifth frame via at least one of the second uplink resource allocation or the third uplink resource allocation.

3. The method of claim 1, wherein the second uplink resource allocation is associated with a same frequency resource as the first uplink resource allocation and a same spatial resource as the first uplink resource allocation.

4. The method of claim 1, wherein the first frame is a trigger frame, and wherein the receiving the second frame comprises receiving the second frame based on the first frame, and wherein the receiving the third frame comprises receiving the third frame based on the first frame.

5. The method of claim 1, wherein at least one of the second frame or the third frame comprises a trigger-based (TB) physical protocol data unit (PPDU).

6. The method of claim 1, wherein the first frame is a trigger frame comprising a user information field, and wherein the user information field comprises the indication of presence or absence of the second uplink resource allocation for the STA.

7. A method comprising:
sending, by an access point (AP) and to a first station (STA) and a second station (STA), a first frame comprising:
a first indication of a first uplink resource allocation for the first STA;

a second indication of presence or absence of a second uplink resource allocation for the first STA;

a third indication of a third uplink resource allocation for the second STA; and a fourth indication of presence or absence of a fourth uplink resource allocation for the second STA;

receiving, by the AP and from the first STA, a second frame via the first uplink resource allocation; and receiving, by the AP and from the second STA, a third frame via the third uplink resource allocation.

8. The method of claim 7, further comprising:

receiving, by the AP and from the first STA, a fourth frame via at least one of the second uplink resource allocation or the third uplink resource allocation, based on the fourth indication indicating absence of the fourth uplink resource allocation.

9. The method of claim 7, further comprising:

sending, by the AP and based on at least one of the second frame or the third frame, a fifth frame.

10. The method of claim 7, wherein the third uplink resource allocation is associated with a same time resource as the first uplink resource allocation, and the fourth uplink resource allocation is associated with a same time resource as the second uplink resource allocation.

11. The method of claim 7, wherein the third uplink resource allocation is associated with a different frequency resource or a different spatial resource as the first uplink resource allocation.

12. The method of claim 7, wherein the first frame is a trigger frame for triggering one or more trigger-based (TB) physical protocol data units (PPDUs).

13. The method of claim 7, wherein the first frame is a trigger frame comprising a first user information field and a second user information field, wherein the first user information field comprises the second indication, and wherein the second user information field comprises the fourth indication.

14. A method comprising:

receiving, by a station (STA) and from an access point (AP), a first frame comprising:

an indication of a first uplink resource allocation for the STA; and an indication of presence or absence of a second uplink resource allocation for the STA;

sending, by the STA and to the AP, a second frame via the first uplink resource allocation; and based on the first frame indicating presence of the second uplink resource allocation, sending, by the STA and to the AP, a third frame via the second uplink resource allocation.

15. The method of claim 14, further comprising:

receiving, by a second station (STA) and from the AP, the first frame, wherein the first frame further comprises:

an indication of a third uplink resource allocation for the second STA; and an indication of presence or absence of a fourth uplink resource allocation for the second STA;

sending, by the second STA and to the AP, a fourth frame via the third uplink resource allocation; and based on the first frame indicating absence of the fourth uplink resource allocation, sending, by the STA and to the AP, the third frame via at least one of the second uplink resource allocation or the third uplink resource allocation.

16. The method of claim 14, further comprising:

receiving, by the STA and based on the second frame, a fifth frame; and determining whether to send the third frame via the second uplink resource allocation, based on the fifth frame.

17. The method of claim 14, wherein the second uplink resource allocation is associated with a same frequency resource as the first uplink resource allocation and a same spatial resource as the first uplink resource allocation.

18. The method of claim 14, wherein the first frame is a trigger frame, and wherein the second frame and the third frame are sent based on the first frame.

19. The method of claim 14, wherein at least one of the second frame or the third frame comprises a trigger-based (TB) physical protocol data unit (PPDU).

20. The method of claim 14, wherein the first frame is a trigger frame comprising a user information field, and wherein the user information field comprises the indication of presence or absence of the second uplink resource allocation for the STA.

\* \* \* \* \*